US012679497B2

(12) United States Patent
Heyna et al.

(10) Patent No.: US 12,679,497 B2
(45) Date of Patent: Jul. 14, 2026

(54) BRAKE SYSTEM FOR BICYCLES

(71) Applicant: SRAM, LLC, Chicago, IL (US)

(72) Inventors: Sebastian Heyna, Hambach (DE);
Henrik Braedt, Hambach (DE);
Charles Dunlap, Manitou Springs, CO
(US)

(73) Assignee: SRAM, LLC, Chicago, IL (US)

( * ) Notice: Subject to any disclaimer, the term of this
patent is extended or adjusted under 35
U.S.C. 154(b) by 1081 days.

(21) Appl. No.: 17/539,439

(22) Filed: Dec. 1, 2021

(65) Prior Publication Data

US 2022/0194513 A1      Jun. 23, 2022

Related U.S. Application Data

(63) Continuation-in-part of application No. 17/125,029,
filed on Dec. 17, 2020, now Pat. No. 12,135,064.

(51) Int. Cl.
B62L 1/00          (2006.01)
B62L 1/02          (2006.01)
(Continued)

(52) U.S. Cl.
CPC ................. B62L 1/005 (2013.01); B62L 1/02
(2013.01); B62L 3/023 (2013.01);
(Continued)

(58) Field of Classification Search
CPC .. B62L 1/005; B62L 1/02; B62L 3/023; F16D
65/0075; F16D 65/183; F16D 2055/02;
F16D 2121/04
(Continued)

(56) References Cited

U.S. PATENT DOCUMENTS 3,985,391 A  *  10/1976  Hoffman ................... B62L 1/00
                                                          188/26
4,533,153 A  *  8/1985  Tsunoda .................... B62L 1/00
                                                          280/277
(Continued)

FOREIGN PATENT DOCUMENTS

CN          1697942        11/2005
CN          103201162       7/2013
(Continued)

OTHER PUBLICATIONS

Francesco Mazza, "Riconoscere i sistemi Virtual Pivot", Web Page,
Jul. 1, 2014, <https://www.mtb-mag.com/riconoscere-i-sistemi-
virtual-pivot/>, IT.
(Continued)

*Primary Examiner* — Christopher P Schwartz

(57) ABSTRACT

Brake calipers and rotors for bicycles are described herein.
An example brake caliper includes an outboard caliper
portion to be disposed inboard of a frame of the bicycle. The
outboard caliper portion includes an outboard caliper body
and an outboard brake pad that is fixed relative to the
outboard caliper body. The brake caliper also includes an
inboard caliper portion coupled to the outboard caliper body.
The inboard caliper portion is disposed inboard of the
outboard caliper portion when the brake caliper is coupled to
the bicycle. The inboard caliper portion includes an inboard
caliper body and an inboard brake pad that is movable
relative to the inboard caliper body.

13 Claims, 49 Drawing Sheets

(51) Int. Cl.
  *B62L 3/02* (2006.01)
  *F16D 65/00* (2006.01)
  *F16D 65/18* (2006.01)
  *F16D 55/00* (2006.01)
  *F16D 121/04* (2012.01)

(52) U.S. Cl.
  CPC ....... *F16D 65/0075* (2013.01); *F16D 65/183* (2013.01); *F16D 2055/002* (2013.01); *F16D 2121/04* (2013.01)

(58) Field of Classification Search
  USPC .......... 188/71.1, 72.4, 73.1, 18 A, 24.11, 26
  See application file for complete search history.

(56) References Cited

U.S. PATENT DOCUMENTS

| | | | | |
|---|---|---|---|---|
| 4,765,443 | A * | 8/1988 | Cunningham ............ | B62L 3/00 188/24.12 |
| 5,520,269 | A | 5/1996 | Yamamoto | |
| 7,318,502 | B2 * | 1/2008 | Costa .................... | F16D 55/228 188/26 |
| 10,427,750 | B2 * | 10/2019 | Nago .................... | F16D 55/228 |
| 10,926,831 | B2 * | 2/2021 | Kondou ............. | F16D 65/0056 |
| 11,644,072 | B2 | 5/2023 | Lisciani | |
| 11,926,390 | B2 * | 3/2024 | Dunlap .................. | B62K 19/38 |
| 12,187,377 | B2 * | 1/2025 | Heyna ................ | B60B 27/0052 |
| 2006/0054422 | A1 | 3/2006 | Dimsey | |
| 2007/0045056 | A1 * | 3/2007 | Kawai .................. | F16D 65/092 188/26 |
| 2009/0242338 | A1 * | 10/2009 | Ishida .................... | F16D 65/18 188/72.4 |
| 2015/0183488 | A1 | 7/2015 | Hirotomi et al. | |
| 2017/0114846 | A1 * | 4/2017 | Chen .................... | F16D 65/123 |
| 2019/0093717 | A1 | 3/2019 | Kirkpatrick | |
| 2019/0120305 | A1 | 4/2019 | Lavezzi | |

FOREIGN PATENT DOCUMENTS

| | | | |
|---|---|---|---|
| CN | 104768842 | 2/2018 | |
| CN | 109424672 | 3/2019 | |
| CN | 109789871 | 5/2019 | |
| DE | 102010035492 | 3/2012 | |
| JP | H0635687 U | * 5/1994 | ............ F16D 55/22 |
| TW | 201325984 | 7/2013 | |
| TW | 201843400 | 12/2018 | |
| TW | M572336 U | 1/2019 | |

OTHER PUBLICATIONS

"Yeti Lawwill DH Custom Frame Made for Jürgen Beneke", Web Page, Last Checked Nov. 19, 2021, <https://www.worthpoint.com/worthopedia/yeti-lawwill-dh-custom-frame-made-176605707>.

"1998 Yeti DH-8", Web Page, Last Checked Nov. 19, 2021, <http://www.vintagemtbworkshop.com/1998-yeti-dh-8.html>.

"Yetifan 90s", Web Page, Last Checked Nov. 19, 2021, <http://www.yetifan.com/YETI_PAST/80s/00s/90s/90s.html>.

Christopher Bayer, "First Look: Ghost presents the new RIOT LT", Web Page, Nov. 17, 2014, <https://enduro-mtb.com/en/first-look-ghost-presents-the-new-riot-lt/>.

Tyler Benedict, "Ghost's 2016 AMR platform builds three trail bikes from one frame, new Lector World Cup & more", Web Page, Jul. 5, 2015, <https://bikerumor.com/ghosts-2016-amr-platform-builds-three-trail-bikes-from-one-frame-new-lector-world-cup-more/>.

Mike Kazimer, "Ghost Bikes AMR Rio 9", Web Page, Aug. 14, 2013, <https://www.pinkbike.com/news/First-Look-Ghost-Bikes-AMR-Riot-9.html?trk=rss>.

Greg Kopecky, "2020 Trek Checkpoint gravel bike gets updates, wide-range 1x drivetrain option", Web Page, Aug. 13, 2019, <https://bikerumor.com/2020-trek-checkpoint-gravel-bike-gets-updates-wide-range-1x-drivetrain-option/>.

Cory Benson, "Reshaped MMR Kenta prototype XC mountain bike gets Nove Mesto World Cup race debut", Web Page, May 17, 2021, <https://bikerumor.com/reshaped-mmr-kenta-prototype-xc-mountain-bike-gets-nove-mesto-world-cup-race-debut/>.

James Smurthwaite, "MMR's Prototype Kenta Full Suspension XC Race Bike", Web Page, May 17, 2021, <https://www.pinkbike.com/news/mmrs-prototype-kenta-full-suspension-race-bike-albstadt-xc-world-cup-2021.html?trk=rss>.

* cited by examiner

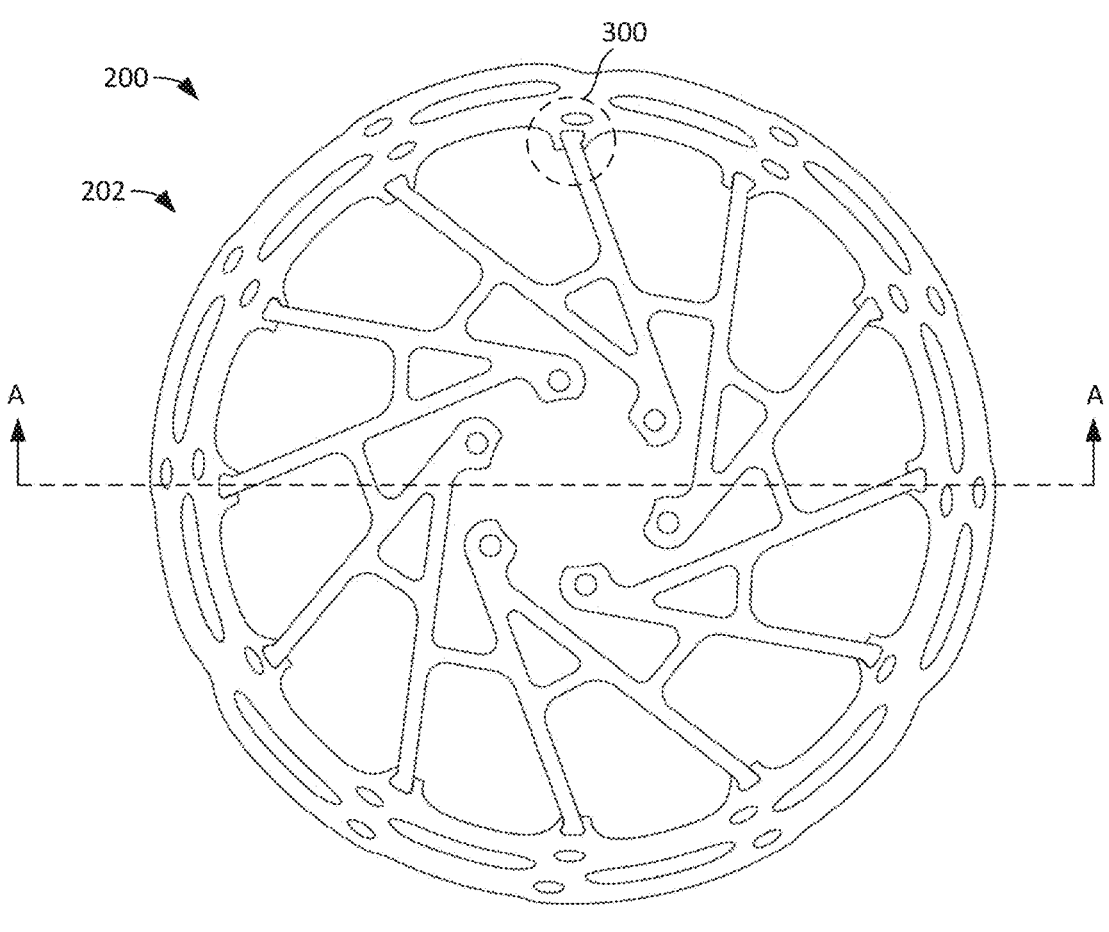
FIG. 3
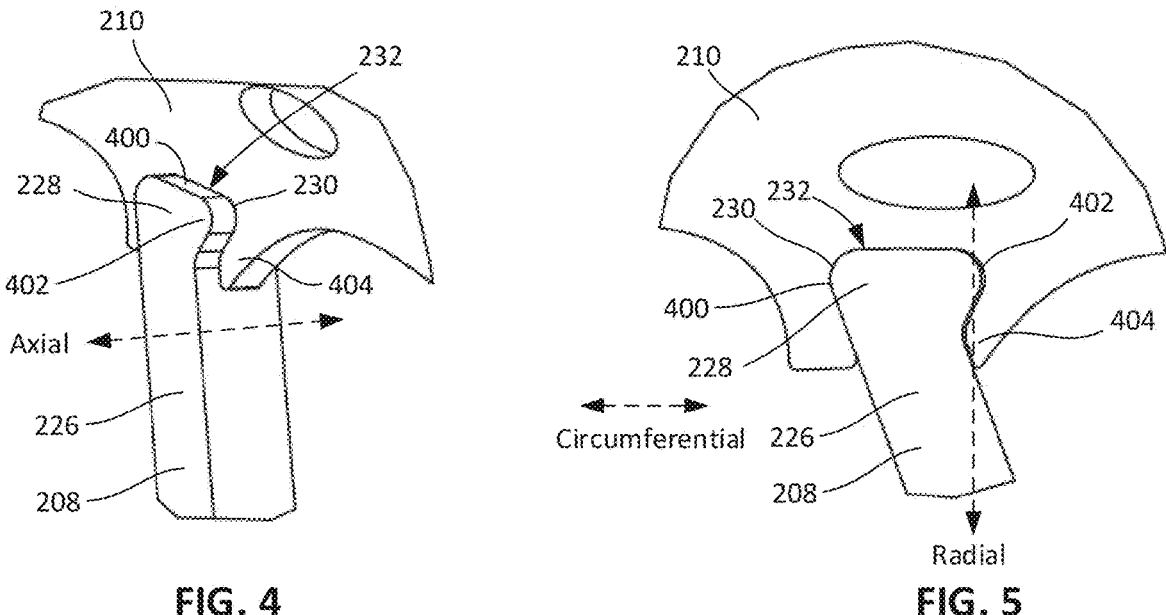
FIG. 4          FIG. 5

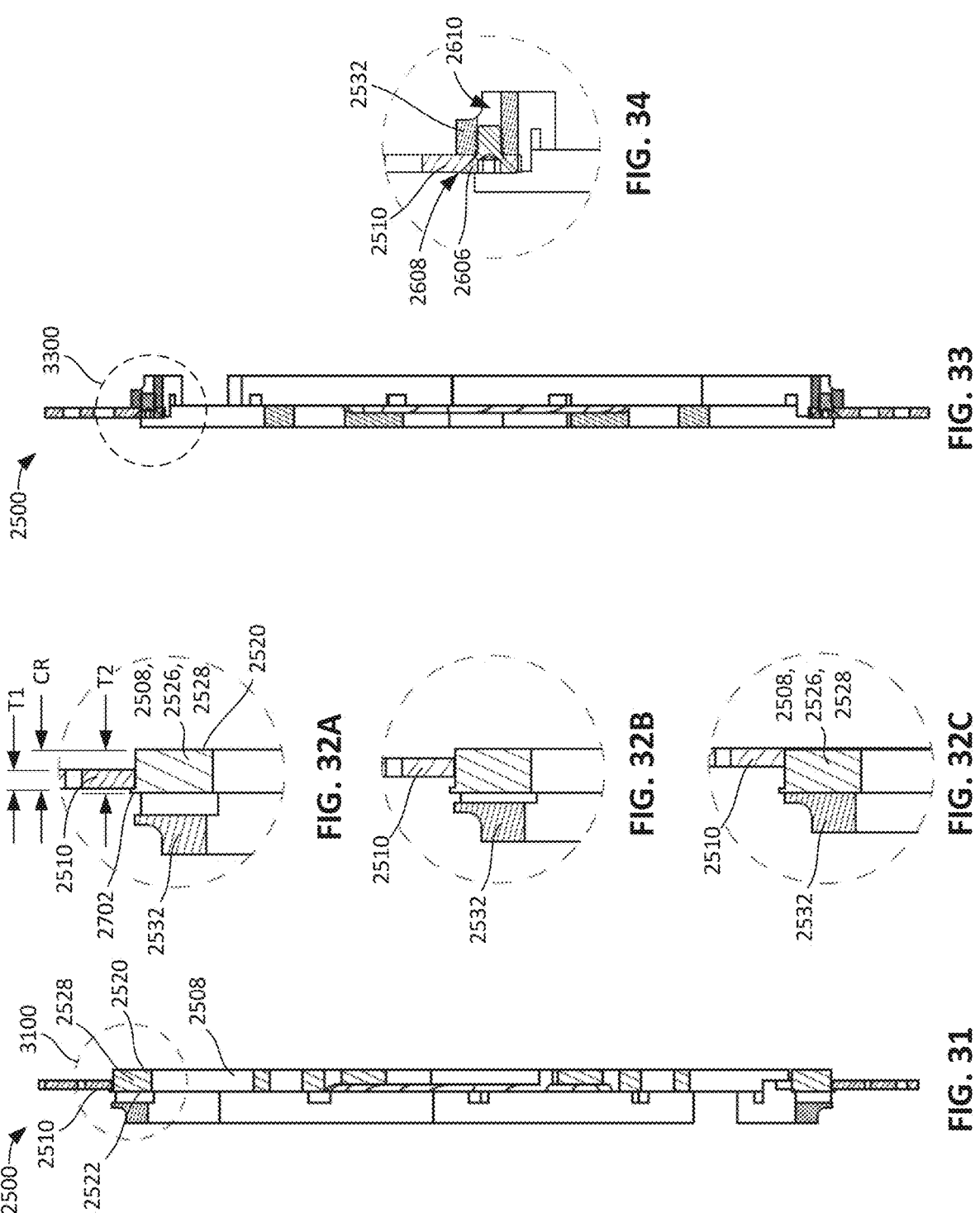

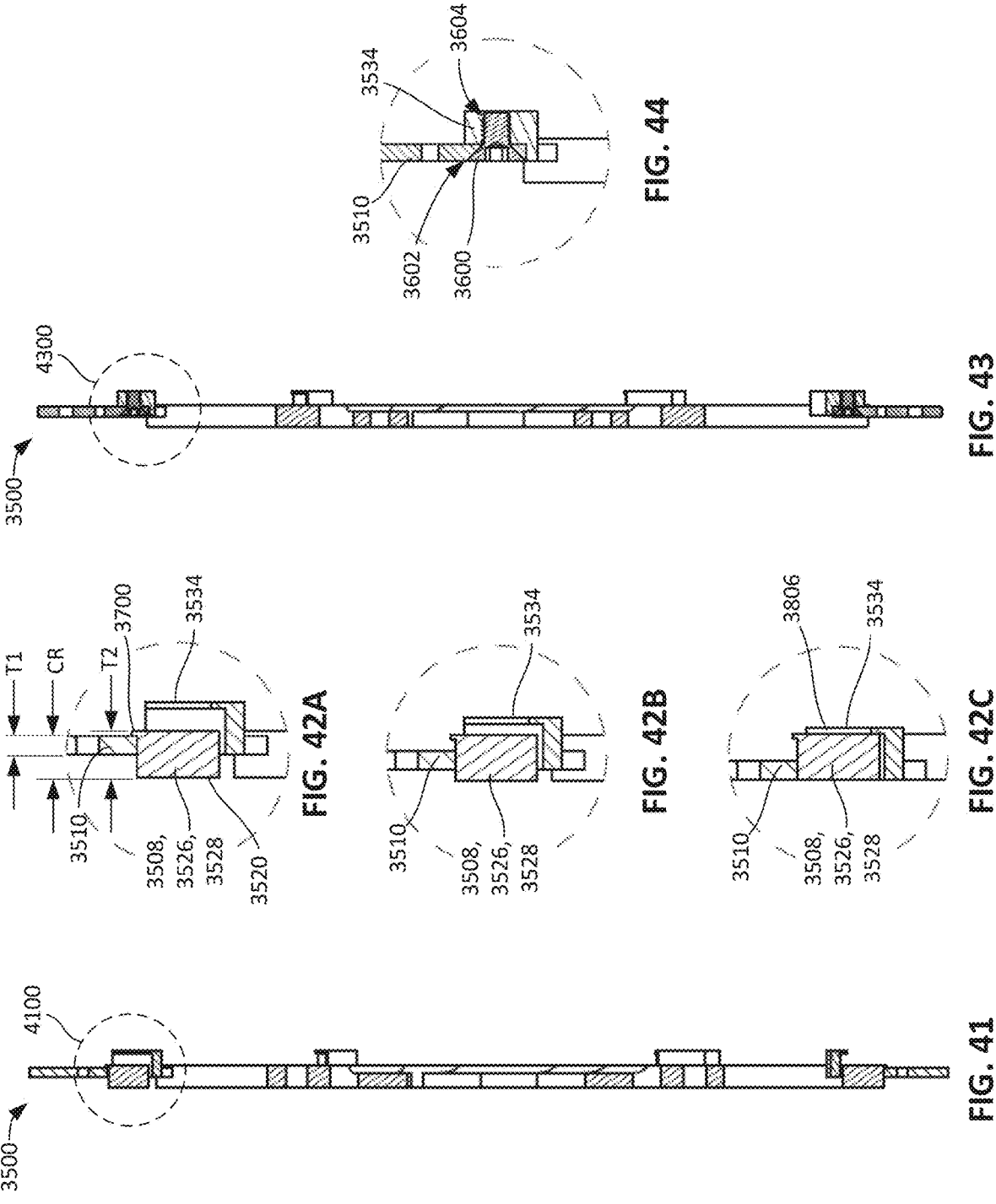

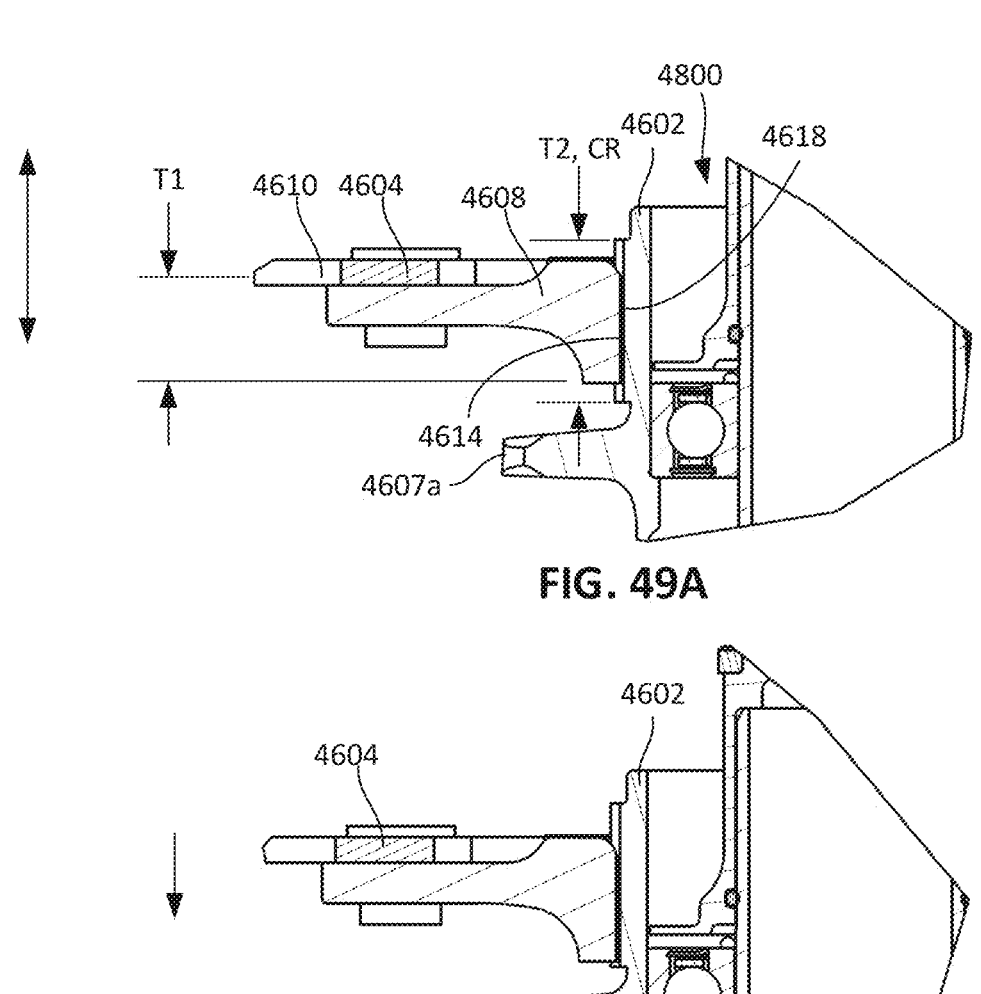
FIG. 49A
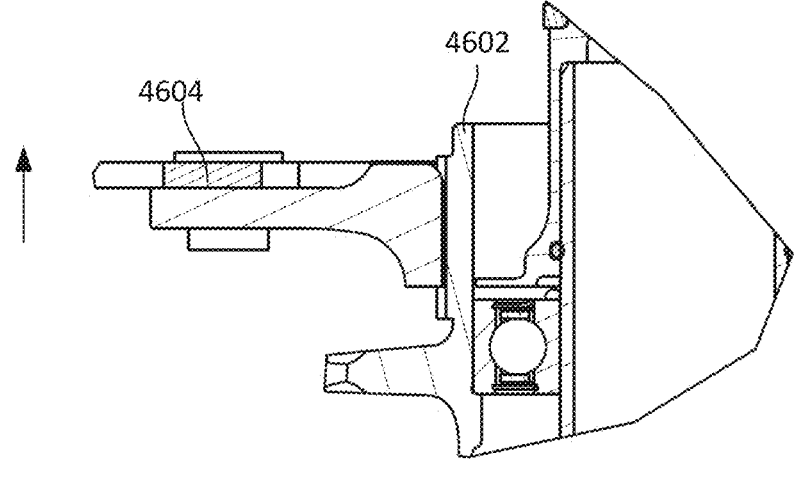
FIG. 49B
FIG. 49C

BRAKE SYSTEM FOR BICYCLES

RELATED APPLICATION

This patent arises from a continuation-in-part of U.S. patent application Ser. No. 17/125,029, titled "Brake Rotors for Bicycles," filed Dec. 17, 2020, which is hereby incorporated by this reference in its entirety.

FIELD OF THE DISCLOSURE

This disclosure relates generally to bicycle components and, more specifically, to brake calipers and rotors for bicycles.

BACKGROUND

Bicycles and other human powered vehicles often include disc brakes. A disc brake includes a brake rotor and a brake caliper. The brake rotor is typically mounted to a hub on a wheel of the bicycle, and the brake caliper is mounted to a fixed portion of the bicycle such as the frame. When the brake caliper is actuated, the brake caliper moves one or more brake pads into engagement with the brake rotor, which slows the brake rotor and, thus, reduces the speed the bicycle.

SUMMARY

An example brake rotor for a bicycle includes a carrier to be coupled to a hub of the bicycle. The brake rotor also includes a brake track having braking surfaces to be engaged by brake pads. The brake track is disposed radially outward of the carrier. The brake track has a first thickness and the carrier has a second thickness greater than the first thickness. The brake rotor has a rotational axis defining a coordinate reference. The brake track is coupled to the carrier such that the brake track is axially movable relative to the carrier while being radially and circumferentially constrained relative to the carrier.

An example brake rotor for a bicycle includes a carrier to be coupled to a hub of the bicycle. The carrier has an arm with an end portion. The end portion has a protrusion extending in a circumferential direction. The brake rotor also includes a brake track having braking surfaces to be engaged by brake pads. The brake rotor has a rotational axis defining a coordinate reference. The brake track is disposed radially outward of the carrier. The brake track has an inner peripheral edge with a notch. The end portion of the arm is disposed in the notch. The brake track is axially slidable on the end portion. The notch of the brake track is at least partially defined by a lip that is disposed radially inward relative to the protrusion of the end portion to radially constrain the brake track relative to the carrier.

An example hub assembly for a bicycle includes a hub having a spoke-attachment flange, a frame attachment section, and a first spline interface between the spoke-attachment flange and the frame attachment section. The hub assembly also includes a brake rotor disposed on the hub. The hub and the brake rotor are rotatable about a rotational axis that defines a coordinate reference. The brake rotor includes a carrier and a brake track coupled to the carrier. The carrier has a second spline interface engaged with the first spline interface. The first spline interface having a greater thickness than the second spline interface. The brake rotor being axially movable on the second spline interface of the hub between the spoke-attachment flange and the frame attachment section.

An example brake caliper for a bicycle includes an outboard caliper portion to be disposed inboard of a frame of the bicycle. The outboard caliper portion includes an outboard caliper body and an outboard brake pad that is fixed relative to the outboard caliper body. The brake caliper also includes an inboard caliper portion coupled to the outboard caliper body. The inboard caliper portion is to be disposed inboard of the outboard caliper portion when the brake caliper is coupled to the bicycle. The inboard caliper portion includes an inboard caliper body and an inboard brake pad that is movable relative to the inboard caliper body.

An example front fork for a bicycle includes a first tube having a first wheel attachment portion, a second tube spaced from the first tube, where the second tube having a second wheel attachment portion, and a brake caliper disposed on an inboard side of the first tube.

An example disc brake for a bicycle includes a brake rotor to be coupled to the bicycle and rotatable about a rotational axis. The brake rotor includes a carrier to be coupled to a hub of the bicycle and a brake track having braking surfaces. The brake track is disposed radially outward of the carrier. The brake track is coupled to the carrier such that the brake track is axially movable relative to the carrier. The example disc brake also includes a brake caliper to be coupled to the bicycle relative to the brake rotor. The brake caliper includes a body, a first brake pad fixed relative to the body, and a second brake pad that is moveable relative to the body, such that when the brake caliper is actuated, the second brake pad engages the brake track and moves the brake track into engagement with the first brake pad.

BRIEF DESCRIPTION OF THE DRAWINGS

FIG. 3 is a side view of the example brake rotor of FIGS. 2A and 2B.

FIG. 4 is an enlarged view of the callout in FIG. 2A.

FIG. 5 is an enlarged view of the callout in FIG. 3.

FIG. 31 is a cross-sectional view of the example brake rotor of FIGS. 25A and 25B taken along line D-D in FIG. 30.

FIGS. 32A, 32B, and 32C are enlarged views of the callout in FIG. 31 showing an example brake track and an example positioning portion moved axially to three different positions.

FIG. 33 is a cross-sectional view of the example brake rotor of FIGS. 25A and 25B taken along line E-E in FIG. 30.

FIG. 34 is an enlarged view of the callout in FIG. 33.

FIG. 41 is a cross-sectional view of the example brake rotor of FIGS. 35A and 35B taken along line F-F in FIG. 40.

FIGS. 42A, 42B and 42C are enlarged views of the callout in FIG. 41 showing an example brake track and an example stop moved axially to three different positions.

FIG. 43 is a cross-sectional view of the example brake rotor of FIGS. 35A and 35B taken along line G-G in FIG. 40.

FIG. 44 is an enlarged view of the callout in FIG. 43.

FIGS. 49A, 49B, and 49C are enlarged views of the callout in FIG. 48 showing the example brake rotor moved axially to three different positions.

FIGS. 66 and 67 show an example front brake caliper coupled to a tube of the example lower tube assembly.

5

Figure 67:
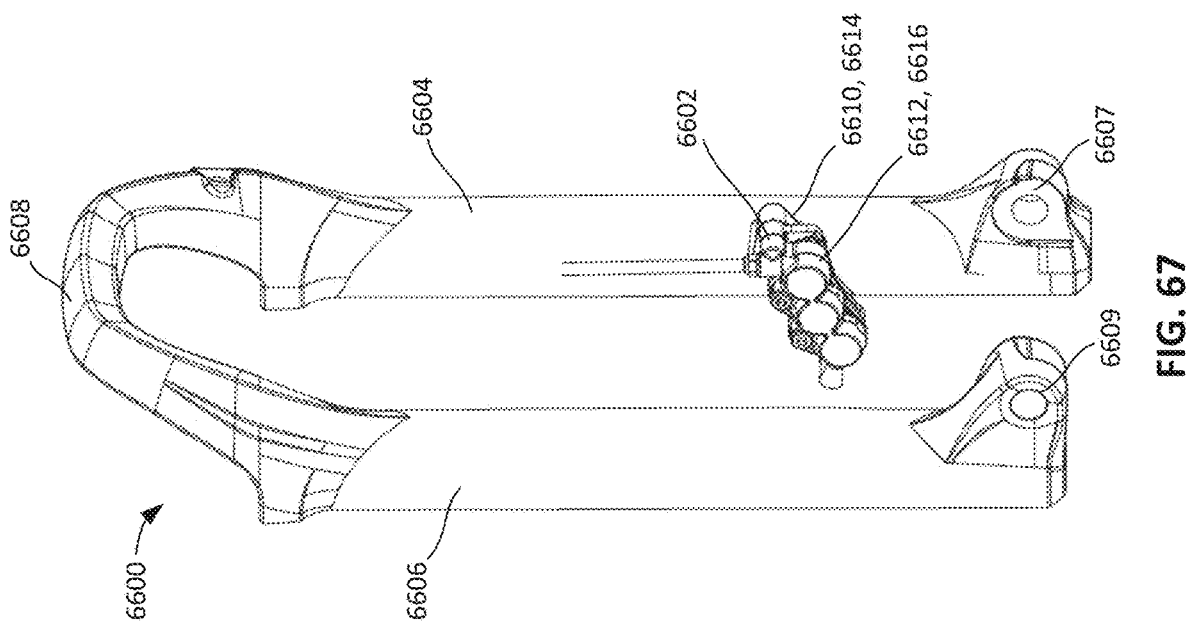
FIGS. 66 and 67 are perspective views of an example lower tube assembly that can be implemented in the example front fork of FIG. 65.
Figure 66:
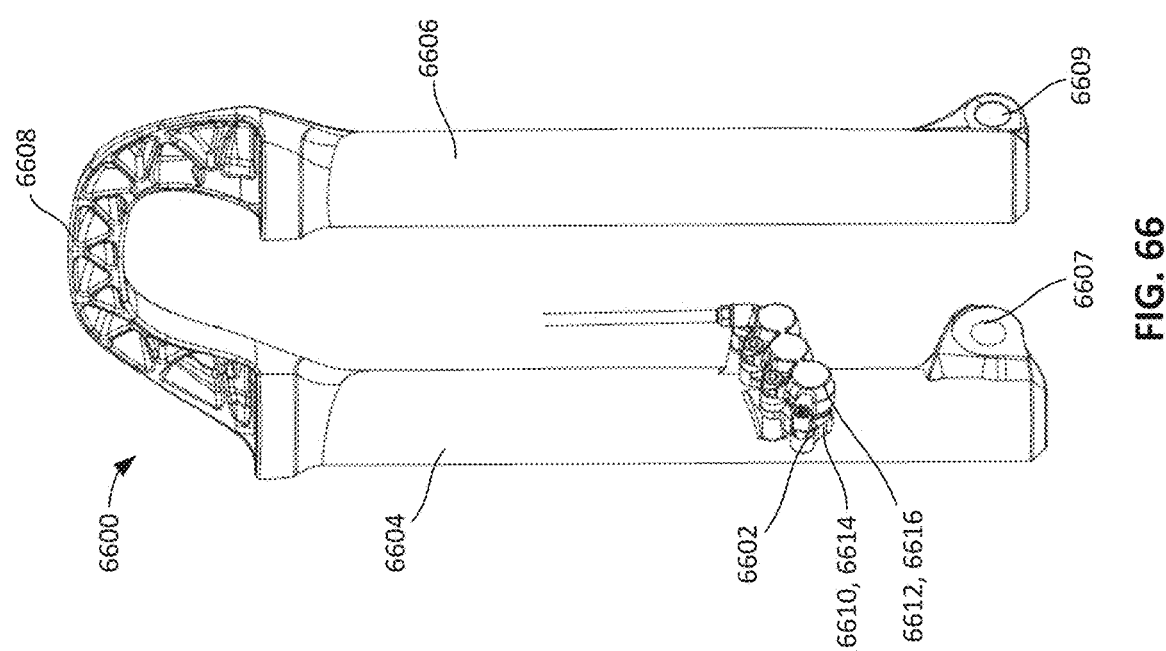
Figure 69:
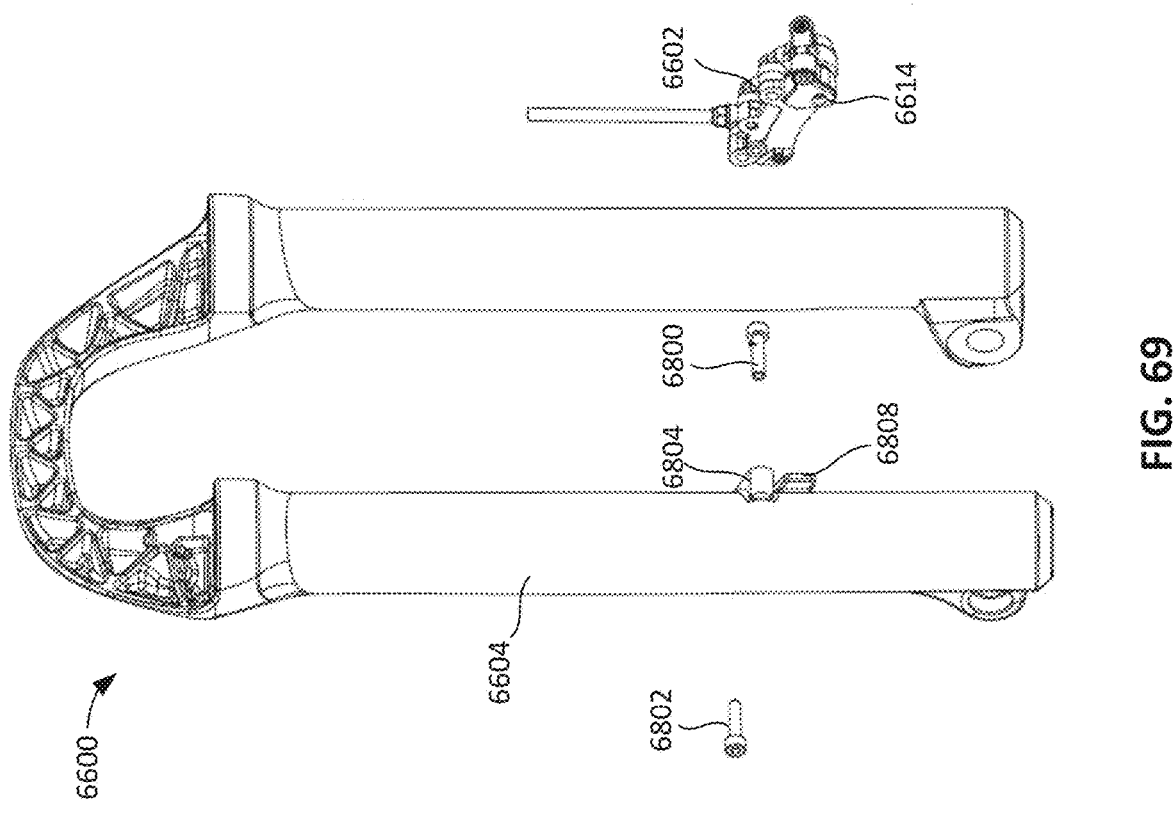
Figure 68:
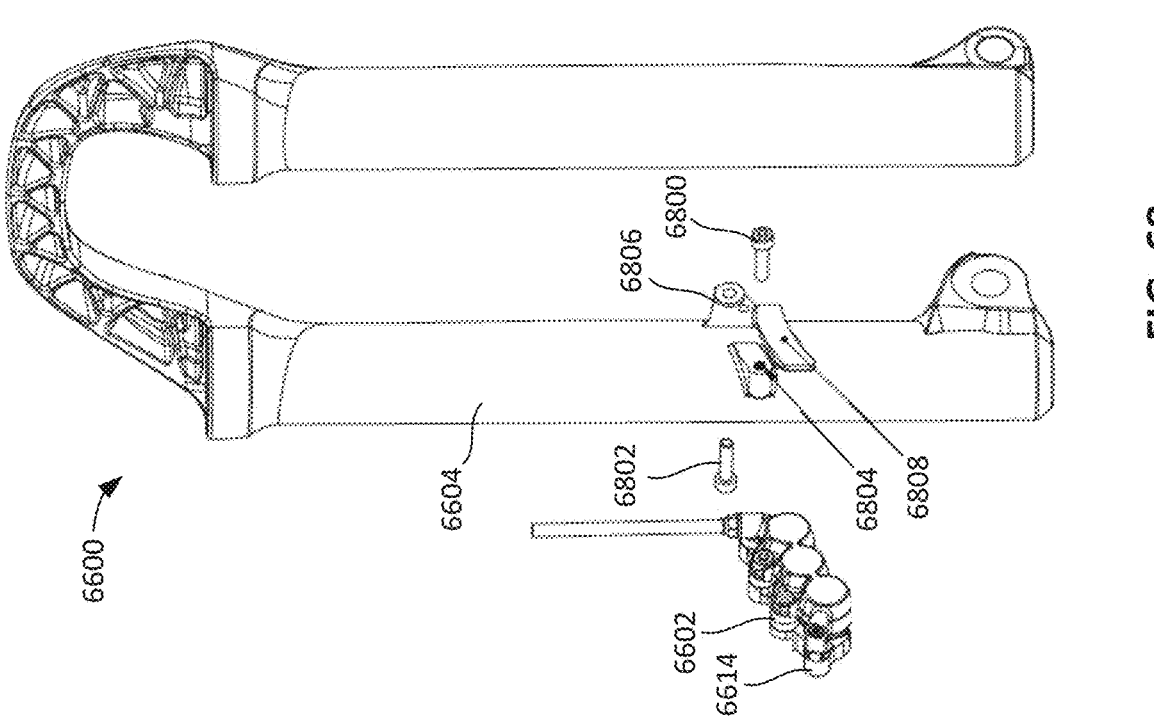

FIGS. 68 and 69 are exploded views of the example lower tube assembly and the example front brake caliper of FIGS. 66 and 67.

Figure 70:
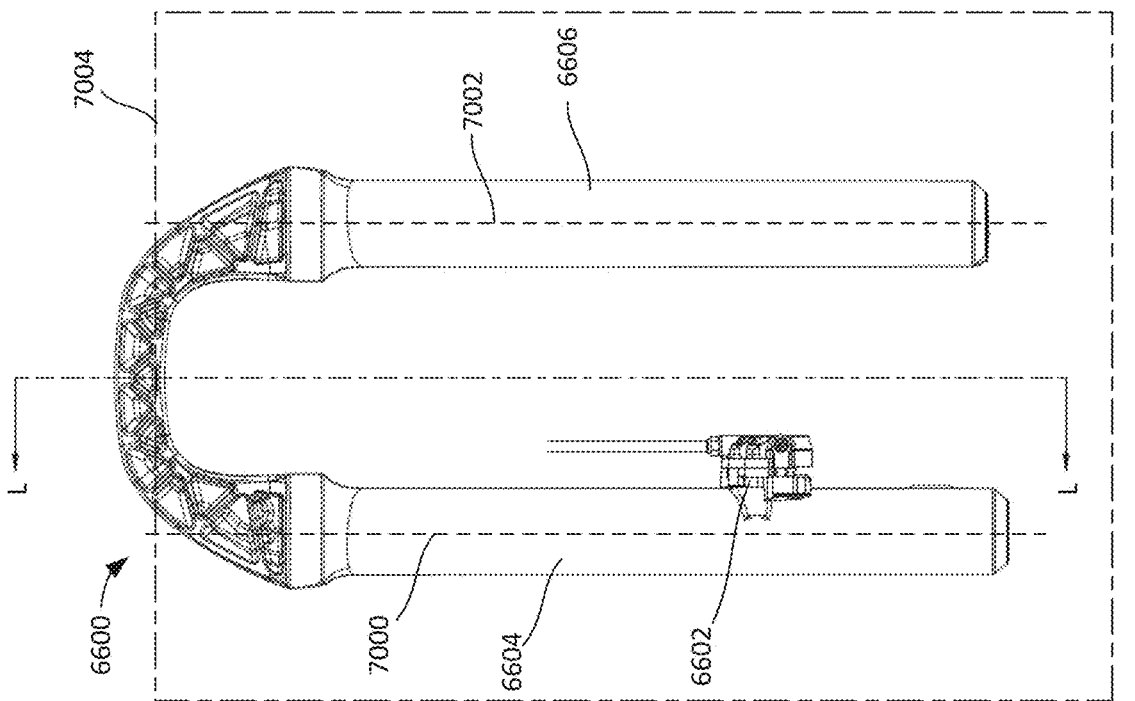

FIG. 70 is a rear view of the example lower tube assembly and the example front brake caliper of FIGS. 66 and 67.

Figure 71:
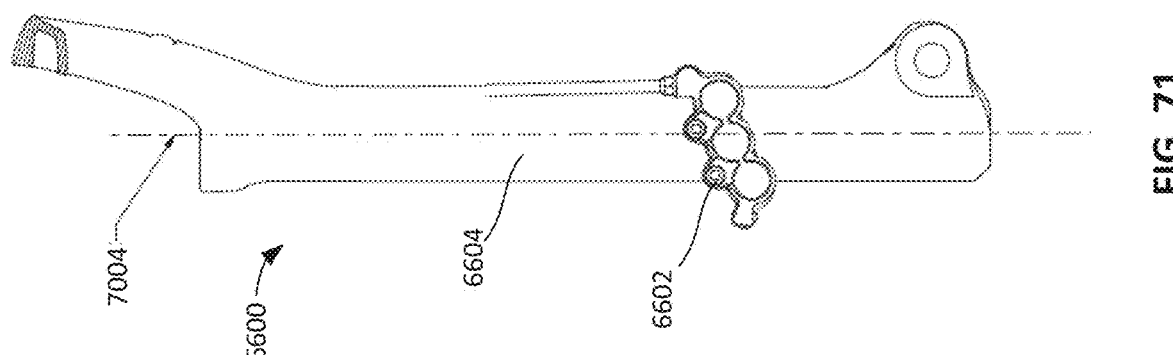

FIG. 71 is a cross-sectional view of the example lower tube assembly taken along line L-L of FIG. 70.

Figure 65:
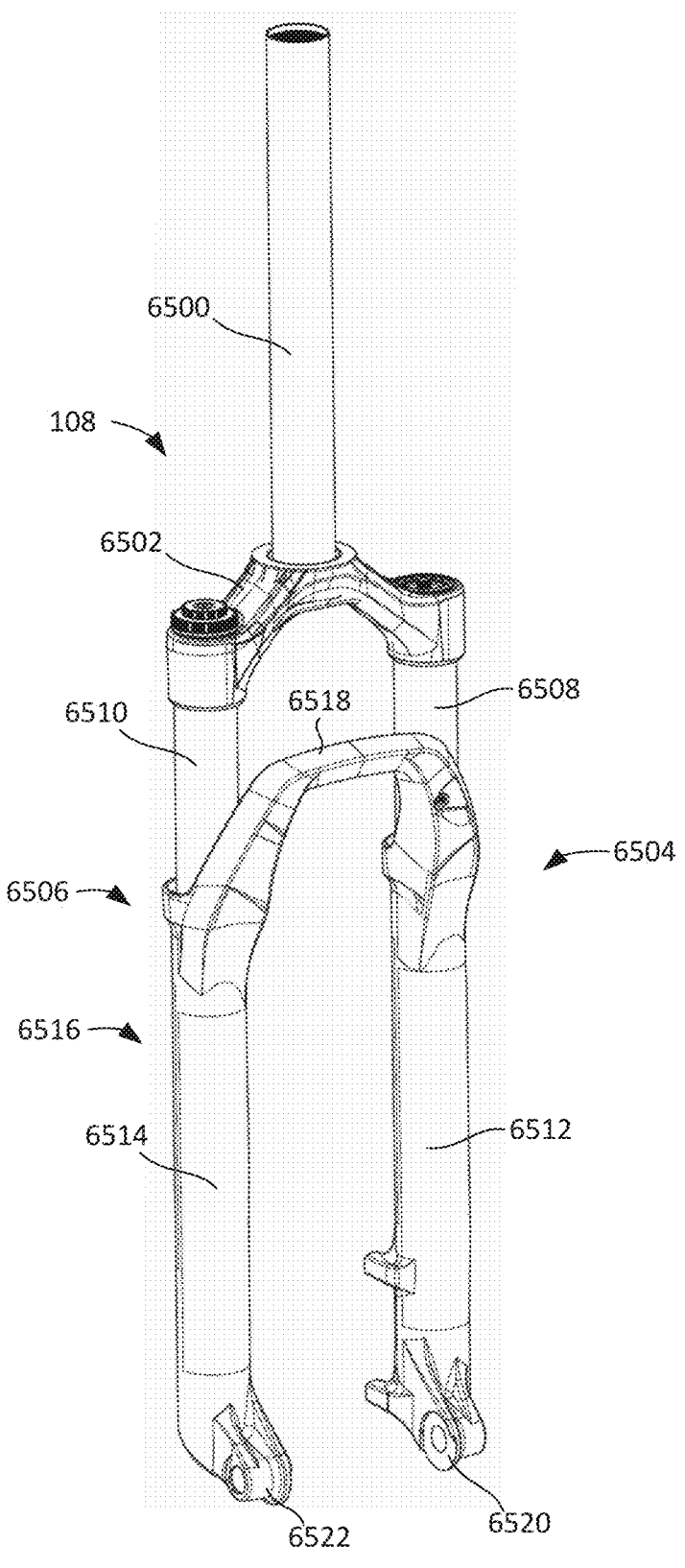
FIG. 65 is a perspective view of an example front fork that can be implemented on the example bicycle of FIG. 1.
Figure 73:
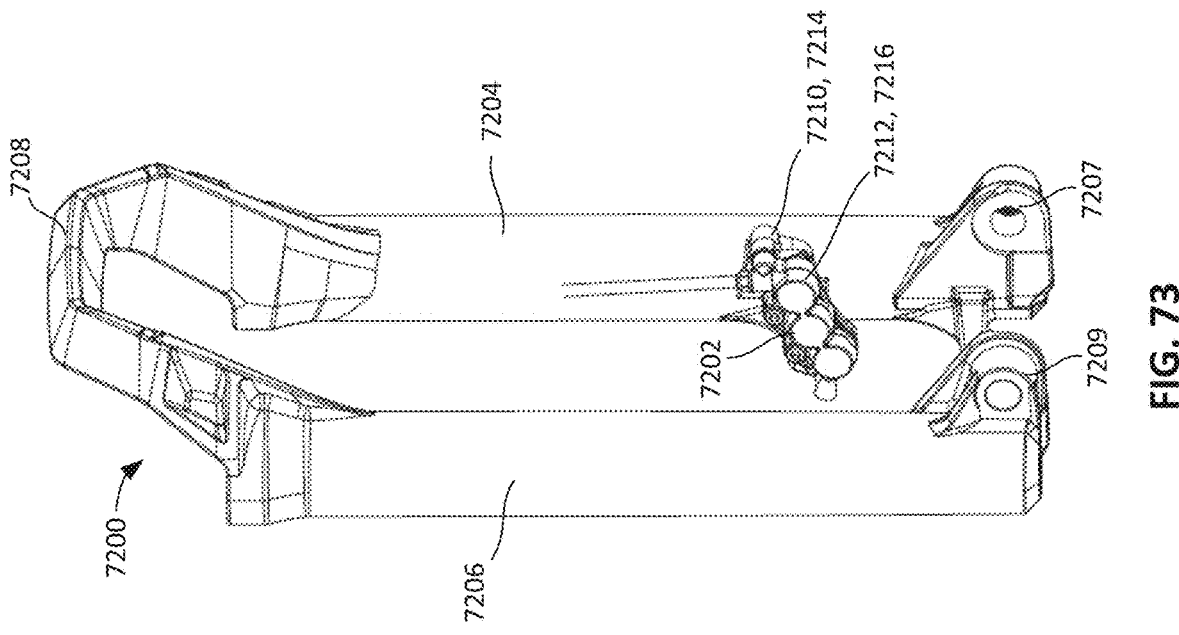
Figure 72:
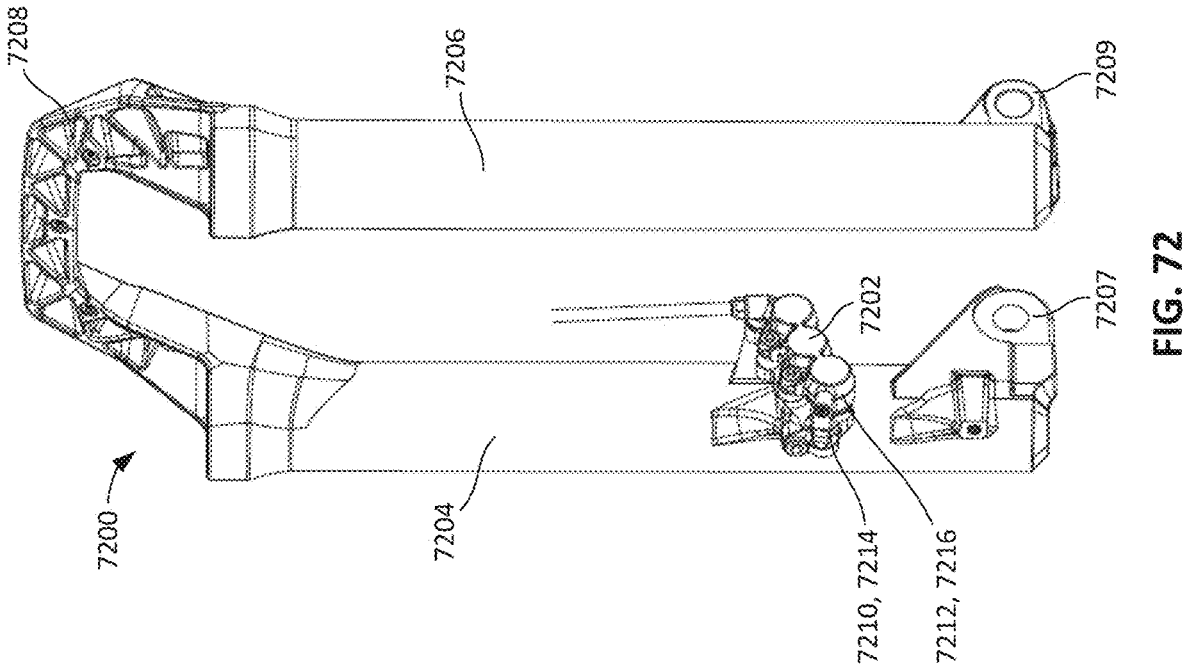

FIGS. 72 and 73 are perspective views of another example lower tube assembly that can be implemented in the example front fork of FIG. 65. FIGS. 72 and 73 show another example front brake caliper coupled to a tube of the example lower tube assembly.

Figures 74, 75:
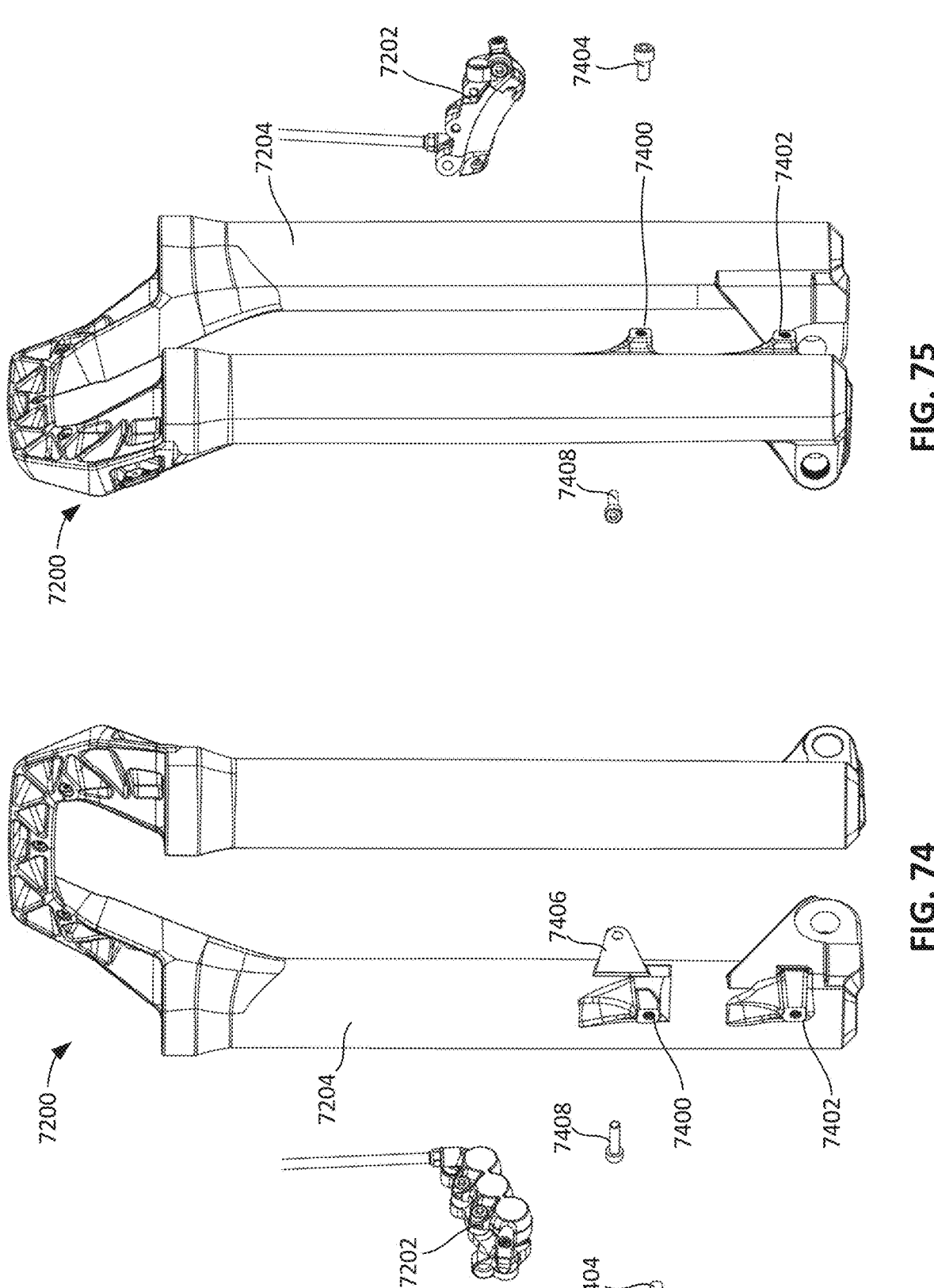

FIGS. 74 and 75 are exploded views of the example lower tube assembly and the example front brake caliper of FIGS. 72 and 73.

Figure 76:
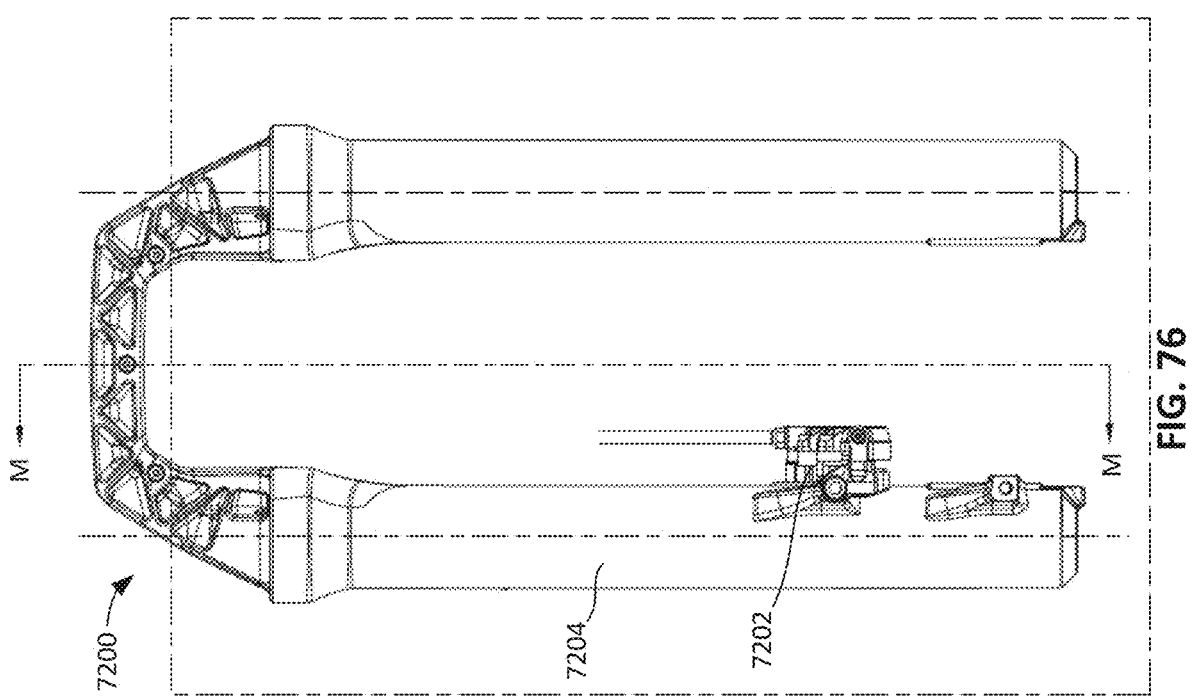

FIG. 76 is a rear view of the example lower tube assembly and the example front brake caliper of FIGS. 72 and 73.

Figure 77:
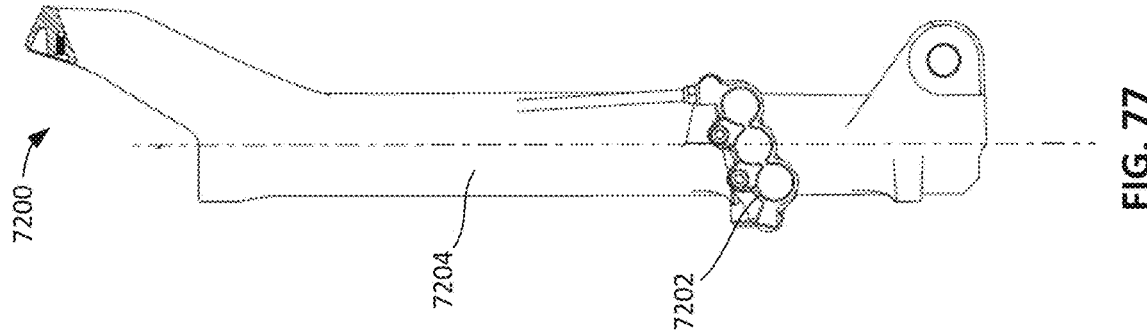

FIG. 77 is a cross-sectional view of the example lower tube assembly taken along line M-M of FIG. 76.

Figure 78:
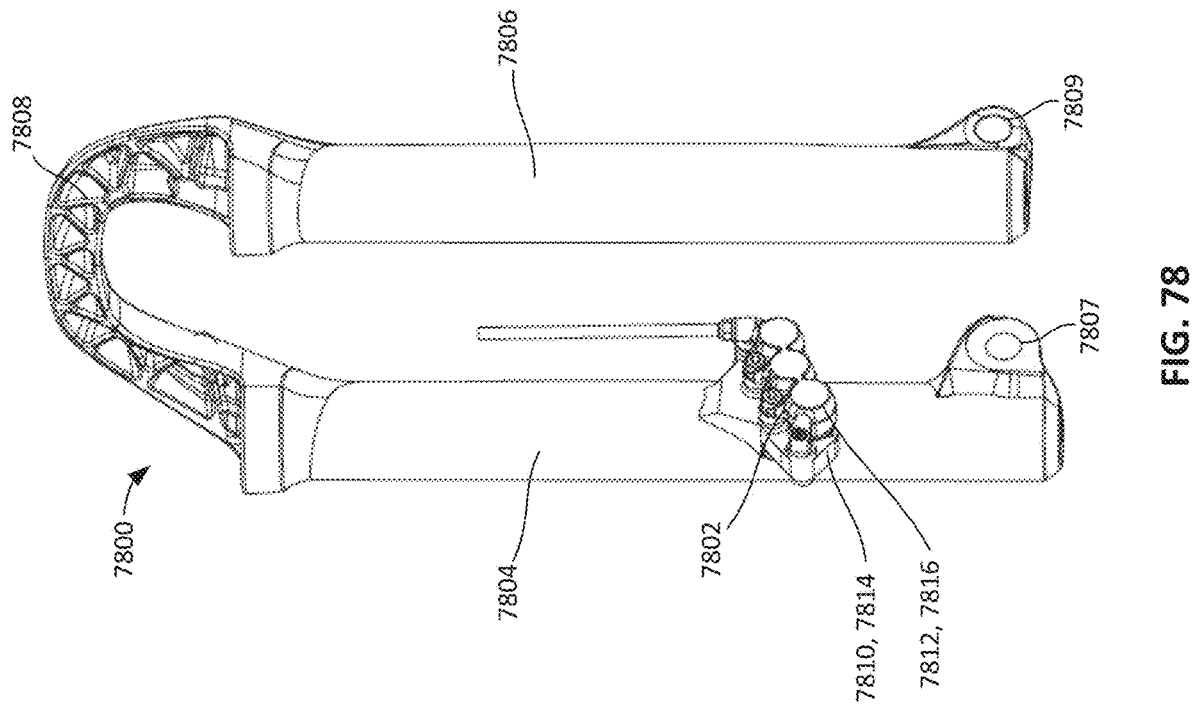

FIG. 78 is perspective view of another example lower tube assembly that can be implemented in the example front fork of FIG. 65. FIG. 78 shows another example front brake caliper coupled to a tube of the example lower tube assembly.

Figures 79, 80:
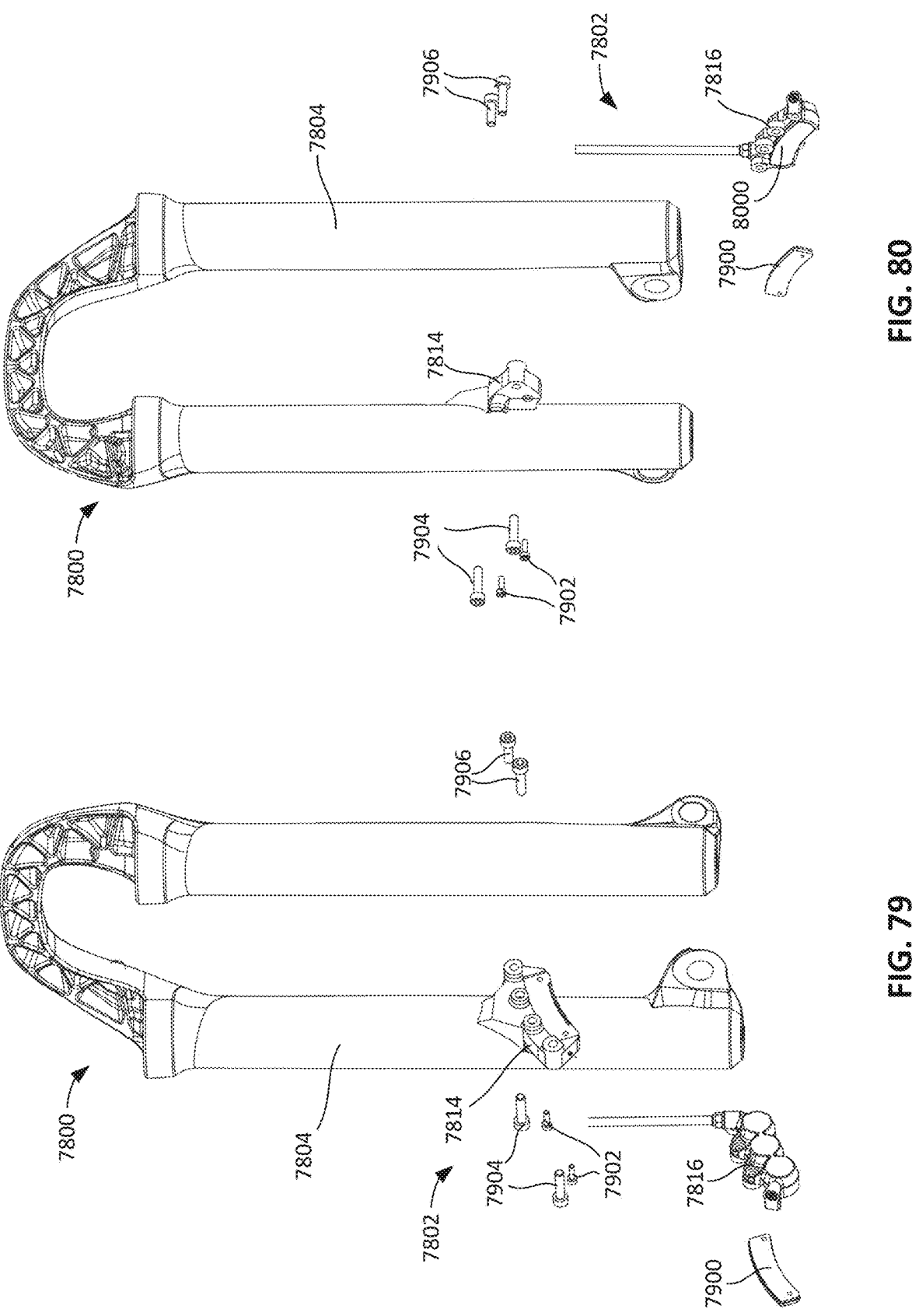

FIGS. 79 and 80 are exploded views of the example lower tube assembly and the example front brake caliper of FIG. 78.

The figures are not to scale. Instead, the thickness of the layers or regions may be enlarged in the drawings. In general, the same reference numbers will be used throughout the drawing(s) and accompanying written description to refer to the same or like parts.

Descriptors "first," "second," "third," etc. are used herein when identifying multiple elements or components that may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Brakes on modern bicycles (including electric bicycles (e-bikes)) have evolved to utilize technology from automotive braking systems, such as disc brakes. Disc brakes have greater stopping power and deceleration control than traditional rim and cable pull brakes used in the past. The front and/or rear brakes on a bicycle may be implemented as disc brakes.

A disc brake includes a brake rotor and a brake caliper. The brake rotor is typically coupled to and rotates with a hub on a wheel of the bicycle. The brake caliper is mounted to a stationary part of the bicycle near the brake rotor. When the brake caliper is actuated, the brake caliper moves two brake pads into engagement with the outer surface(s) of the brake rotor. The friction between the brake pads and the brake rotor causes the brake rotor to slow, thereby reducing the speed of the wheel and, thus, the bicycle.

When not braking, it is undesired for the brake rotor to contact the brake pads as this generates wasteful rolling friction that slows the bicycle and causes unnecessary wear on the brake rotor and brake pads. This contact may also cause undesirable noise (e.g., brake squeaking). Current disc brake assembly requires a painstaking adjustment process to ensure the brake rotor is centered between the brake pads to avoid non-braking contact. Often, the brake rotor needs multiple shims or spacers to aid in this centering adjustment.

Also, as the brake pads wear over time, the pistons of the brake caliper automatically self-advance to make up for the worn pad material. However, self-advancing pistons seldom advance the same from one side to the other. As such, the brake pads engage the sides of the brake rotor at different times and/or with different forces. This leads to unbalanced braking forces, undesired brake rub, and uneven pad wear. Typically the brake rotor needs to be adjusted to re-center the brake rotor between the brake pads, and the cycle repeats.

As used herein, the terms "axial," "axially" and other variations thereof mean a direction that that coincides with or is parallel to a rotational axis, which may be defined by a brake rotor and/or a hub. The terms "radial," "radially," and other variations thereof mean a direction that extends orthogonally from the rotational axis, and which can include a radially inward direction that is toward the rotational axis or a radially outward direction that is away from the rotational axis. The terms "circumferential," "circumferentially," and other variations thereof mean a direction that extends concentrically around the rotational axis. As used herein, the term "inboard" means in the axial direction toward a center plane of a wheel or other rotatable object. As used herein, the term "outboard" means in the axial direction away from the center plane of the wheel or other rotatable object.

Disclosed herein are example self-centering or floating brake rotors that address at least the drawbacks noted above. The example brake rotors disclosed herein are movable in the axial direction, which allows the brake rotor to find its center position between the brake pads each time the brake pads are applied. When the brake pads retract, the brake rotor maintains its centered position without the need for a spring or biasing device. The example brake rotors disclosed herein are axially movable a sufficient amount to account for brake assembly dimensional variances and brake pad wear. Therefore, as the brake pads wear over time, the brake rotor readjusts itself to a new center position. This reduces or eliminates the need to finely adjust the location of the brake rotor when initially installing the brake rotor and over time as required with traditional brake rotors. The example brake rotors disclosed herein also reduce or eliminate unbalanced braking forces and unnecessary brake rub, thereby improving braking performance and prolonging the life cycle of the brake components. While the example brake rotors may be movable in the axial direction, the example brake rotors are constrained in the radial and circumferential directions, which ensures the braking surfaces of the brake rotor remain radially aligned with the brake pads and that braking loads are transferred to the hub. Therefore, the example brake rotors disclosed herein benefit from being radially and circumferentially aligned with the brake pads, but movable in the axial direction to ensure the brake rotor remains centered between the brake pads. In some examples disclosed herein, only a portion of the brake rotor is axially movable, such as the brake track. In other examples disclosed herein, the entire brake rotor is axially movable on the hub. The axial movement disclosed herein may be considered unbiased friction sliding, meaning no spring bias but some frictional resistance.

An example brake rotor disclosed herein includes a carrier that attaches to a hub of the bicycle and a brake track that is disposed radially outward of the carrier and coupled to the carrier. The carrier has a set of radially extending arms that have end portions. The arms have end portions are disposed in notches formed on an inner peripheral edge of the brake track. The brake track is axially slidable on the end portions and, thus, axially movable relative to the carrier. The carrier is wider than the brake track. As such, the brake track can slide axially on the carrier without extending beyond the sides of the carrier. The end portions have a unique shape or profile that matches the shape of the notches. For example, the end portions may be keyed and/or dovetailed to the track. This shape enables the brake track to move axially relative to the carrier, but constrains or restricts movement of the brake track in the radial and circumferential directions relative to the carrier.

The sliding interface between the brake track and the carrier creates a friction force, which is the result of a coefficient of friction between the two bodies. The friction force is an amount such that the brake track can move (e.g., slide) axially on the carrier when engaged by the brake pads to re-center itself, but when the brake pads are released, the brake track remains in substantially the same axial position on the carrier. In other words, when the brake pads are applied, the net force (if unbalanced) of the brake pads exceeds the frictional force and moves the brake track axially until the friction exceeds the net force, thereby centering the brake track between the brake pads. When the pads are retracted and no braking force is applied, the frictional force is sufficient to hold the brake track in the same axial position, so the brake track remains centered until the brake pads are applied again. Thus, the brake track is axially movable without any springs or bias devices.

In some examples disclosed herein, the brake track is unconstrained in the axial direction. As such, the brake track can be completely removed from the carrier by sliding the brake track axially relative to the carrier. However, when installed on the bicycle, the brake pads may prevent the brake track from moving axially beyond a certain amount. In some examples, the brake track is axially movable on the carrier at least the full range or distance between the brake pads in their open position. In other words, when the brake pads are in their retracted or open state, the brake rotor can move axially to any position between the two brake pads. In some examples, the range of axial movement is even greater than the original distance between the brake pads, so that when the brake pads wear and their distance increases, the brake rotor is movable through the complete distance between the brake pads.

In some examples disclosed herein, the brake rotor includes one or more stops that limit the axial movement in one or both axial directions beyond a certain amount. The stop(s) can be coupled to the brake track, the carrier, and/or another structure adjacent the brake rotor. For example, in some example brake rotors disclosed herein, one or more pins are disposed in openings formed in the brake rotor. Each pin has a head (a first stop) on one side of the brake rotor and a clip (a second stop) on the opposite side of the brake rotor. The head and the pin overlap with the brake track in the axial direction, thereby limiting axial movement of the brake track and defining the outer boundaries of the axial movement.

In some examples disclosed herein, a brake rotor includes one or more positioning portions with thermal dissipation elements (e.g., cooling fins) that are coupled to a side of the brake track. The positioning portions help dissipate heat from the brake track. The positioning portions may be constructed of aluminum, for example. The end portions of the arms of the carrier are disposed in notches formed in the positioning portions. The end portions the arms have tabs that extend upward. The tabs act as a first stop when the brake track is moved a certain amount in a first axial direction, and the positioning portions act as a second stop when the brake track is moved a certain amount in a second axial direction.

The brake track can be designed to be axially movable any amount. The distance of allowable axial movement is greater than a mere tolerance from a rigid connection as seen in known brake rotors. In some examples, the brake track is movable in the axial direction relative to the carrier at least a distance of 0.1 millimeters (mm) (or ±0.05 mm from a center position). In some examples, the brake rotor is designed to allow a certain axial movement based on a factor of the thickness of the brake track. For example, the brake track may be movable in the axial direction at least 0.1× the thickness of the brake track. For instance, if the brake track is 1.5 mm thick, the brake track may be movable at least 0.15 mm in the axial direction. In other examples, more alignment range may be desired and the brake rotor is designed such that the brake track is movable more or less than 0.1 mm or 0.1× the thickness of the brake track. For example, the brake track may be movable at least 3 mm (or ±1.5 mm from a center position). As another example, the brake track may be movable a distance that is at least 150% the thickness of the brake track (or ±75% the thickness of the brake track from a center position). In some examples disclosed herein, the brake track is movable within a center range, which is the distance or range between two axial limits. The center range can be any distance that is greater than the thickness of the brake track, which ensures the brake track can move axially relative to the carrier. In some examples, the brake rotor can be configured to have center range that is a specific factor of the brake track thickness, such as 1.1× the thickness of the brake track, 1.2× the thickness of the brake track, 1.3× the thickness of the brake track, etc. In some examples, the center range is the same as the thickness of the portion of the carrier on which the brake track slides. In some examples, the center range is greater than a single brake pad wear range.

In some examples disclosed herein, a brake rotor may be axially movable on a hub. For example, disclosed herein is a hub assembly including a hub and a brake rotor. The hub has a first spline interface and a carrier of the brake rotor has a central opening defined by a second spline interface. The brake rotor is disposed on the hub with the hub extending through the central opening, such that the second spline interface of the carrier is engaged (e.g., meshed) with the first spline interface of the hub. In some examples, the first spline interface can be wider or deeper than the second spline interface. This enables the carrier (and, thus, the brake rotor) to slide axially on the hub for self-centering. In some examples, the brake rotor is unconstrained in the axial direction. In other examples, the hub assembly may include one or more stops to limit axial movement of the brake rotor to a certain amount.

Figure 1:
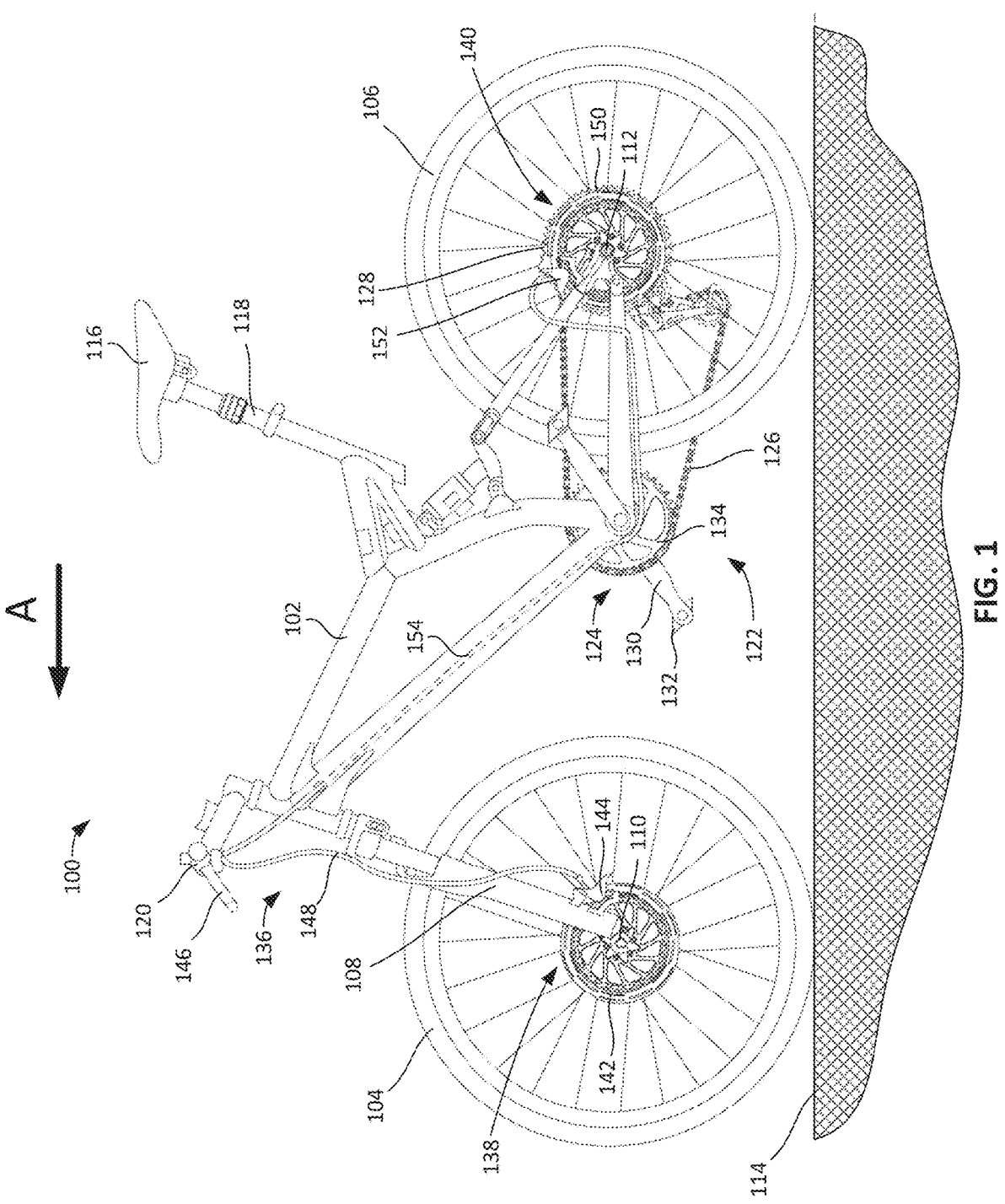
FIG. 1 is a side view of an example bicycle that may employ any of the example brake rotors, hub assemblies, and/or other components disclosed herein.

Turning now to the figures, FIG. 1 illustrates one example of a human powered vehicle on which the example brake rotors and associated components disclosed herein may be implemented. In this example, the vehicle is one possible type of bicycle 100, such as a mountain bicycle. In the illustrated example, the bicycle 100 includes a frame 102 and a front wheel 104 and a rear wheel 106 rotatably coupled to the frame 102. In the illustrated example, the front wheel 104 is coupled to the front end of the frame 102 via a front fork 108. In some examples, the front fork 108 includes one or more suspension components (e.g., a shock absorber) to absorb shocks or vibrations. The front wheel 104 is rotatably coupled to the front fork 108 via a front hub 110. The rear wheel 106 is coupled to the frame 102 to support the rear end of the frame 102. The rear wheel 106 is rotatably coupled to the frame 102 via a rear hub 112. In some examples, one or more suspension components may be coupled between the rear wheel 106 and the frame 102 to absorb shocks or vibrations. A front and/or forward riding direction or orientation of the bicycle 100 is indicated by the direction of the arrow A in FIG. 1. As such, a forward direction of movement for the bicycle 100 is indicated by the direction of the arrow A. The bicycle 100 is shown as riding on a riding surface 114. The riding surface 114 may be any riding surface such as the ground (e.g., a dirt path, a sidewalk, a street, etc.), a man-made structure above the ground (e.g., a wooden ramp), and/or any other surface.

In the illustrated example, the bicycle 100 includes a seat 116 coupled to the frame 102 (e.g., near the rear end of the frame 102 relative to the forward direction A) via a seat post 118. The bicycle 100 also includes handlebars 120 coupled to the frame 102 and the front fork 108 (e.g., near a forward end of the frame 102 relative to the forward direction A) for steering the bicycle 100. In the illustrated example, the bicycle 100 has a drivetrain 122 that includes a crank assembly 124. The crank assembly 124 is operatively coupled via a chain 126 to a sprocket assembly 128. The sprocket assembly 128 is mounted to the rear hub 112. The crank assembly 124 includes at least one, and typically two, crank arms 130 and pedals 132, along with at least one front sprocket, or chainring 134. The example bicycle 100 may include a rear gear change device (e.g., a derailleur) and/or a front gear change device to move the chain 126 through different sprockets.

The example bicycle 100 of FIG. 1 includes an example brake system 136. The example brake system 136 may be used to reduce the speed of the bicycle 100. The example brake system 136 includes a front brake 138 for slowing the rotation of the front wheel 104 and a rear brake 140 for slowing the rotation of the rear wheel 106. In this example, the front and rear brakes 138, 140 are implemented as hydraulic disc brakes. The front brake 138 includes a front brake rotor 142 (sometimes referred to as a brake disc) and a front brake caliper 144. The front brake rotor 142 is coupled to and rotates with the front wheel 104 on the front hub 110. The front brake caliper 144 is coupled to the front fork 108 adjacent the front brake rotor 142. When the front brake caliper 144 is actuated, the front brake caliper 144 moves one or more brake pads into engagement with the front brake rotor 142 to slow the front brake rotor 142 and, thus, slow the rotation of the front wheel 104. In the illustrated example, the brake system 136 includes a front brake actuator 146 (e.g., a lever) that is used to actuate the front brake caliper 144. The front brake actuator 146 is coupled to the handlebars 120. The front brake actuator 146 is fluidly coupled to the front brake caliper 144 via a first fluid line 148. In this example, the front brake actuator 146 is actuated by moving the front brake actuator 146 toward the grip on the handlebars 120. This actuation causes brake fluid to be pushed to the front brake caliper 144 to provide braking pressure on the front brake rotor 142. Conversely, the front brake actuator 146 is de-actuated by releasing or otherwise moving the front brake actuator 146 away from the grip, which relieves or reduces the braking pressure to the front brake caliper 144.

Similarly, the rear brake 140 includes a rear brake rotor 150 and a rear brake caliper 152. The rear brake rotor 150 is coupled to and rotates with the rear wheel 106 via the rear hub 112. When the rear brake caliper 152 is actuated, the rear brake caliper 152 moves one or more brake pads into engagement with the rear brake rotor 150 to slow the rear brake rotor 150 and, thus, slow the rotation of the rear wheel 106. Similar to the front brake actuator 146, the brake system 136 includes a rear brake actuator (not shown) that is coupled to the handlebars 120 and used to actuate the rear brake caliper 152. The rear brake lever is fluidly coupled to the rear brake caliper 152 via a second fluid line 154. The rear brake actuator and the rear brake caliper 152 operate similar to the front brake actuator 146 and the front brake caliper 144.

While in this example the front and rear brakes 138, 140 are hydraulically actuated, in other examples, the front and/or rear brakes 138, 140 may be cable actuated. For example, the front brake actuator 146 may be coupled to the front brake caliper 144 via a cable. When the front brake actuator 146 is moved toward the handlebars 120, the cable is pulled to actuate the front brake caliper 144. In the illustrated, the front and rear brake rotors 142, 150 are disposed on the left side of the front and rear wheels 104, 106 (when facing the direction A). In other examples, the front and/or rear brake rotors 142, 150 may be disposed on the right side of the front and rear wheels 104, 106, respectively.

While the example bicycle 100 depicted in FIG. 1 is a type of mountain bicycle, the example brakes and associated components disclosed herein can be implemented on other types of bicycles. For example, the disclosed brakes may be used on road bicycles, as well as bicycles with mechanical (e.g., cable, hydraulic, pneumatic, etc.) and non-mechanical (e.g., wired, wireless) drive systems. The disclosed brakes may also be implemented on other types of two-, three-, and four-wheeled human powered vehicles. Further, the example brakes can be used on other types of vehicles, such as motorized vehicles (e.g., a motorcycle, a car, a truck, etc.). The example brakes disclosed herein can be used with any road or trail conditions (e.g., hot, cold, wet, muddy, snowy, etc.).

Figures 2A, 2B:
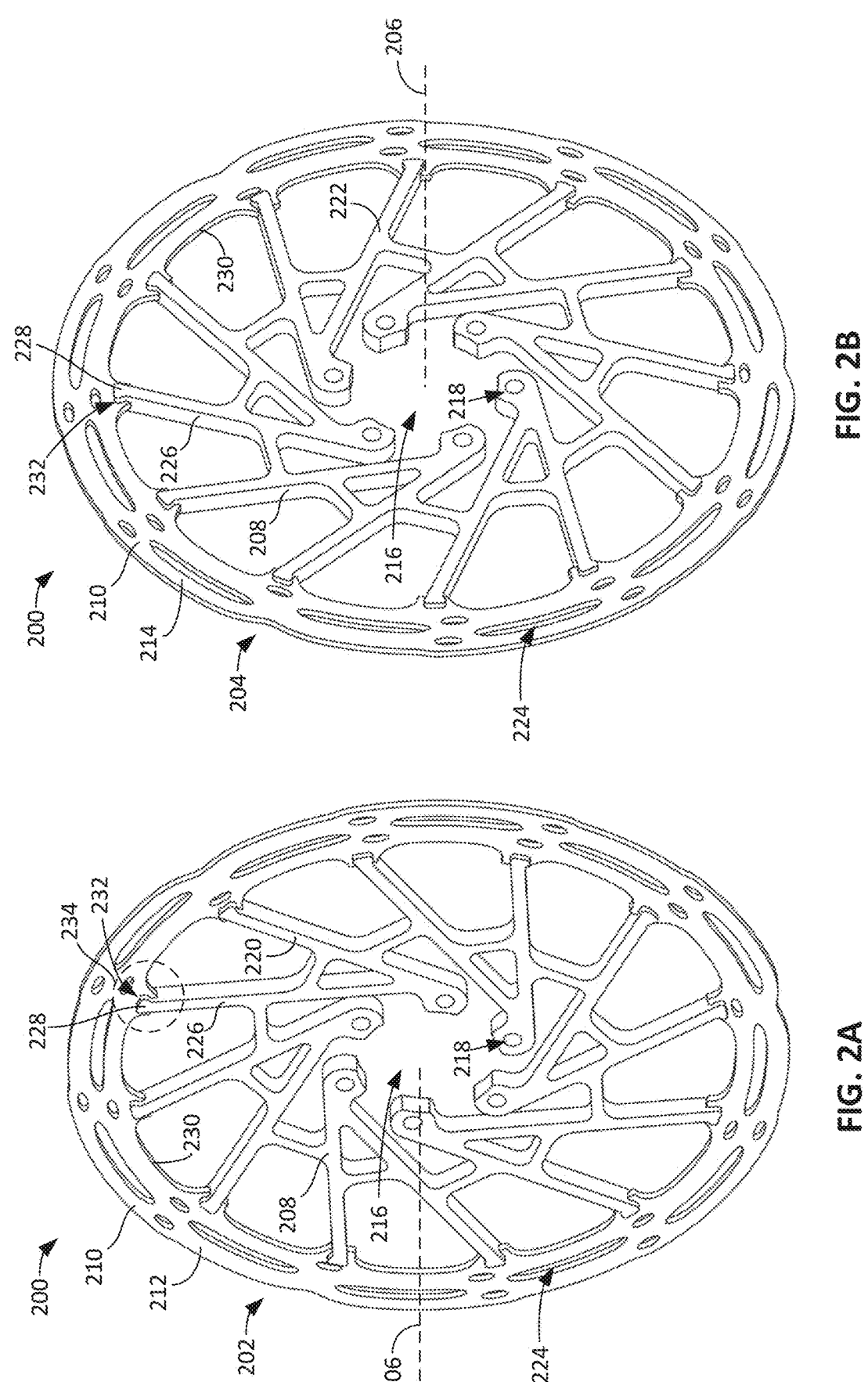
FIGS. 2A and 2B are perspective views of opposite sides of an example brake rotor constructed in accordance with the teachings of this disclosure.

FIGS. 2A and 2B illustrate an example brake rotor 200 constructed in accordance with the teachings of this disclosure. The example brake rotor 200 can be implemented on the bicycle 100 of FIG. 1, for example, as the front brake rotor 142 and/or the rear brake rotor 150. FIG. 2A is a perspective view of a first side 202 of the brake rotor 200 and FIG. 2B is a perspective view of a second side 204 of the brake rotor 200 opposite the first side 202. The brake rotor 200 has a central axis 206 that forms the rotational axis about which the brake rotor 200 rotates. This rotational axis defines a coordinate reference for the axial, radial, and circumferential directions referenced herein.

As illustrated in FIGS. 2A and 2B, the brake rotor 200 includes a carrier 208 (sometimes referred to as a spider, a core, or a hub mounting portion) and a brake track 210. The brake track 210 is disposed radially outward of the carrier 208. The brake track 210 is coupled (e.g., movably or slidably coupled) to the carrier 208, as disclosed in further detail herein. The brake track 200 has braking surfaces that are to be engaged by one or more brake pads. In particular, the brake track 210 has a first side 212 and a second side 214 opposite the first side 212. The first and second sides 212, 214 form braking surfaces that may be engaged by brake pads to slow the rotation of the brake rotor 200. The brake track 210 may be constructed of an abrasive, wear-resistant material. The brake track 210 be constructed (e.g., machined, stamped, extruded, etc.) of a single monolithic part or may be constructed of multiple parts or components coupled together.

The carrier 208 acts an intermediate structure to attach the brake track 210 to a hub of a bicycle, such as the front hub 110 or the rear hub 112 of the bicycle 100 of FIG. 1. In particular, the carrier 208 has an outer attachment section (examples of which are disclosed in further detail herein) to attach to the brake track 210 and an inner attachment portion to attach to the hub. In this example, the carrier 208 has a central opening 216 to receive the hub and a plurality of fastener openings 218 (one of which is referenced in FIGS. 2A and 2B) to receive fasteners (e.g., bolts, screws, rivets, etc.) for coupling the brake rotor 200 to the hub. The carrier 208 may include any number of fastener openings 218 to match the corresponding fastener arrangement on the hub. The central opening 216 and the fastener openings 218 form the hub interface of the carrier 208. When the carrier 208 is attached to the hub, the carrier 208 may be constrained axially, radially, and circumferentially. The carrier 208 has a first side 220 and a second side 222 opposite the first side 220. The carrier 208 can be constructed (e.g., machined, stamped, extruded, etc.) of a single monolithic part or may be constructed of multiple parts or components coupled together.

In some examples, the brake track 210 is constructed of stainless steel. Stainless steel may be desirable for being highly wear resistant. In some examples, the brake track 210 is constructed of martensitic stainless steel. For example, the brake track 210 may be constructed of 300 series or 400 series stainless steel. In other examples, the brake track 210 can be constructed of other types of stainless steel and/or other materials (e.g., austenitic stainless steel, a steel alloy, ceramic, ceramic matrix alloy, iron, carbon fiber, silicon carbide alloy, carbon/carbon, etc.). As shown in FIGS. 2A and 2B, the brake track 210 may include a plurality of openings 224 (one of which is referenced in FIGS. 2A and 2B) to improve airflow and dissipate heat. In some examples, the carrier 208 is constructed of aluminum, such as 6000 series or 7000 series aluminum. Aluminum is typically lighter than stainless steel, which helps reduce the total weight of the brake rotor 200. In other examples, the carrier 208 may be constructed of other types of aluminum and/or other materials (e.g., an aluminum alloy, a metal matrix aluminum, copper, beryllium, stainless steel (such as martensitic and/or austenitic steel), a steel alloy, ceramic, ceramic matrix alloy, iron, carbon fiber, silicon carbide alloy, carbon/carbon, etc.).

In this example, the brake track 210 is coupled to the carrier 208 such that the brake track 210 is axially movable relative to the carrier 208 while being radially and circumferentially constrained relative to the carrier 208. In other words, the brake track 210 is movable or slidable in the axial direction relative to the carrier 208, but is restricted from moving in the radial and circumferential directions relative to the carrier 208. This allows the brake track 210 to self-center during braking operations, while still remaining radially aligned with the brake pads. In this example, an axial direction is a direction that is coincident with or parallel to the central axis 206, a radial direction is a direction that is orthogonal to the central axis 206, and a circumferential direction is a direction that extends concentrically around the central axis 206.

As shown in FIGS. 2A and 2B, the carrier 208 includes a set of arms 226 (one of which is referenced in FIGS. 2A and 2B). The arms 226 may also be referred to as support members, limbs, or extensions. In the illustrated example, the carrier 208 has twelve arms 226. However, in other examples, the carrier 208 may have more or fewer arms. The arms 226 extend radially outward from the center of the brake rotor 200. The outer radial ends of the arms 226 are spaced equidistant from each other. In this example, the arms 226 are also angled or curved (relative to the radial direction) to allow for thermal expansion to avoid brake surface warping.

In the illustrated example, each of the arms 226 has an end section or portion 228 (e.g. a distal end portion). The brake track 210 is coupled (e.g., movably coupled) to the end portions 228 of the arms 226 and, thus, to the carrier 208. The brake track 210 has an inner peripheral edge 230 that forms or otherwise includes a set of notches 232 (one of which is referenced in FIGS. 2A and 2B). The notches 232 may be referred to as keyed openings or slots. The end portions 228 of the arms 226 are disposed within the respective ones of the notches 232.

FIG. 3 is a side view showing the first side 202 of the brake rotor 200. FIG. 4 is an enlarged view of the callout 234 from FIG. 2A, and FIG. 5 is an enlarged view of the callout 300 from FIG. 3. FIGS. 4 and 5 show enlarged views of the interface between one of the arms 226 of the carrier 208 and one of the notches 232 in the brake track 210. The other arms 226 and notches 232 (shown in FIGS. 2A and 2B) are identical to the arm 226 and the notch 232 shown in FIGS. 4 and 5. Thus, any of the aspects disclosed in connection with the arm 226 and the notch 232 shown in FIGS. 4 and 5 can likewise apply to the other arms 226 and notches 232. As can be seen in FIG. 4, the carrier 208 has a greater thickness than the brake track 210. As such, the brake track 210 can move or slide in the axial direction relative to the carrier 208 without extending beyond the sides of the carrier 208. As shown in FIGS. 4 and 5, the end portion 228 of the arm 226 is disposed in the notch 232 in the brake track 210. The end portion 228 is to slide in the notch 232 when the brake track 210 moves axially relative to the carrier 208. In this example, the inner peripheral edge 230 of the brake track 210 along the notch 232 is slidably engaged with an outer peripheral edge 400 of the end portion 228. These surfaces form a sliding interface as the brake track 210 moves axially relative to the carrier 208.

The example brake rotor 200 has one or more radial retaining features that restrict the brake track 210 from moving radially relative to the carrier 208, but still enable the brake track to move axially relative to the carrier. In this example, the radial retaining features are implemented by the shape of the end portions 228 of the arms 226. For example, as shown in FIGS. 4 and 5, the end portion 228 of the arm 226 has a protrusion 402 (e.g., an overhang or bulge) extending in the circumferential direction. As such, the end portion 228 has a shape or profile that increases circumferentially toward the end of the arm 226. The notch 232 has a shape that corresponds to or matches the shape of the end portion 228 of the arm 226. As shown in FIGS. 4 and 5, the brake track 210 has a lip 404. The notch 232 is at least partially defined by the lip 404. The lip 404 overlaps with the protrusion 402 in the radial direction. For example, FIG. 5 shows a radial line extending from the center axis 206 (FIGS. 2A and 2B) of the brake rotor 200. As shown, the lip 404 is disposed radially inward relative to the protrusion, which radially constrains the brake track 210 relative to the carrier 208. In other words, this prevents the brake track 210 from moving radially (outward) relative to the carrier 208. The brake track 210 is also constrained from moving radially inward by the arm 226. The arm 226 also constrains the brake track 210 from moving circumferentially relative to the carrier 208. Thus, the brake track 210 is constrained in the radial and circumferential directions. This helps ensure the brake track 210 remains radially aligned with the brake pads. As such, the end portions 228 of the arms 226 are implemented as retaining features. However, in other examples, such retaining features can be implemented on other sections of the carrier 208 that is not on the ends of the arms 226.

In the illustrated example, the end portion 228 of the arm 226 is asymmetrical. However, in other examples, the end portion 228 of the arm 226 may be symmetrical. For example, a second protrusion may extend in the opposite circumferential direction as the protrusion 402. In other examples, the end portion 228 may have a different shape, such as a rectilinear shape, a hexagonal shape, a star shape, a circular shape, a spline, etc. While in some examples each of the end portions 228 has the same shape, in other examples, the end portions 228 can have different shapes than each other.

As disclosed above, each of the other arms 226 and the corresponding notches 232 are identical to the arm 226 and the notch 232 shown in FIGS. 4 and 5. The brake rotor 200 may be assembled, for example, by sliding the brake track 210 onto the carrier 208 in the axial direction. For example, the brake track 210 can be placed axially adjacent the carrier 208 with the ends portions 228 of the arms 226 aligned with the notches 232. Then the brake track 210 can be moved axially relative to the carrier 208 (or vice versa) such that the end portions 228 of the arms 226 are inserted into the corresponding notches 232.

The end portions 228 and the notches 232 are dimensioned such that contact surfaces of the brake track 210 and the carrier 208 (i.e., the outer peripheral edges 400 of the end portions 228 and the inner peripheral edge 230 of the notches 232) slidably engage and create a friction fit between the brake track 210 and the carrier 208. The resulting friction force between the surfaces is an amount that enables the brake track 210 to slide axially on the carrier 208 when engaged with a sufficient force (e.g., 1 newton) by the brake pads, but when the brake pads are released, the friction force is sufficient to hold the brake track 210 in substantially the same axial position on the carrier 208.

In this example, the sliding surfaces that form the sliding engagement interface that enable the brake track 210 to self-center are radially outward from the hub attachment section of the carrier 208. In particular, the carrier 208 is to be coupled to the hub, and the brake track 210, which is disposed radially outward of the carrier 208, is movable relative to the carrier 208. However, in other examples, the sliding engagement interface that allows for axial movement may be formed at the hub interface. An example of such a configuration is disclosed in further detail in conjunction with FIGS. 46-49.

Figure 6:
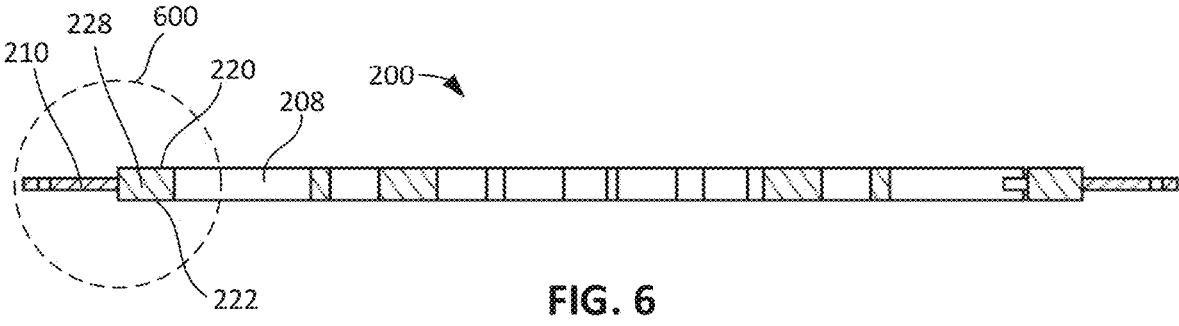
FIG. 6 is a cross-sectional view of the example brake rotor of FIGS. 2A and 2B taken along line A-A in FIG. 3.

FIG. 6 is a cross-sectional view of the example brake rotor 200 taken along line A-A of FIG. 3. The brake track 210 is disposed radially outward of the carrier 208. In particular, the brake track 210 is positioned axially between the first and second sides 220, 222 of the carrier 208 (e.g., between the first and second sides 220, 222 at the end portions 228 of the carrier 208).

Figure 7A:
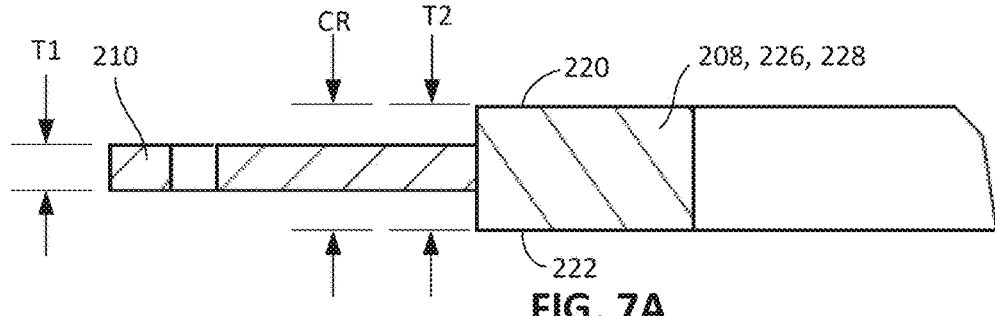
FIGS. 7A, 7B, and 7C are enlarged views of the callout in FIG. 6 showing an example brake track moved axially to three different positions.
Figure 7B:
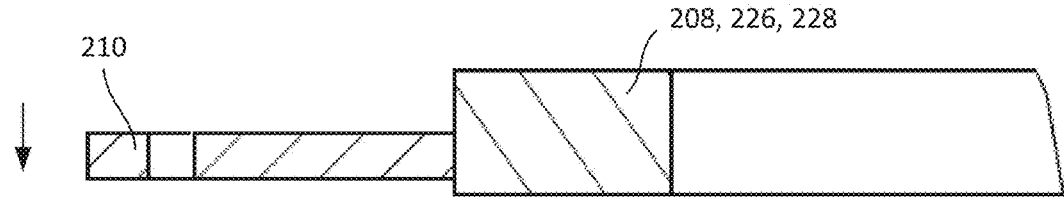
Figure 7C:
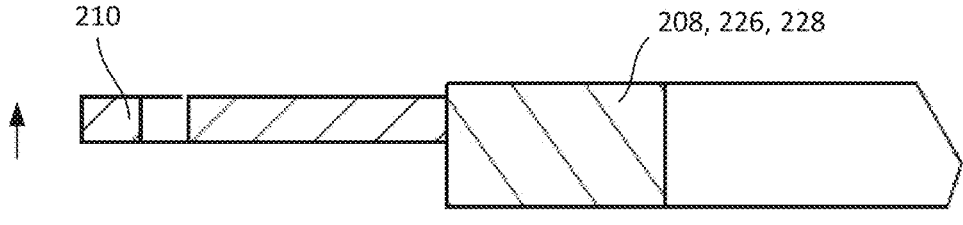

FIGS. 7A, 7B, and 7C are enlarged views of the callout 600 in FIG. 6 showing the brake track 210 in three different axial positions. FIG. 7A shows the brake track 210 in a center position in which the brake track 210 is substantially axially centered on the carrier 208. The brake track 210 is movable (e.g., slidable) in the axial direction relative to the carrier 208. For example, FIG. 7B shows the brake track 210 moved in one axial direction (e.g., inboard) to a first position (e.g., a first limit position), and FIG. 7C shows the brake track 210 moved in the opposite axial direction (e.g., outboard) to a second position (e.g., a second limit position).

As shown in FIG. 7A, the brake track 210 has a thickness T1 and the carrier 208 (e.g., the end portion 228 of the arm 226) has a thickness T2 that is greater than the thickness T1 of the brake track 210. As such, the brake track 210 can move axially relative to the carrier 208 without extending beyond the first and second sides 220, 222 of the carrier 208, which, in some examples, can be undesirable for transferring braking loads from the brake track 210 to the carrier 208. The thickness T1 of the brake track 210 can be any thickness. In some examples, the thickness T1 of the brake track 210 is about 1.85 mm (e.g., ±0.05 mm). In other examples, the thickness T1 of the brake track 210 may be greater than or less than 1.85 mm.

In some examples, the brake track 210 is movable (e.g., slidable) in the axial direction relative to the carrier 208 at least a distance of 0.1 millimeters (mm) (or ±0.05 mm from the center position in FIG. 7A). In some examples, the brake track 210 is axially movable a certain amount based on a factor of the thickness T1 of the brake track 210. For example, the brake track 210 may be movable in the axial direction at least 0.1× the thickness T1 of the brake track 210. For instance, if the brake track 210 has a thickness T1 of 1.85 mm, the brake track 210 may be movable at least 0.185 mm in the axial direction (or ±0.0925 mm from the center position in FIG. 7A). In other examples, the brake track 210 is movable more or less than 0.1 mm or 0.1× the thickness T1 of the brake track 210. In some examples, the brake track 210 is axially movable at least 3 mm (or ±1.5 mm from the center position in FIG. 7A). As another example, the brake track 210 may be axially movable a distance that is at least 150% of the thickness T1 of the brake track 210 (or ±75% the thickness T1 of the brake track 210 from the center position in FIG. 7A).

In some examples, the brake track 210 is movable within a center range CR, which defines the limits of axial movement. The brake track 210 can be positioned anywhere within the center range CR. In some examples, the center range CR can be any amount that is greater than the thickness T1 of the brake track 210. In some examples, the center range CR is configured to be a factor that is greater than the thickness T1 of the brake track 210, such as 1.1× the thickness T1 of the brake track 210, 1.2× the thickness T1 of the brake track 210, 1.3× the thickness T1 of the brake track 210, etc. For example, if the brake track 210 has a thickness T1 of 1.85 mm, then the center range CR can be any distance greater than 1.85 mm, thereby enabling the brake track 210 to move axially within the center range CR. For example, the center range CR may be 4.85 mm. The allowable axial movement of the brake track 210 is the center range CR minus the thickness T1 of the brake track 210. Therefore, in this example, the brake track 210 can move a total distance of 3 mm (or ±1.5 mm from the center position). As another example, assume the brake track 210 has a thickness T1 of 2 mm. In such an example, the center range CR may be 6 mm, which allows the brake track 210 to move 4 mm (or ±2 mm from the center position). In some examples, such as shown in FIG. 7A, the center range CR is the same as the thickness T2 of the carrier 208. In other words, the first and second sides 220, 222 of the carrier 208 may define the limits or boundaries of the allowable movement. This allows for the maximum range of movement without extending beyond the carrier 208. However, in other examples, the center range CR may be greater than or less than the thickness T2 of the carrier 208. For example, the thickness T2 of the carrier 208 may be 6 mm while the center range CR is 5.8 mm (inset 0.1 mm from each side of the carrier 208).

In this example, the brake rotor 200 does not include any stops to limit axial movement of the brake track 210 relative to the carrier 208. Therefore, the brake track 210 could be moved off of the carrier 208 in the axial direction. However, when installed on a bicycle with a brake caliper, the brake pads of the brake caliper may limit the axial movement of the brake track 210 and, thus, define the center range CR. For instance, when the brake pads are in their open position, the brake pads prevent the brake track 210 from moving too far in either axial direction. An example of this is discussed below.

Figure 8:
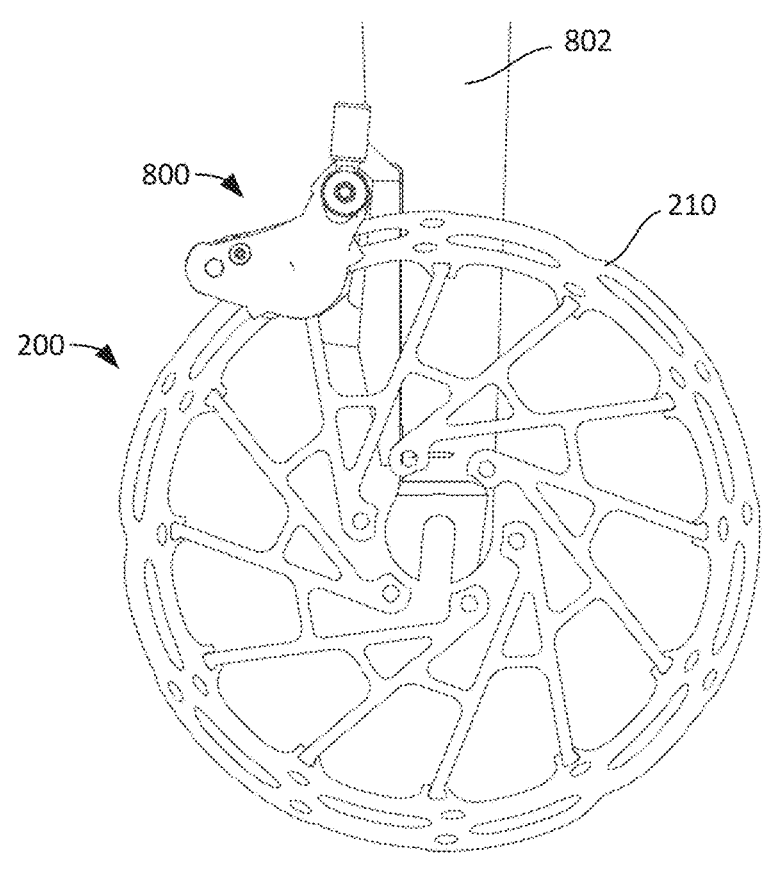
FIG. 8 is a side view of the example brake rotor of FIGS. 2A and 2B and an example brake caliper.

FIG. 8 shows the example brake rotor 200 used with an example brake caliper 800. The brake caliper 800 is mounted on a frame 802 of a bicycle. The caliper 800 may correspond of the front brake caliper 144 or the rear brake caliper 152 on the bicycle 100 of FIG. 1, for example. The brake track 210 extends into the brake caliper 800.

Figure 9:
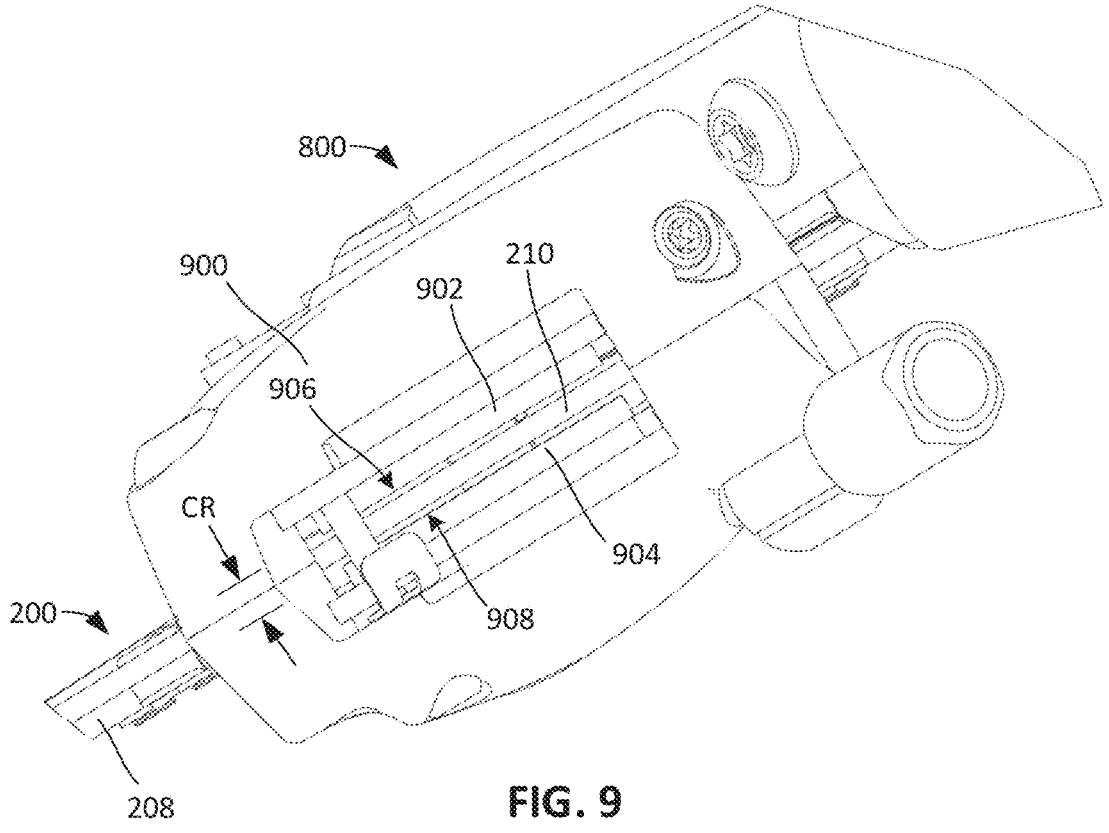
FIG. 9 is an end view of the example brake rotor and the example brake caliper of FIG. 8.

FIG. 9 is a top or end view of the caliper 800 showing the brake rotor 200 within the caliper 800. The caliper 800 has a body 900 (e.g., a housing) and first and second brake pads 902, 904 that are movable relative to the body 900. The first and second brake pads 902, 904 are disposed on opposite sides of the brake track 210. In FIG. 9, the brake pads 902, 904 are in their fully open or retracted position. When the brake caliper 800 is activated (e.g., via hydraulic and/or mechanical actuation), the brake pads 902, 904 are moved toward each other and engage opposite sides of the brake track 210, thereby clamping the brake rotor 200 between the brake pads 902, 904. The frictional engagement between the brake pads 902, 904 and the sides of the brake track 210 slows the rotation of the brake track 210 and, thus, slows the rotation of the associated wheel. When braking force is released, the brake pads 902, 904 retract or move outward away from the brake track 210 to their fully open position.

As shown in FIG. 9, when the brake pads 902, 904 are fully retracted, the first brake pad 902 is spaced from the brake track 210 by a first gap 906, and the second brake pad 904 is separated from the brake track 210 by a second gap 908. Generally, it is desired to have the brake track 210 centered between the brake pads 902, 904, so that when the brake is applied, the brake pads 902, 904 come into contact with the sides of the brake track 210 at substantially the same time and apply substantially the same force. However, over time, the brake pads 902, 904 and/or the sides of the brake track 210 may wear at different rates. As such, the size of the gaps 906, 908 may change over time. With known brake rotors, this results in uneven braking force because one of the brake pads 902, 904 engages the brake track prior to the other brake pad 902, 904. As disclosed herein, the brake track 210 of the example brake rotor 200 is axially movable on the carrier 208. Therefore, if the brake rotor 200 is not centered between the brake pads 902, 904 when the brake is applied, one of the brake pads 902, 904 moves (e.g., pushes) the brake track 210 axially to a position where the brake pads 902, 904 apply substantially the same force, i.e., a center position between the brake pads 902, 904. In particular, if there is unbalanced force from the brake pads 902, 904 on the brake track 210, the net force overcomes the friction force (between the brake track 210 and the carrier 208) and causes the brake track 210 to slide relative to the carrier 208 to a position where there is substantially balanced forced on the opposite sides of the brake track 210. In this manner, the brake rotor 210 self-centers between the brake pads 902, 904, which allows substantially balanced braking force on the opposite sides of the brake track 210, and which ensures the brake track 210 is spaced apart from the brake pads 902, 904 when the brake pads 902, 904 are retracted. When the brake is released and the brake pads 902, 904 are retracted to their fully open position (as shown in FIG. 9), the brake track 210 remains in the new centered positioned via the static friction between the brake track 210 and the carrier 208. As such, the brake track 210 is centered between the brake pads 902, 904 for the next braking operation. This ensure an appropriate gap is formed between the brake track 210 and the brake pads 902, 904 to avoid unnecessary brake contact. This adjustment may occur each time there is an unbalanced force or contact of the brake pads 902, 904 on the brake track 210. In brake calipers with opposing slave pistons, the brake pads 902 904 retract approximately equal distances away from the brake track 210. In brake calipers with single side slave pistons, the brake pads 902, 904 retract unequal distances away from the brake track 210. Whether the brake rotor 200 is used with a brake caliper having opposing or single side slave pistons, the brake track 210 maintains its new position between the brake pads 902 904. Thus, the example brake rotor 200 reduces or eliminates the need to constantly adjust the position of the brake rotor 200 over time as required with known brake rotors.

This self-centering effect also helps when initially installing the brake rotor 200 and the brake caliper 800 on a bicycle. In particular, with known brake rotors, it is typically a pain-staking process to align the brake track between the brake pads 902, 904. Typically a person uses shims to finely adjust the exact location of the brake rotor. On the other hand, the example brake rotor 200 can be installed without shims (or with minimal shims), because the brake track 200 self-centers once the brake is applied. This greatly reduces labor costs and time associated with assembly and maintenance of the bicycle.

In this example, the center range CR is defined by the distance between the first and second brake pads 902, 904 in their fully open position. As disclosed above, in some examples, the center range CR may correspond to the thickness T2 of the carrier 208. In other examples, the center range CR may be greater than or less than the thickness T2 of the carrier 208. In some examples, as the brake pads 902, 904 and/or the brake track 210 wear over time, the center range CR increases and/or changes location (e.g., shifts slightly inboard or outboard).

While the example brake rotor 200 does not have any stops, in other examples, one or more stops could be coupled to or formed on the brake rotor 200 to define the center range CR. For example, a lip could be formed on the end portion 228 of one or more of the arms 226. Example stops are disclosed in further detail herein.

Figures 10A, 10B:
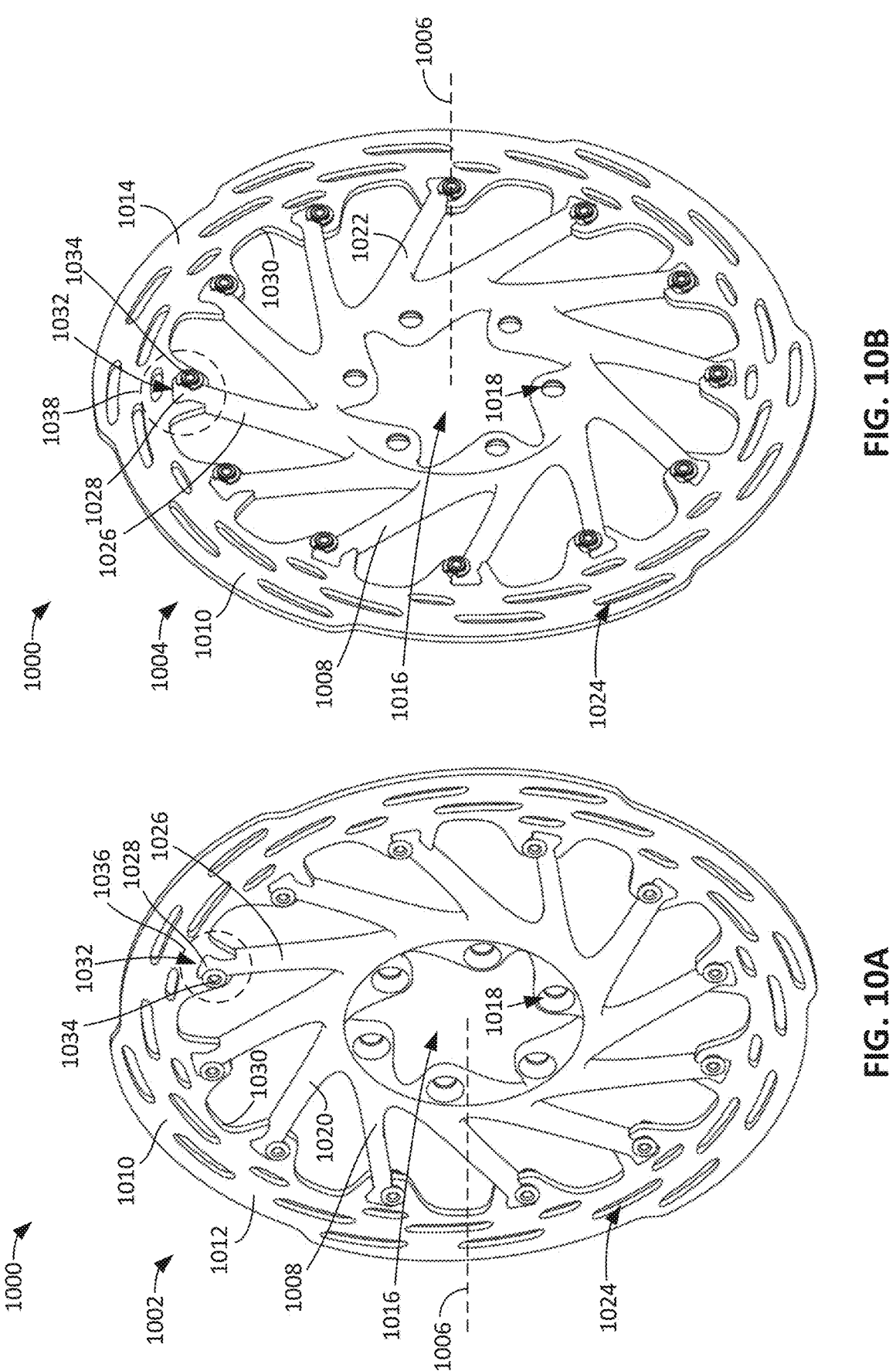
FIGS. 10A and 10B are perspective views of opposite sides of an example brake rotor constructed in accordance with the teachings of this disclosure.

FIGS. 10A and 10B illustrate another example brake rotor 1000 constructed in accordance with the teachings of this disclosure. The example brake rotor 1000 can be implemented on the bicycle 100 of FIG. 1, for example, as the front brake rotor 142 and/or the rear brake rotor 150. FIG. 10A is a perspective view of a first side 1002 of the brake rotor 1000 and FIG. 10B is a perspective view of a second side 1004 of the brake rotor 1000 opposite the first side 1002. The brake rotor 1000 has a central axis 1006 that forms the rotational axis about which the brake rotor 1000 rotates. The brake rotor 1000 is substantially the same as the brake rotor 200 of FIGS. 2A and 2B. In particular, the brake rotor 1000 includes a carrier 1008, a brake track 1010 that is disposed radially outward of the carrier 1008, a first side 1012 and a second side 1014 of the brake track 1010 (which form the braking surfaces), a central opening 1016 in the carrier 1008 to receive a hub, a plurality of fastener openings 1018, a first side 1020 and a second side 1022 of the carrier 1008, a plurality of openings 1024 in the brake track 1010, a set of arms 1026 having end portions 1028, and an inner peripheral edge 1030 forming notches 1032 on the brake track 1010. The brake track 1010 is slidable in the axial direction on the end portions 1028 of the arms 1026 but constrained in the radial and circumferential directions in the same manner as in the brake rotor 200 disclosed above. To avoid redundancy, a full description of the carrier 1008 and the brake track 1010 is not provided. Instead, it is understood that any of the example structural and/or functional aspects disclosed above in connection with the brake rotor 200 likewise apply to the brake rotor 1000.

In this example, the brake rotor 1000 includes stops to limit the axial movement of the brake track 1010 relative to the carrier 1008 and thereby define the center range CR. For example, as shown in FIGS. 10A and 10B, the brake rotor 1000 includes a set of pins 1034 (one of which is referenced in FIGS. 10A and 10B). In this example, the brake rotor 1000 includes the same number of pins 1034 as the arms 1026, and each of the pins 1034 is associated with one of the arms 1026. In other examples, the brake rotor 1000 may include more or fewer pins (e.g., one, two, three, etc.). Each of the pins 1034 extends through an opening formed in the brake rotor 1000. The pins 1034 limit the axial movement of the brake track 1010 relative to the carrier 1008 and prevent the brake track 1010 from moving too far in one axial direction or the other.

Figure 11:
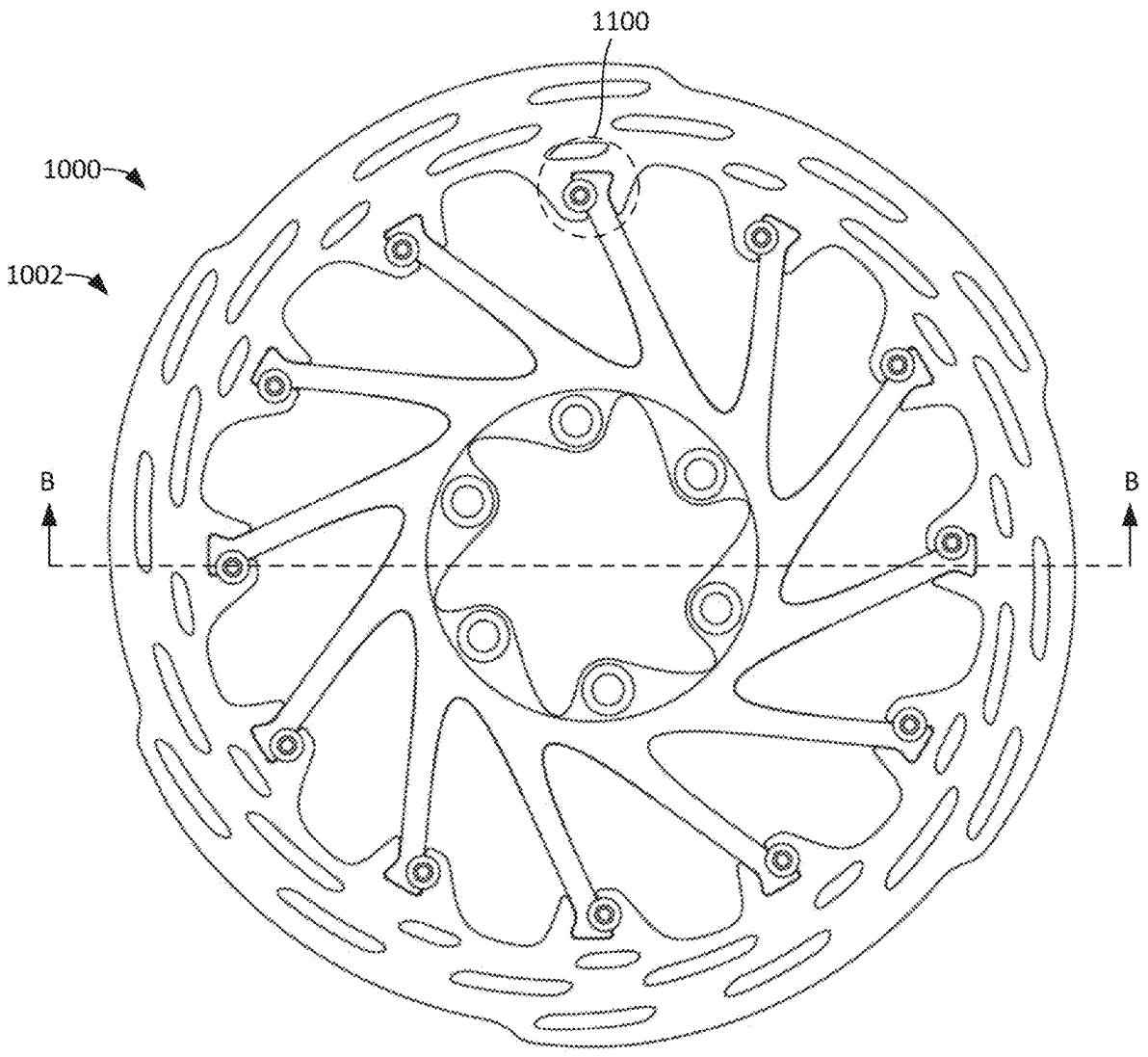
FIG. 11 is a side view of the example brake rotor of FIGS. 10A and 10B.
Figure 12:
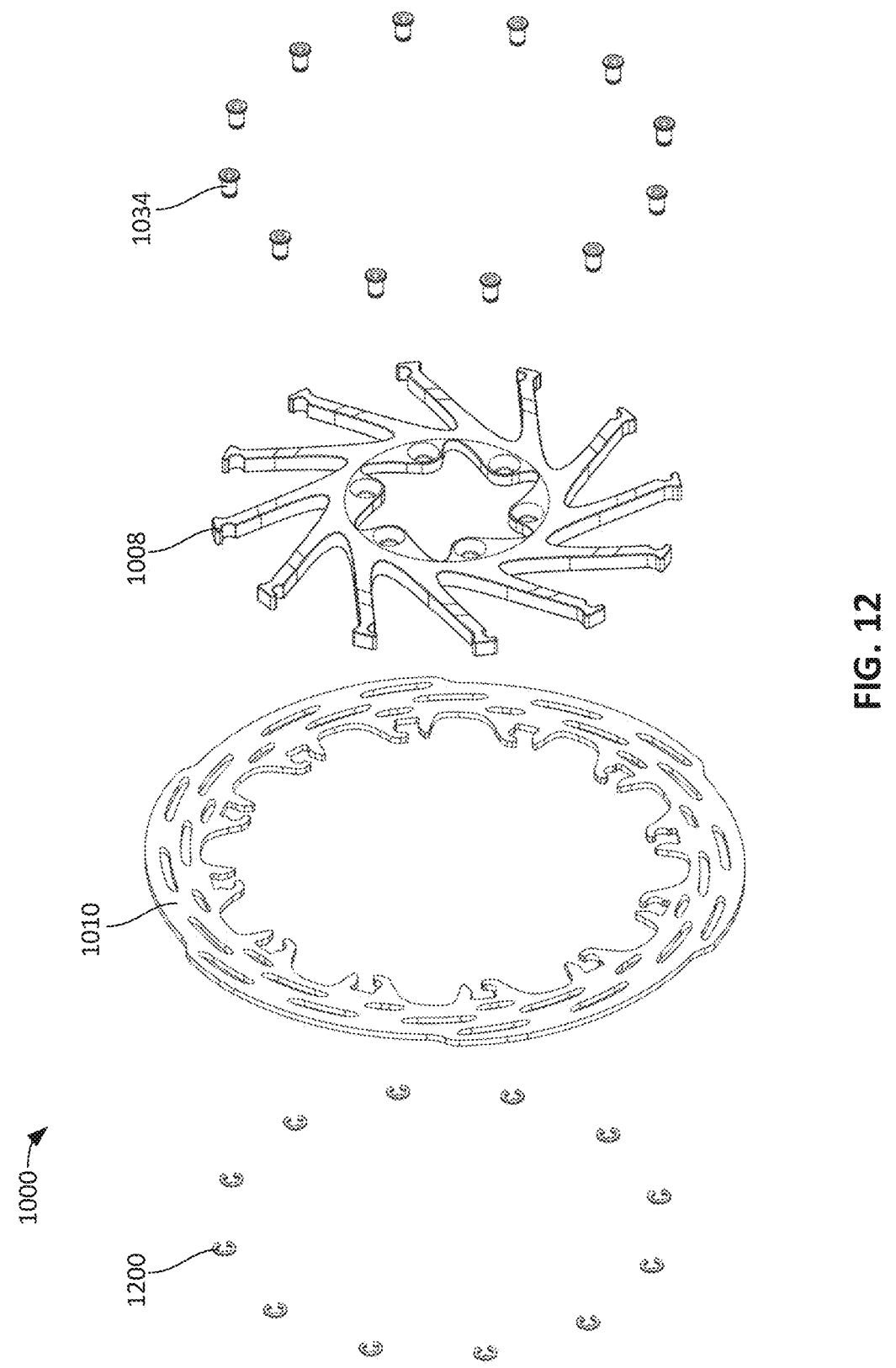
FIG. 12 is an exploded view of the example brake rotor of FIGS. 10A and 10B.

FIG. 11 is a side view showing the first side 1002 of the brake rotor 1000. FIG. 12 is an exploded view of the brake rotor 1000. As shown in FIG. 12, the brake rotor 1000 includes the carrier 1008, the brake track 1010, and the pins 1034 (one of which is referenced in FIG. 12). To hold the pins 1034 in place, the brake rotor 1000 includes a set of clips 1200 (one of which is referenced in FIG. 12) for the respective pins 1034.

Figures 13, 14A, 14B, 15:
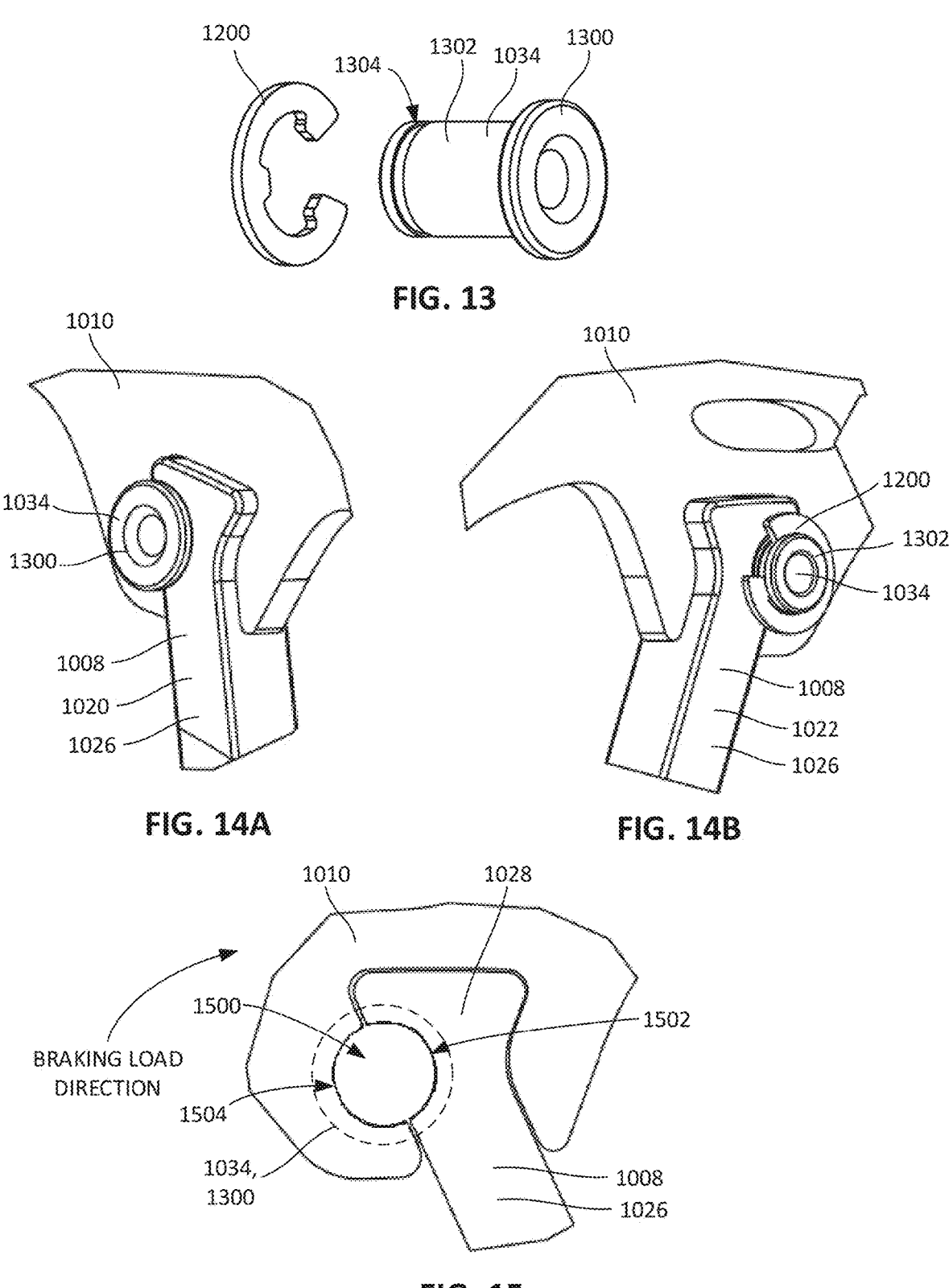
FIG. 13 is a perspective view of an example pin and an example clip that may be implemented in connection with the example brake rotor of FIGS. 10A and 10B.
FIGS. 14A and 14B are enlarged views of the callouts in FIGS. 10A and 10B, respectively.
FIG. 15 is an enlarged view of the callout in FIG. 11.

FIG. 13 is a perspective view of one of the pins 1034 and one of the clips 1200. The pin 1034 has a head 1300 and a shaft 1302. In some examples, the head 1300 and the shaft 1302 are integrally formed. The shaft 1302 has a groove near a distal end of the shaft 1302 to receive the clip 1200. The clip 1200 can be pushed into the groove 1304, which couples the clip 1200 to the pin 1034.

FIG. 14A is an enlarged view from the callout 1036 in FIG. 10A and FIG. 14B is enlarged view of the callout 1038 in FIG. 10B. As shown in FIG. 13A, the head 1300 of the pin 1034 is disposed on the first side 1020 of the carrier 1008. The shaft 1302 (FIG. 13) of the pin 1034 extends through an opening in the brake rotor 1000. As shown in FIG. 13B, the clip 1200 is coupled to the shaft 1302 and disposed on the second side 1022 of the carrier 1008. The pin 1034 is dimensioned such that when the pin 1034 and the clip 1200 are installed, as shown in FIGS. 14A and 14B, the head 1300 engages the first side 1020 of the arm 1026 and the clip 1200 engages the second side 1022 of the arm 1026. The head 1300 and the clip 1200 extend radially outward and overlap with a portion of the brake track 1010 in the axial direction. As such, the head 1300 and the clip 1200 are first and second stops that define the outer boundaries of the axial movement of the brake track 1010. The head 1300 (the first stop) is on the first side 1002 of the brake rotor 1000 and the clip 1200 (a second stop) is on the second side 1004 of the brake rotor 1000. The head 1300 (the first stop) limits axial movement of the brake track 1010 in a first axial direction and the clip 1200 (the second stop) limits axial movement of the brake track 1010 in a second axial direction.

FIG. 15 is an enlarged view of the callout 1100 in FIG. 11 with the pin 1034 removed. An outline of the head 1300 of the pin 1034 is shown in dashed lines. As shown in FIG. 15, the brake rotor 1000 includes an opening 1500 for the pin 1034. The opening 1500 is partially (e.g., half) formed in the brake track 1010 and partially (e.g., half) formed in the carrier 1008 (and, in particular, in the end portion 1028 of the arm 1026 of the carrier 1008). In this example, the end portion 1028 of the arm 1026 has a first semicircular groove 1502, and the brake track 1010 has a second semicircular groove 1504. The grooves 1502, 1504 may be machined (e.g., drilled) in the arm 1026 and the brake track 1010, respectively. The head 1300 and the clip 1200 have a larger diameter than the opening 1500. Therefore, when the pin 1034 and the clip 1200 are installed, the head 1300 and the clip 1200 overlap at least a section of the brake track 1010 in the axial direction. This prevents the brake track from moving axially beyond the head 1300 or the clip 1200.

In some examples, it is advantageous to have the pin 1034 disposed between the surfaces of the arm 1026 and the brake track 1010 because the pin 1034 acts as a load transfer mechanism. In some examples, as shown in FIG. 15, the pin 1034 is disposed on the load side of the arm 1026 (e.g., on the left side in FIG. 15). As such, during braking, braking loads are transferred from the brake track 1010, through the pin 1034, and to the arm 1026 of the carrier 1008. The pin 1034 has larger surface/contact area on the carrier 1008 compared to having a flat interface directly between the brake track 1010 and the arm 1026. This increased surface area helps distribute the braking loads more evenly and thereby reduces the load PSI to the carrier 1008. The pin 1034 also helps dissipate heat across the entire width of the pin 1034. As a result, less heat is transferred to the carrier 1008. Therefore, the transfer of force and heat per interface surface area is reduced on the carrier 208 so as not to overly stress and permanently deform the carrier 208.

In some examples, the brake track 1010 is constructed of stainless steel, the carrier 1008 is constructed of aluminum, and the pin 1034 is constructed of a non-aluminum material having a higher melting point than aluminum and that can withstand higher surface stresses at higher temperatures. As such, the pin 1034 is constructed of a different material than the carrier 1008. This helps reduce heat transfer to the carrier 1008. In some examples, the pin 1034 is constructed of stainless steel, such as series 300 or series 400 stainless steel. In other examples, the pin 1034 may be constructed of other types of material, such as titanium.

While in the illustrated example the opening 1500 for the pin 1034 is half formed in each of the arm 1026 and the brake track 1010, in other examples, the opening 1500 can be formed more in one of the structures than the other structure (e.g., 75% formed in the arm 1026 and 25% formed in the brake track 1010). In some examples, the opening 1500 is entirely formed through the arm 1026 (e.g., through a center of the arm 1026). While only one of the pins 1034 is described in connection with FIGS. 13-15, it is understood that each of the other pins 1034 is identical to the pin 1034 disclosed in connection with FIGS. 13-15.

Figure 16:
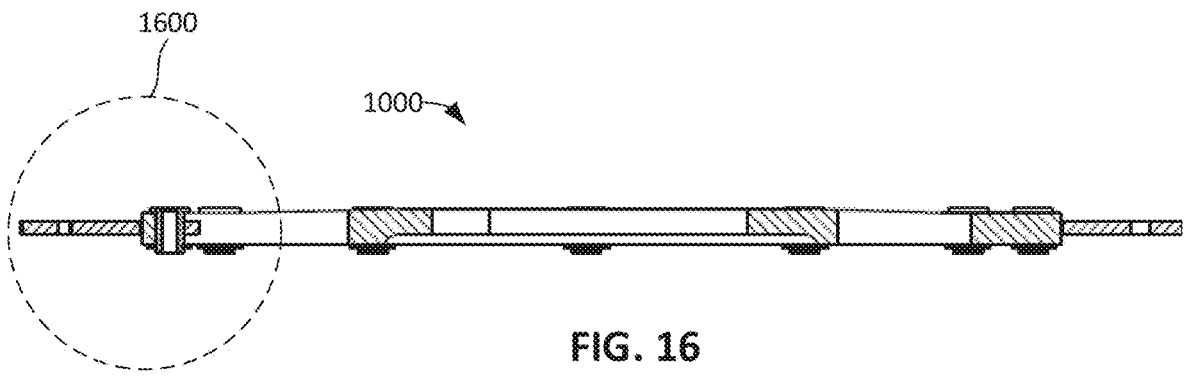
FIG. 16 is a cross-sectional view of the example brake rotor of FIGS. 10A and 10B taken along line B-B in FIG. 11.
Figure 17A:
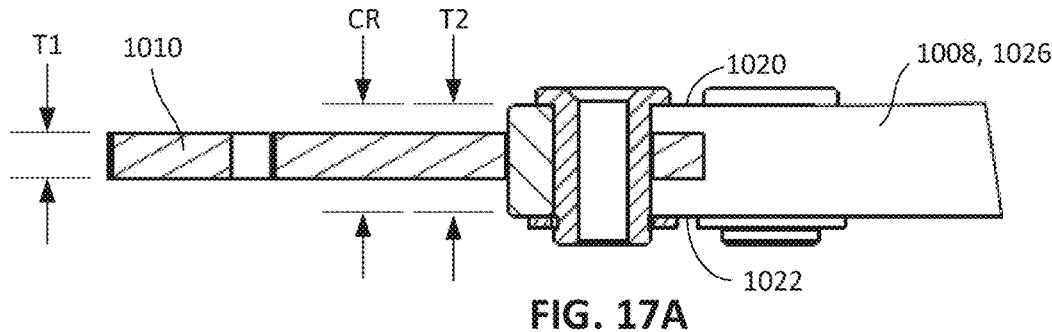
FIGS. 17A, 17B, and 17C are enlarged views of the callout in FIG. 16 showing an example brake track moved axially to three different positions.
Figure 17B:
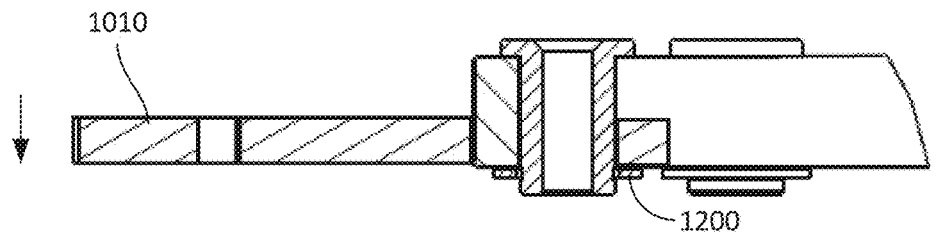
Figure 17C:
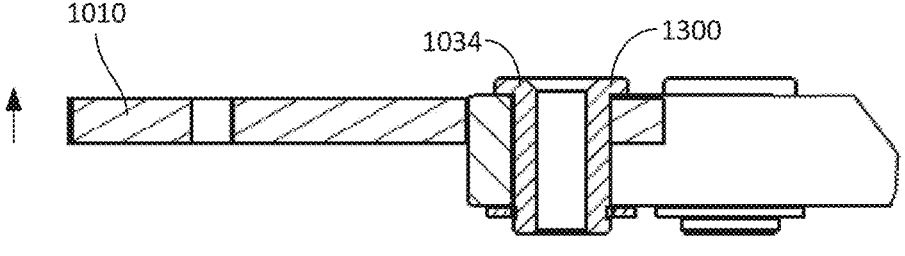

FIG. 16 is a cross-sectional view of the example brake rotor 1000 taken along line B-B of FIG. 11. FIGS. 17A, 17B, and 17C are enlarged views of the callout 1600 in FIG. 16 showing the brake track 1010 in three different axial positions. As shown in FIG. 17A, the brake track 1010 has a thickness T1 and the carrier 1008 (e.g., the end portion 1028 of the arm 1026) has a thickness T2 that is greater than the thickness T1 of the brake track 1010. FIG. 17A shows the brake track 1010 in a center position. The brake track 1010 is movable (e.g., slidable) in the axial direction relative to the carrier 1008. If the brake track 1010 is moved in one axial direction (e.g., inboard) to the position shown in FIG. 17B, the brake track 1010 engages the clip 1200. This prevents brake track 1010 from being further moved in the same axial direction. Similarly, if the brake track 1010 is moved in the opposite axial direction (e.g., outboard) to the position shown in FIG. 17C, the brake track 1010 engages the head 1300 of the pin 1034, which prevents the brake track 1010 from being further moved in the same axial direction. As such, the inner surfaces of the head 1300 and the clip 1200 form or define the center range CR. In this example, because the head 1300 and the clip 1200 are engaged with the first and second sides 1020, 1022, respectively, of the carrier 1008, the center range CR is the same as the thickness T2 of the carrier 208. In some examples, this allows for the maximum range of movement without allowing the brake track 1010 to move beyond the sides 1020, 1022 of the carrier 208. However, in other examples, the center range CR may be greater than or less than the thickness T2 of the carrier 1008.

In some examples, the brake rotor 1000 includes a pin for each interface of the arms 1026 and notches 1032, such as shown in FIGS. 10A, 10B, 11, and 12. However, in other examples, the brake rotor 1000 may include pins for only some of the interfaces, but not all of the interfaces. For example, the brake rotor 1000 may include only one pin and clip for one of the arms 1026 and its corresponding notch 1032. The other arms 1026 and notches 1032 may not have any pins. In such an example, the single pin and clip can still prevent the entire brake track 1010 from moving axially beyond the limits of the center range CR. Similar to the brake rotor 200 disclosed above, the brake track 1010 is constrained in the radial and circumferential directions. Even if the pin(s) were removed, the brake track 1010 is still constrained in the radial and circumferential directions.

While in this example the clips 1200 are used to retain the pins 1034 and form portions of the axial limits, in other examples, other structures can be used to retain the pins, such as cotter pins. In some examples, the pins 1034 may instead be implemented as rivets. In such an example, the ends of the rivets may be splayed outward to form a second head on the opposite side of the brake rotor 1000. In other examples, threaded fasteners, such as nuts and bolts, can be used in a similar manner.

Figures 18A, 18B:
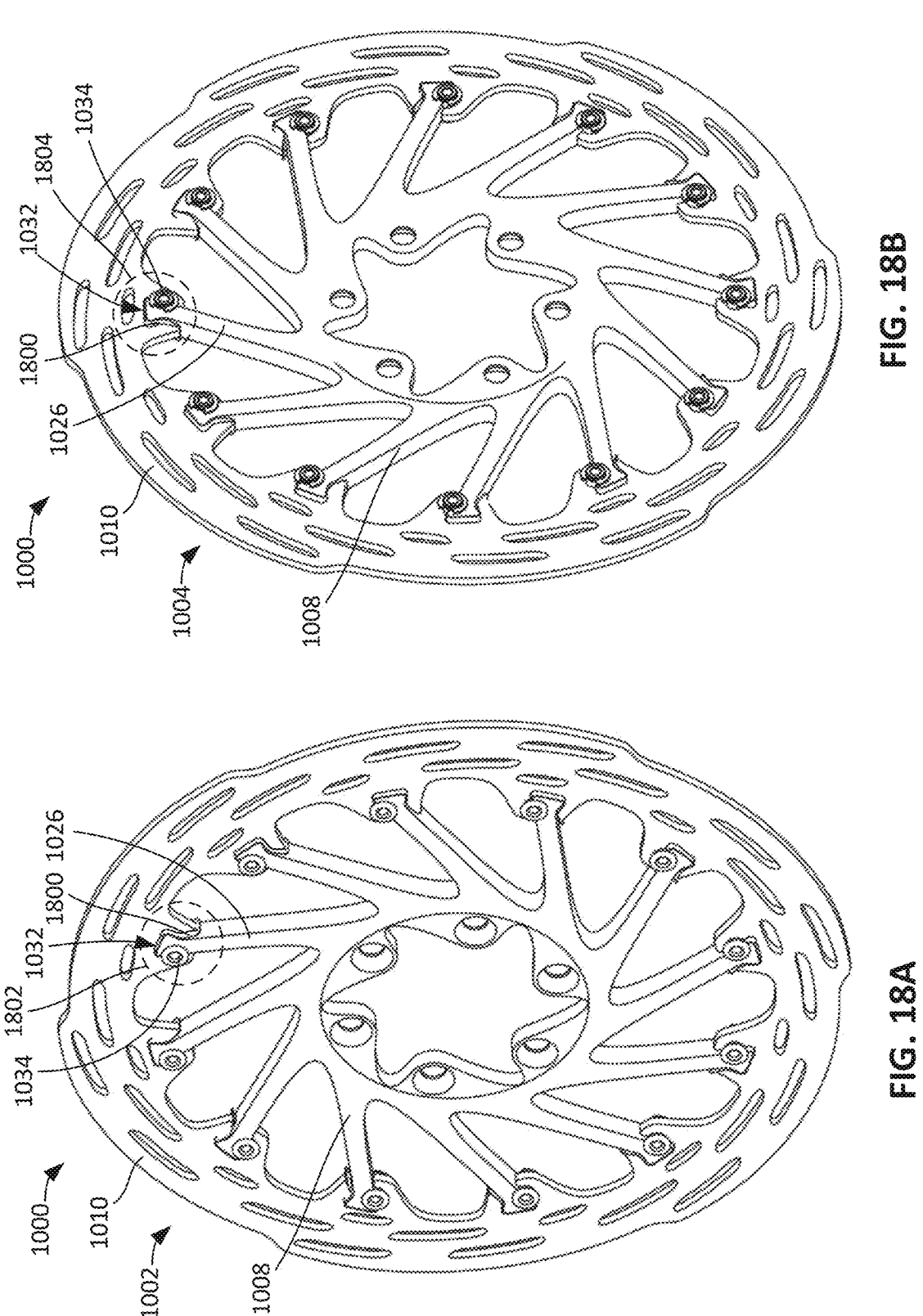
FIGS. 18A and 18B are perspective views of opposite sides of the example brake rotor of FIGS. 10A and 10B in which example springs are included to bias an example brake track in a circumferential direction.

In some examples, one or more intermediary structures can be disposed between the carrier 1008 and the brake track 1010. Such structure(s) can be used help account for dimensional tolerances and thermal growth due to increased braking temperature that may otherwise create larger than acceptable clearances between the brake track 1010 and the carrier 1008. These clearances could cause the brake track 1010 to freely move or rattle on the carrier 1008 due to vehicle rolling surface vibrations when the brake is not applied. For example, FIGS. 18A and 18B are perspective views of the first and second sides 1002, 1004, respectively, of the brake rotor 1000. In this example, the brake rotor 1000 includes a set of springs 1800 (one of which is referenced in FIGS. 18A and 18B) that are disposed in the respective notches 1032 (one of which is referenced in FIGS. 18A and 18B) of the brake track 1010, between the arms 1026 (one of which is referenced in FIGS. 18A and 18B) and the brake track 1010. The springs 1800 bias the brake track 1010 circumferentially relative to the carrier 1008. In particular, the springs 1800 bias the brake track 1010 against the pins 1034 (one of which is referenced in FIGS. 18A and 18B) and the carrier 1008 to reduce or eliminate the potential free movement and rattle described above. In this example, the brake rotor 1000 includes the same number of springs 1800 as the arms 1026 and the notches 1032. In other examples, the brake rotor 1000 may include more or fewer springs (e.g., one, two, three, etc.).

Figures 19A, 19B, 20:
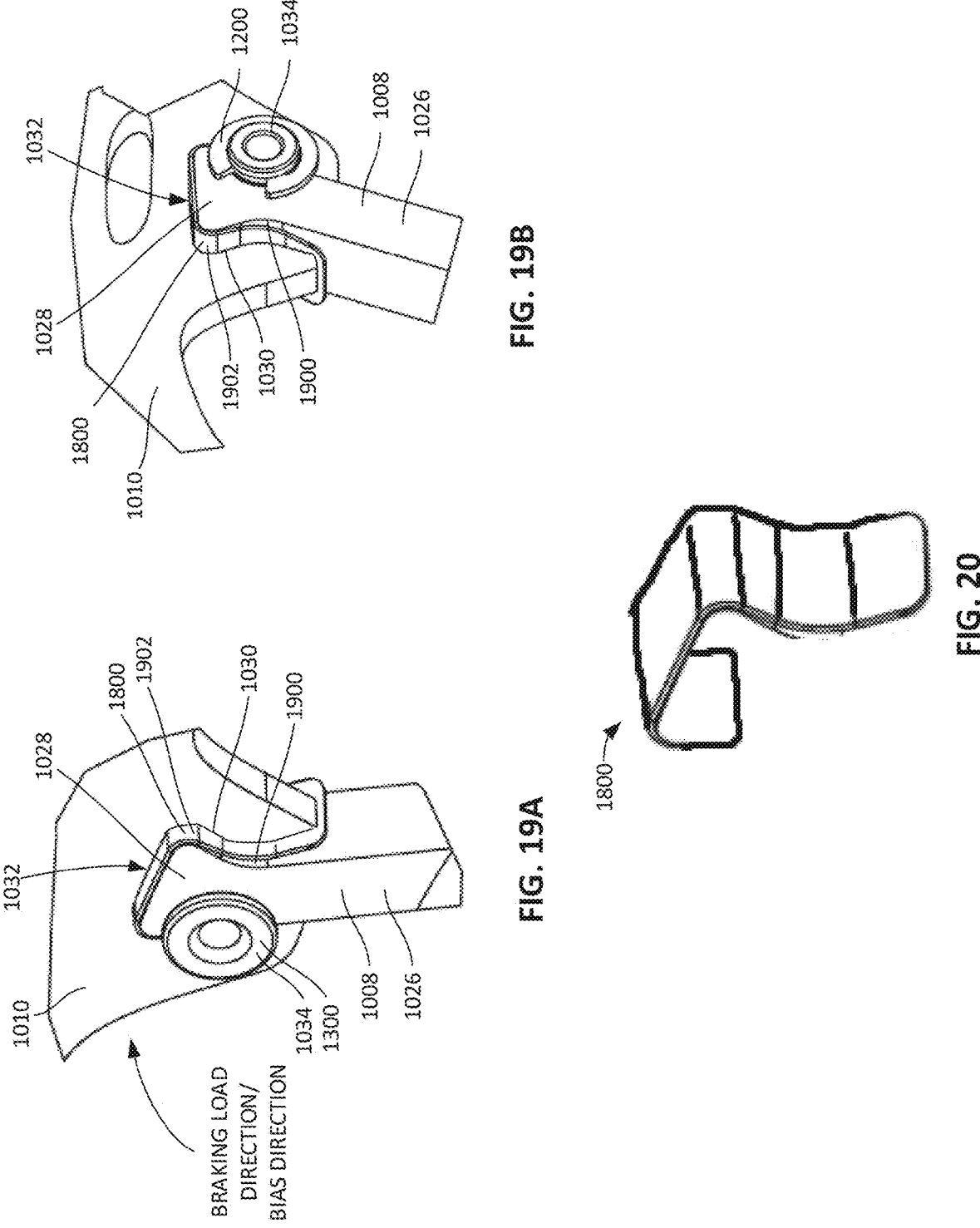
FIGS. 19A and 19B are enlarged views of the callouts in FIGS. 18A and 18B, respectively.
FIG. 20 is a perspective view of an example spring from the example brake rotor of FIGS. 18A and 18B.

FIG. 19A is an enlarged view of the callout 1802 from FIG. 18A and FIG. 19B is an enlarged view of the callout 1804 from FIG. 19B. FIGS. 19A and 19B show opposite sides of one of the arms 1026 and the corresponding spring 1800. As shown in FIGS. 19A and 19B, the spring 1800 is disposed in the notch 1032 between an outer peripheral edge 1900 of the end portion 1028 of the arm 1026 and the inner peripheral edge 1030 of the brake track 1010. FIG. 20 is an isolated perspective view of the spring 1800. In some examples, the spring 1800 is a piece of sheet metal, such as stainless steel sheet metal. The spring 1800 is installed in an elastically deformed state. As show in FIGS. 19A and 19B, the spring 1800 fills any excess space between the outer peripheral edge 1900 of the arm 1026 and the inner peripheral edge 1030 of the brake track 1010 in the notch 1032. The spring 1800 also biases the brake track 1010 in the circumferential direction of the braking load against the pin 1034 and the carrier 1008. This ensure that no gap or slop exists between the brake track 1010 and the carrier 1008, so that when the brake is applied, the braking load on the brake track 1010 is transferred directly to the carrier 1008. Additionally, the spring 1800 acts as a heat shield to help reduce heat transferred to the carrier 1008. In some examples, it is desired to reduce heat to the carrier 1008, because the carrier 1008 may be susceptible to deforming at higher temperatures. While in this example the spring 1800 is formed from a flat strip of metal, in other examples, the spring 1800 may be formed in other geometric shapes and/or implemented as other types of springs, such as a coil spring or a split hollow pin. Additionally or alternatively, the spring 1800 may be formed with as part of the brake track 1010, the carrier 1008, and/or the pin 1034. The other springs 1800 shown in FIGS. 18A and 18B are identical to the spring 1800 disclosed in connection with FIGS. 19A, 19B, and 20. Therefore, any of the aspects disclosed in connection with the spring 1800 in FIGS. 19A, 19B, and 20 likewise apply to the other springs 1800.

In this example, the spring 1800 is about the same thickness as the carrier 1008. The spring 1800 may be axially constrained by the head 1300 of the pin 1034 and the clip 1200. In this example, the brake track 1010 slides axially on an outer surface 1902 of the spring 1800. The frictional force between the inner peripheral edge 1030 of the brake track 1010 and the outer surfaces 1902 of the springs 1800 may be the same as the frictional force disclosed in connection with the carrier 208 and the brake track 210 of the brake rotor 200 in FIGS. 2A and 2B. In particular, the frictional force between the brake track 210 and the spring 1800 is an amount that enables the brake track 210 to slide axially on the springs 1800 when engaged with a sufficient force (e.g., 1 newton) by the brake pads, but when the brake pads are released, the frictional force holds the brake track 210 in substantially the same axial position relative to the carrier 208.

Figure 21:
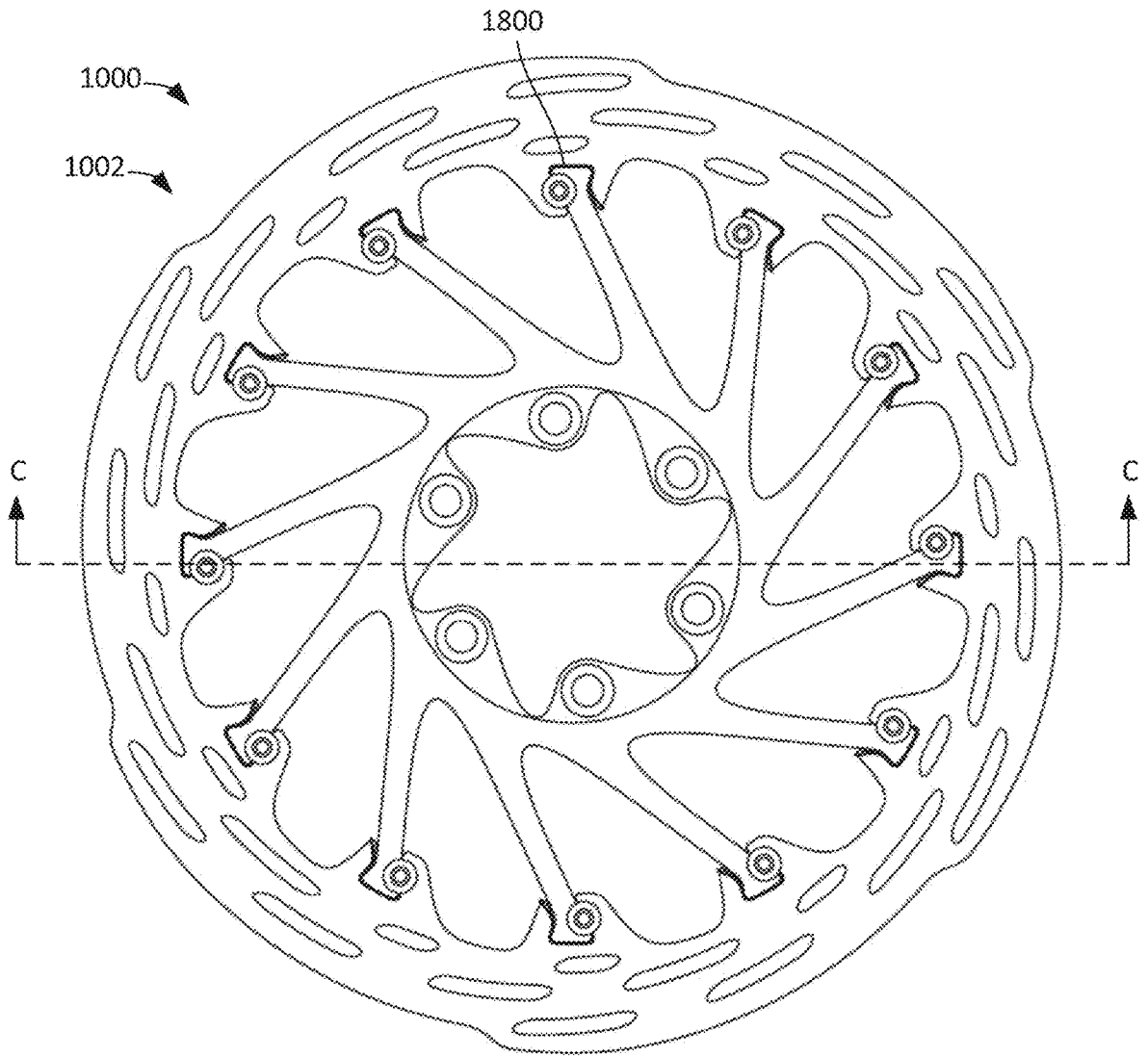
FIG. 21 is a side view of the example brake rotor of FIGS. 18A and 18B.
Figure 22:
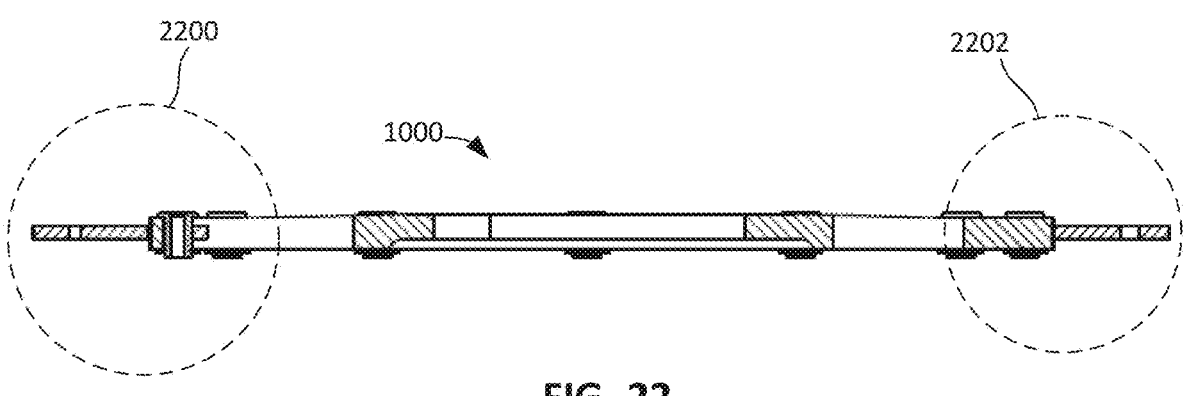
FIG. 22 is a cross-sectional view of the example brake rotor of FIGS. 18A and 18B taken along line C-C in FIG. 21.
Figure 23:
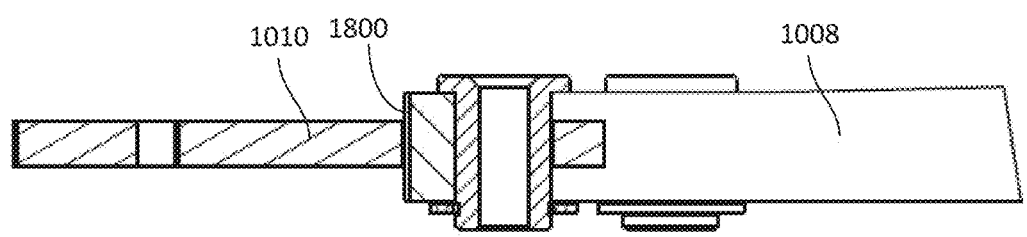
FIG. 23 is an enlarged view of one of the callouts in FIG. 22.
Figure 24:
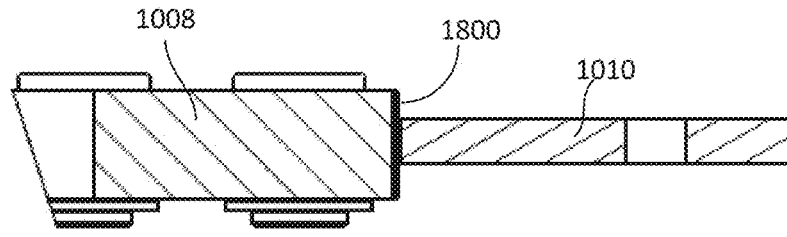
FIG. 24 is an enlarged view of the other callout in FIG. 22.

FIG. 21 is a side view showing the first side 1002 of the brake rotor 1000 with the springs 1800 (one of which is referenced in FIG. 21). FIG. 22 is a cross-sectional view of the example brake rotor 1000 taken along line C-C of FIG. 21. FIG. 23 is an enlarged view of the callout 2200 from FIG. 22. FIG. 24 is an enlarged view of the callout 2202 from FIG. 22. As shown in FIGS. 23 and 24, the springs 1800 are disposed between the carrier 1008 and the brake track 1010. The thicknesses and center range CR can be the same as disclosed in connection with FIGS. 17A-17C and descriptions thereof are not repeated herein.

Figures 25A, 25B:
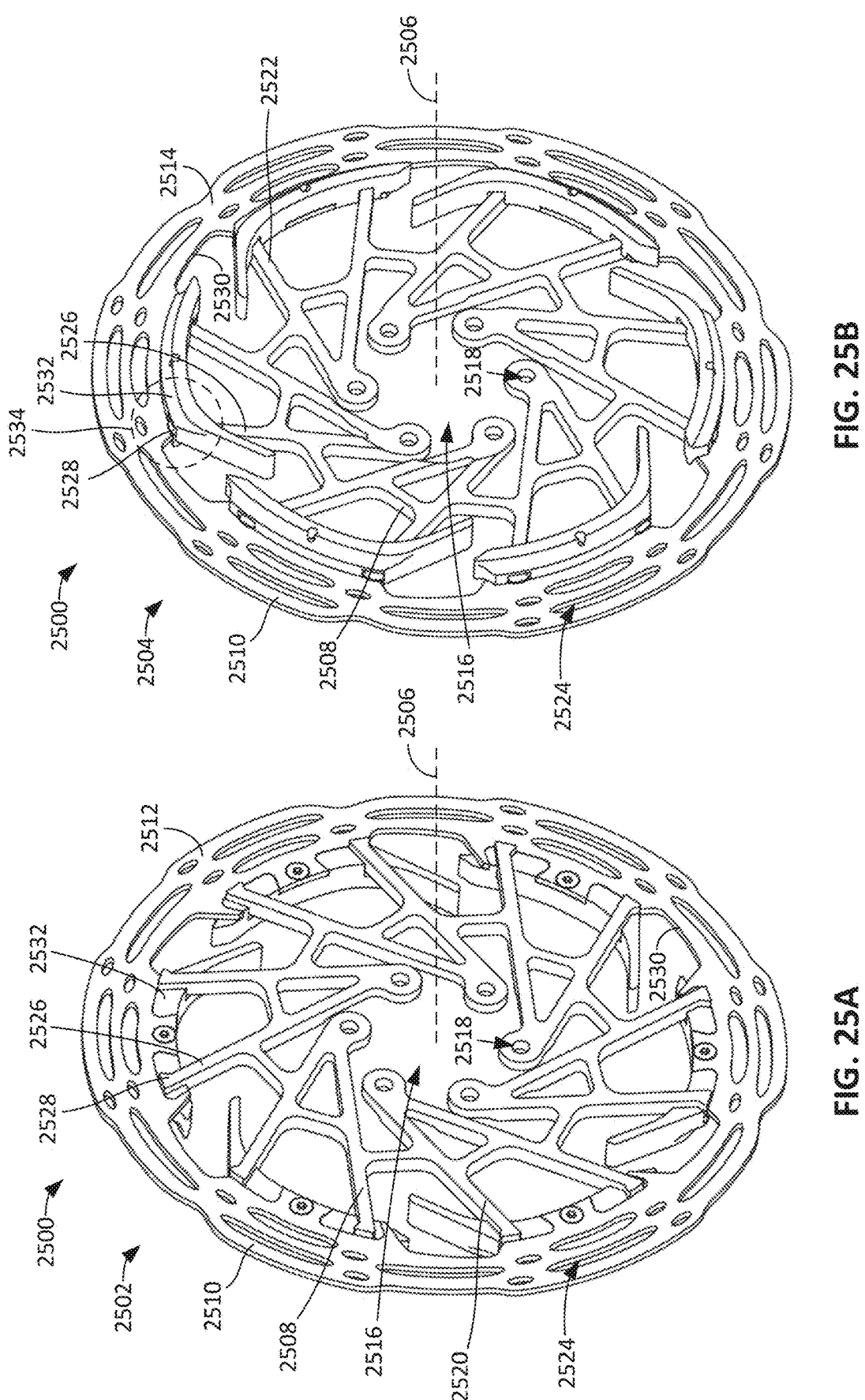
FIGS. 25A and 25B are perspective views of opposite sides of an example brake rotor constructed in accordance with the teachings of this disclosure.

FIGS. 25A and 25B illustrate another example brake rotor 2500 constructed in accordance with the teachings of this disclosure. The example brake rotor 2500 can be implemented on the bicycle 100 of FIG. 1, for example, as the front brake rotor 142 and/or the rear brake rotor 150. FIG. 25A is a perspective view of a first side 2502 of the brake rotor 2500 and FIG. 25B is a perspective view of a second side 2504 of the brake rotor 2500 opposite the first side 2502. The brake rotor 2500 has a central axis 2506 that forms the rotational axis about which the brake rotor 2500 rotates. The brake rotor 2500 is similar to the brake rotor 200 of FIGS. 2A and 2B. In particular, the brake rotor 2500 includes a carrier 2508, a brake track 2510 disposed radially outward of the carrier, a first side 2512 and a second side 2514 of the brake track 2510 (which form the braking surfaces), a central opening 2516 in the carrier 2508 to receive a hub, a plurality of fastener openings 2518, a first side 2520 and a second side 2522 of the carrier 2508, a plurality of openings 2524 in the brake track 2510, a set of arms 2526 having end portions 2528, and an inner peripheral edge 2530 of the brake track 2510. The end portions 2528 of the arms 2526 have the same shape as the end portions 228 of the arms 226 disclosed above. The carrier 2508 and the brake track 2510 can be constructed of any of the materials disclosed above in connection with the brake rotor 200. As disclosed in further detail, the brake track 2510 is axially movable relative to the carrier 2508, but constrained in the radial and circumferential directions.

In the illustrated example, the brake rotor 2500 includes a set of positioning portions with thermal dissipation elements 2532 (referred to herein as the positioning portions 2532) (one of which is referenced in FIGS. 25A and 25B). The positioning portions 2532 can act as stops that limit axial movement in at least one direction, and can also be configured as convection elements, as disclosed in further detail below. The positioning portions 2532 may also be referred to as stops, cooling fins, cooling fixtures, cooling vanes, or heat sinks. In the illustrated example, the brake rotor 2500 includes six positioning portions 2532. However, in other examples, the brake rotor 2500 may include more or fewer positioning portions (e.g., one, two, three, etc.). In this example, the positioning portions 2532 are coupled to the brake track 2510. As such, the positioning portions 2532 move axially with the brake track 2510 relative to the carrier 2508. In the illustrated example, the positioning portions 2532 extend at least partially outward from the second side 2514 of the brake track 2510, as shown in FIG. 25B. The positioning portions 2532 dissipate heat from the brake track 2510. In particular, the positioning portions 2532 absorb heat from the brake track 2510 and dissipate the heat to the surrounding air, thereby helping to cool the brake rotor 2500 more quickly. The positioning portions 2532 can also affect the airflow around the brake rotor 2500 to improve cooling. In some examples, the positioning portions 2532 are constructed of aluminum, which has a relatively high thermal conductivity. In other examples, the positioning portions 2532 can be constructed of other materials (e.g., stainless steel). The positioning portions 252 also distribute breaking loads from the brake track 2510 to the carrier 2508 over a larger surface area so as not to permanently deform the load transferring surfaces.

Figure 26:
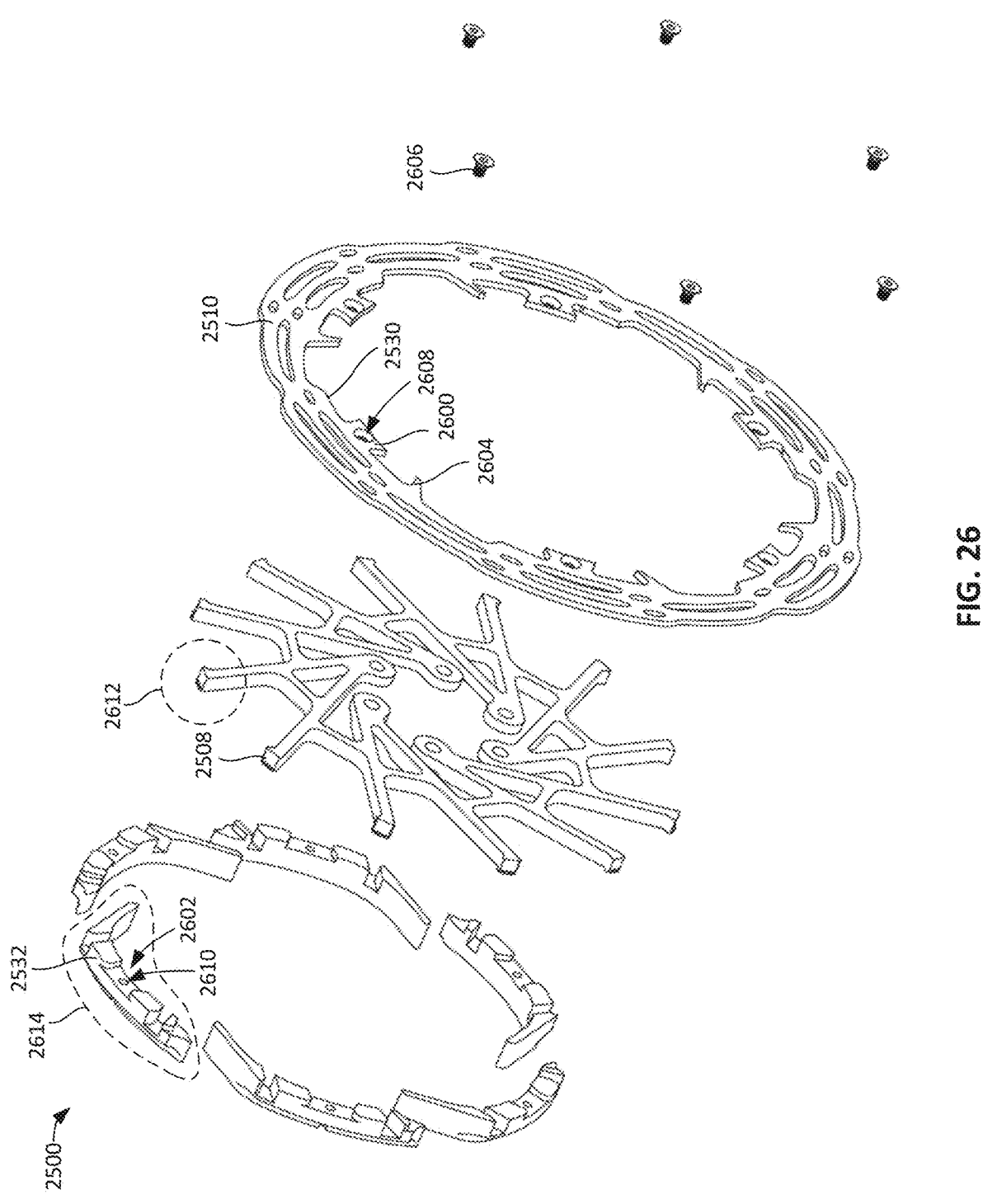
FIG. 26 is an exploded view of the example brake rotor of FIGS. 25A and 25B.

FIG. 26 is an exploded view of the brake rotor 2500. The brake rotor 2500 includes the carrier 2508, the brake track 2510, and the positioning portions 2532 (one of which is referenced in FIG. 26). As shown in FIG. 26, the inner peripheral edge 2530 of the brake track 2510 has a set of tabs 2600 (one of which is referenced in FIG. 26) extending radially inward. Each of the positioning portions 2532 has a recess 2602 to receive one of the tabs 2600. The inner peripheral edge 2530 of the brake track 2510 also has a set of hooks 2604 (one of which is referenced in FIG. 26) to help secure each of the corresponding positioning portions 2532. The shape of the tabs 2600 and the hooks 2604 can radially constrain the positioning portions 2532 relative to the brake track 2510.

In the illustrated example, the brake rotor 2500 includes a set of threaded fasteners 2606 (e.g., screws, bolts, etc.) (one of which is referenced in FIG. 26) to couple respective ones of the positioning portions 2532 to the brake track 2510. The brake track 2510 has fastener openings 2608 (one of which is referenced in FIG. 26) through which threaded fasteners 2606 extend. Each of the positioning portions 2532 also has a corresponding fastener opening 2610 (one of which is referenced in FIG. 26). When the brake rotor 2500 is assembled, each threaded fastener 2606 extends through one of the fastener openings 2608 in the brake track 2510 and into one of the fastener openings 2610 in one of the positioning portions 2532. In this example, the fastener openings 2608 are formed through the tabs 2600. However, in other examples, the fastener openings 2608 may be formed in other locations on the brake track 2510. In other examples, the positioning portions 2532 can be coupled to the brake track 2510 using other mechanical and/or chemical fastening techniques (e.g., rivets, adhesives, etc.). In other examples, the positioning portions 2532 can be integrally formed with the brake track 2510.

Figures 27, 28:
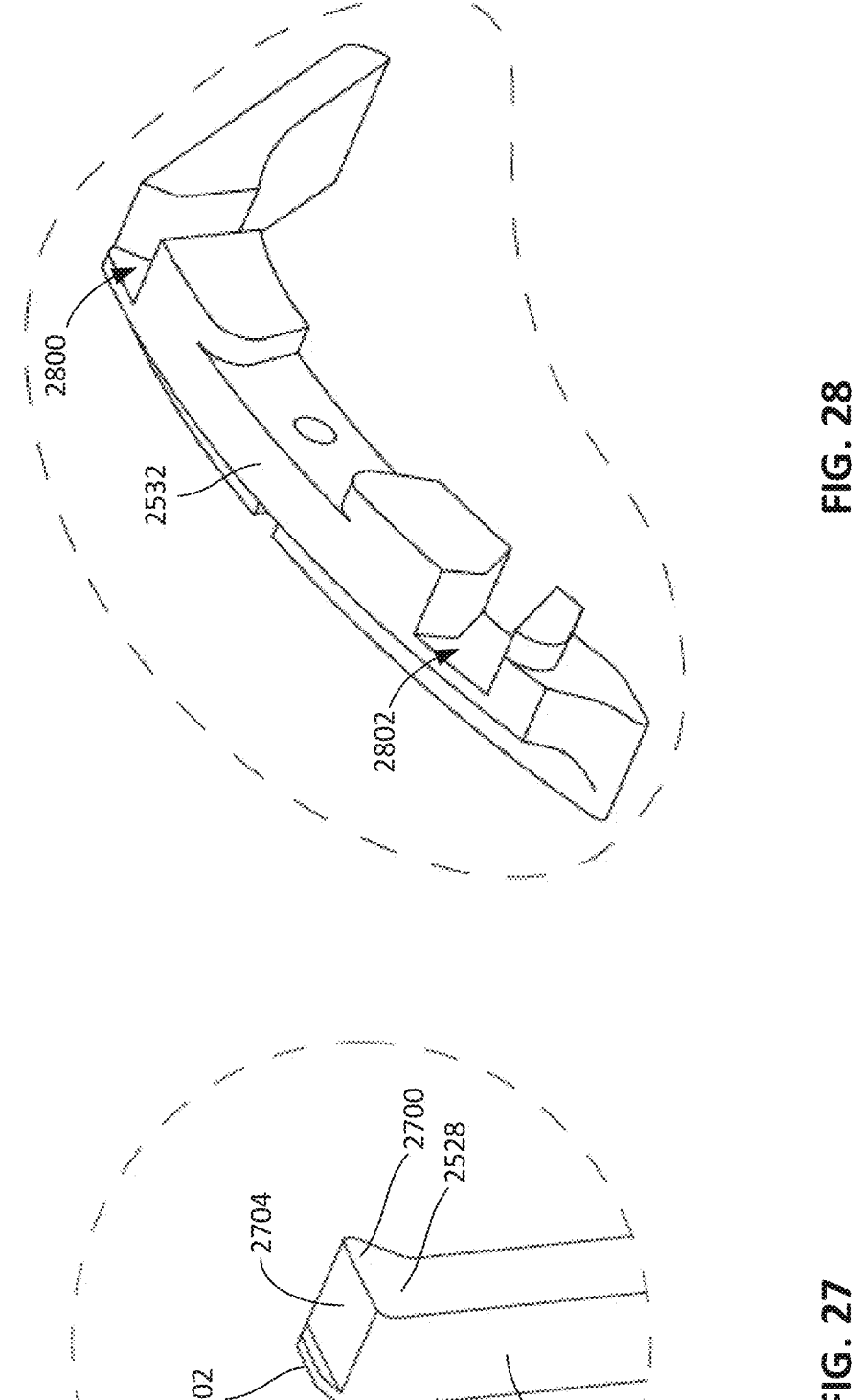
FIG. 27 is an enlarged view of one of the callouts in FIG. 26 showing an example end portion of an example arm of an example carrier.
FIG. 28 is an enlarged view of the other callout in FIG. 26 showing an example positioning portion with thermal dissipation element.

FIG. 27 is an enlarged view of the callout 2612 from FIG. 26 showing one of the end portions 2528 of one of the arms 2526. The end portions 2528 of the other arms 2526 of the brake rotor 2500 in FIGS. 25A and 25A are identical to the end portion 2528 shown in FIG. 27. Thus, any of the aspects disclosed in connection with the end portion 2528 shown in FIG. 27 likewise apply to the other end portions 2528. The end portion 2528 is shaped substantially the same as the end portion 228 of the brake rotor 200 disclosed in connection with FIGS. 2A and 2B. The end portion 2528 has a protrusion 2700 that constrains the brake track 2510 in the radial direction. As shown in FIG. 27, the end portion 2528 of the arm 2526 has a tab 2702 extending outward from an outer peripheral edge 2704 of the end portion 2528. The tab 2702 is an extension of the second side 2522 of the arm 2526. The tab 2702 forms a first stop that limits axial movement of the brake track 2510 in one axial direction.

FIG. 28 is an enlarged view of the callout 2614 from FIG. 26 showing one of the positioning portions 2532. The other positioning portions 2532 of the brake rotor 2500 in FIGS. 25A and 25A are identical to the positioning portion 2532 shown in FIG. 28. Thus, any of the aspects disclosed in connection with the positioning portion 2532 shown in FIG. 28 likewise apply to the other positioning portions 2532. In this example, the positioning portion 2532 has a first notch 2800 for receiving one of the end portions 2528 of one of the arms 2526 and a second notch 2802 for receiving another end portion 2528 of another one of the arms 2526. In other examples, the positioning portion 2532 may only have one notch for one of the end portions 2528, or more have more than two notches for more than two for the end portions 2528. The notches 2800, 2802 have a shape or profile that matches the shape of the end portions 2528. The positioning portion 2532 forms a second stop that limits axial movement of the brake track 2510 in one axial direction.

Figure 29A:
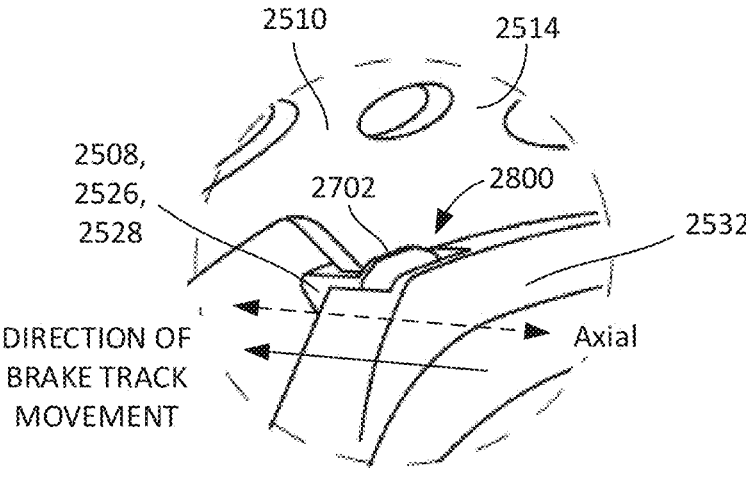
FIGS. 29A, 29B, and 29C are enlarged views of the callout in FIG. 25B showing an example sequence of axial movement of an example brake track between two stops.
Figure 29B:
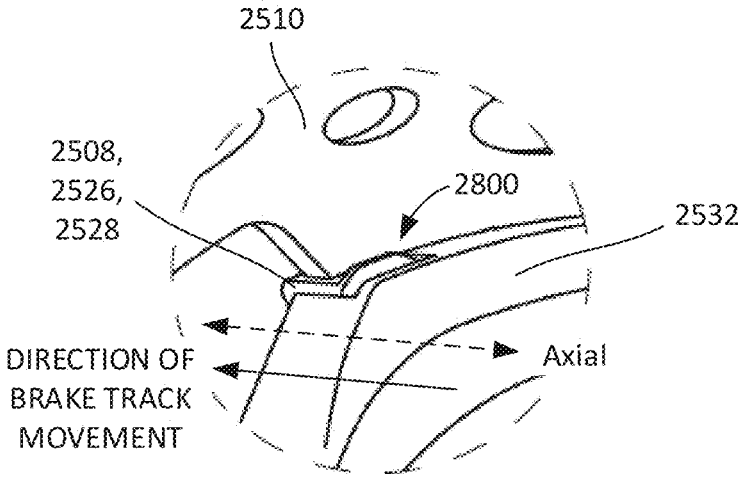
Figure 29C:
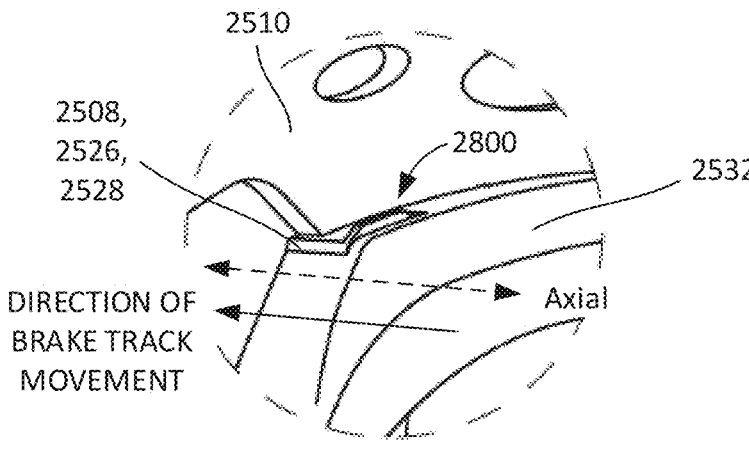

FIGS. 29A-29C are enlarged views of the callout 2534 from FIG. 25B showing an example sequence of the brake track 2510 being moved axially. The end portion 2528 of the arm 2526 is disposed in the first notch 2800 of the positioning portion 2532. The interface between the end portions 2528 and the positioning portion 2532 constrains the brake track 2510 in the radial and circumferential directions. Braking loads are transferred through the positioning portion 2532 to the carrier 2508. The positioning portion 2532 is slidable on the end portion 2528 in the axial direction, which enables the positioning portion 2532 to move axially relative to the carrier 2508 and, thus, enables the brake track 2510 to move axially relative to the carrier 2508. As such, the end portion 2528 is to slide in the first notch 2800 when the brake track 2510 moves axially relative to the carrier 2508. Similarly, a second one of the arms 2526 disposed in the second notch 2802 (FIG. 8) similarly slides in the second notch 2802 when the brake track 2510 moves axially relative to the carrier 2508.

In FIG. 29A, the tab 2702 on the end portion 2528 is engaged with the second side 2514 of the brake track 2510. This limits the brake track 2510 from being moved further in one axial direction (to the right in FIG. 29A). As shown in the sequence in FIGS. 29A-29C, the brake track 2510 can be moved axially in the opposite direction. In FIG. 29C, the end portion 2528 is engaged the positioning portion 2532, which limits the brake track 2510 from being further moved in the other axial direction. As such, the tab 2702 is a first stop that limits axial movement of the brake track 2510 in a first axial direction and the positioning portion 2532 is a second stop that limits axial movement of the brake track 2510 in a second axial direction. Therefore, in this example, the positioning portion 2532 acts as both a stop and a cooling mechanism to dissipate heat. In this example, the tab 2702 and the positioning portion 2532 (i.e., the first and second stops) are on a same side of the brake rotor 2500. In particular, both the tab 2702 and the positioning portion 2532 are on the second side 2504 (FIG. 4) of the brake rotor 2500 instead of being on opposite sides of the brake rotor 2500.

Figure 30:
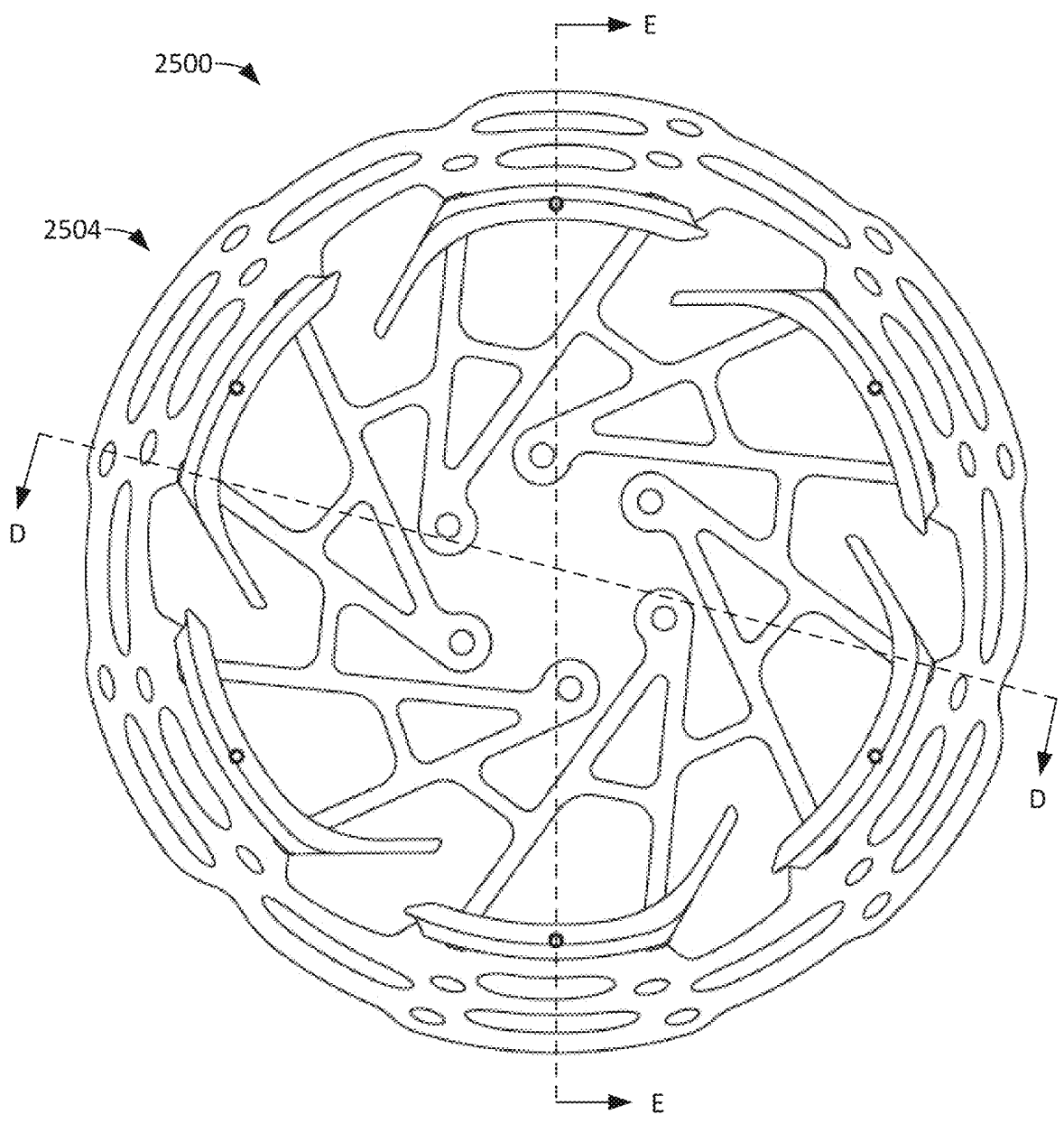
FIG. 30 is a side view of the example brake rotor of FIGS. 25A and 25B.

FIG. 30 is a side view of the second side 2504 of the brake rotor 2500. FIG. 31 is a cross-sectional view of the brake rotor 2500 taken along line D-D in FIG. 30. As can be seen from FIG. 31, the brake track 2510 is disposed radially outward of the carrier 2508. In particular, the brake track 2510 is positioned axially between the first and second sides 2520, 2522 of the carrier 2508 (e.g., between the first and second sides 2520, 2522 at the end portions 2528 of the carrier 2508).

FIGS. 32A, 32B, and 32C are enlarged views of the callout 3100 from FIG. 31 showing the brake track 2510 and the positioning portion 2532 in three different axial positions. The axial positions shown in FIGS. 32A-32C also correspond to the axial positions shown in FIGS. 29A-29C. As shown in FIG. 32A, the brake track 2510 has a thickness T1 and the carrier 2508 (e.g., the end portion 2528 of the arm 2526) has a thickness T2 that is greater than the thickness T1 of the brake track 2510. The brake track 2510 can move axially (to the left and right in FIGS. 32A-32C) relative to the carrier 2508. FIG. 32A shows the brake track 2510 in a first limit position in which the brake track 2510 is engaged with the tab 2702 on the end portion 2528 of the arm 2526. The brake track 2510 is restricted from moving further to the left in FIG. 32A by the tab 2702. FIG. 32B shows the brake track 210 moved to a center position. FIG. 32C shows the brake track 2510 moved to a second limit position, in which the positioning portion 2532 is engaged with the end portion 2528 of the arm 2526. In this example, the center range CR is defined by the inner surfaces of the tab 2702 and the first side 2520 of the carrier 2508, as shown in FIG. 32A. The center range CR is about the same as the thickness T2 of the carrier 208 (minus the thickness of the tab 2702).

FIG. 33 is a cross-sectional view of the brake rotor 2500 take along line E-E in FIG. 30. FIG. 34 is an enlarged view of the callout 3300 from FIG. 33. FIG. 34 shows the fastener 2606 that couples the positioning portion 2532 to the brake track 2510. In this example, the fastener opening 2610 in the positioning portion 2532 is threaded but the fastener opening 2608 in the brake track 2510 is not threaded. In other examples, the fastener opening 2608 in the brake track 2510 may also be threaded.

Figures 35A, 35B:
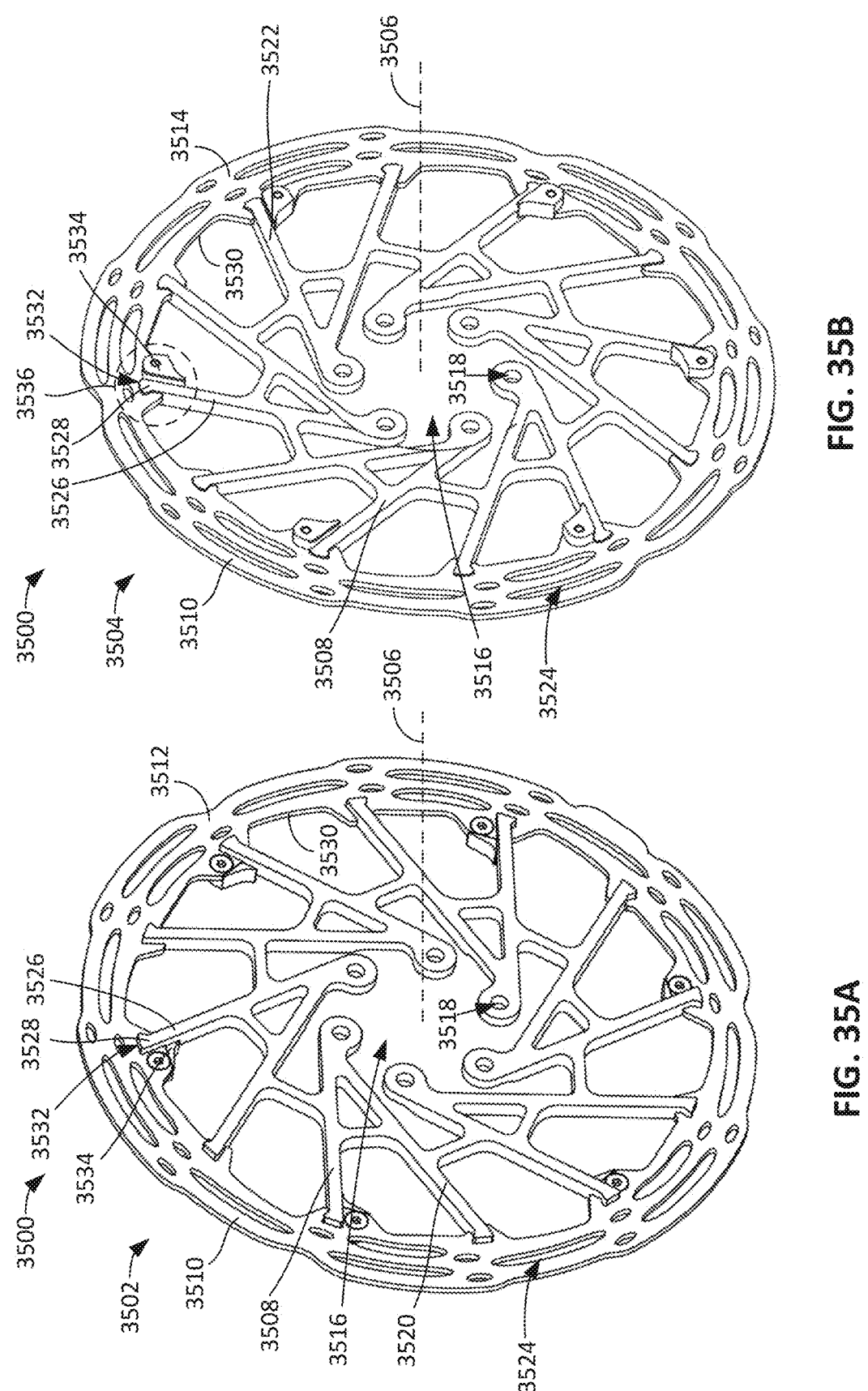
FIGS. 35A and 35B are perspective views of opposite sides of an example brake rotor constructed in accordance with the teachings of this disclosure.

FIGS. 35A and 35B illustrate another example brake rotor 3500 constructed in accordance with the teachings of this disclosure. The example brake rotor 3500 can be implemented on the bicycle 100 of FIG. 1, for example, as the front brake rotor 142 and/or the rear brake rotor 150. FIG. 35A is a perspective view of a first side 3502 of the brake rotor 3500 and FIG. 35B is a perspective view of a second side 3504 of the brake rotor 3500 opposite the first side 3502. The brake rotor 3500 has a central axis 3506 that forms the rotational axis about which the brake rotor 3500 rotates. The brake rotor 3500 is substantially the same as the brake rotor 200 of FIGS. 2A and 2B. In particular, the brake rotor 3500 includes a carrier 3508, a brake track 3510 disposed radially outward of the carrier 3508, a first side 3512 and a second side 3514 of the brake track 3510 (which form the braking surfaces), a central opening 3516 in the carrier 3508 to receive a hub, a plurality of fastener openings 3518, a first side 3520 and a second side 3522 of the carrier 3508, a plurality of openings 3524 in the brake track 3510, a set of arms 3526 having end portions 3528, and an inner peripheral edge 3530 forming notches 3532 on the brake track 3510. The brake track 3510 is slidable in the axial direction on the end portions 3528 of the arms 3526, but constrained in the radial and circumferential directions in the same manner as in the brake rotor 200 disclosed above. To avoid redundancy, a full description of the carrier 3508 and the brake track 3510 is not provided. Instead, it is understood that any of the example structural and/or functional aspects disclosed above in connection with the brake rotor 200 likewise apply to the brake rotor 3500.

In this example, the brake rotor 3500 includes stops to limit the axial movement of the brake track 3510 relative to the carrier 3508 and thereby define the center range CR. For example, as shown in FIGS. 35A and 35B, the brake rotor 3500 includes a set of stops 3534 (one of which is referenced in FIGS. 35A and 35B). The stops 3534 limit axial movement of the brake track 3510 in one axial direction. In this example, the brake rotor 3500 includes six stops 3534. The stops 3534 are associated with every other one of the arms 3526. However, in other examples, the brake rotor 3500 may include more or fewer stops. In this example, the stops 3534 are coupled to the brake track 3510. As such, the stops 3534 move with the brake track 3510 relative to the carrier 3508. The stops 3534 extend outward from the second side 3514 of the brake track 3510, as shown in FIG. 35B.

Figure 36:
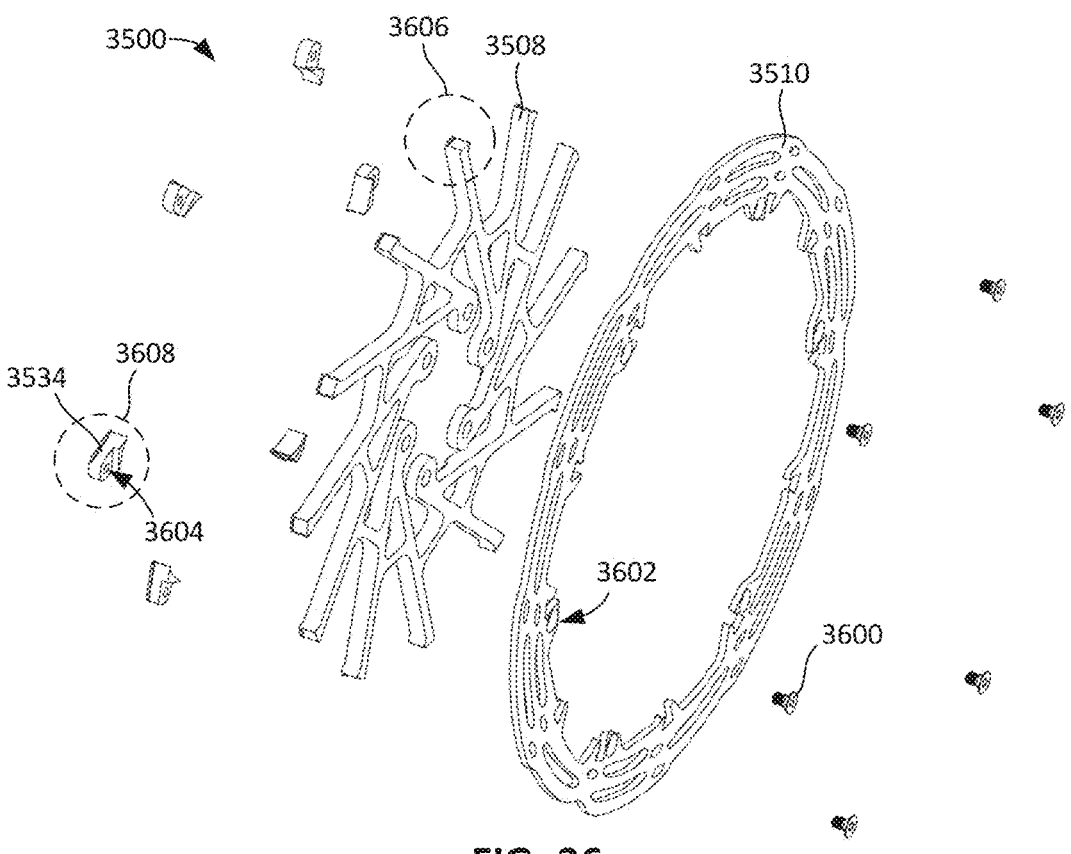
FIG. 36 is an exploded view of the example brake rotor of FIGS. 35A and 35B.

FIG. 36 is an exploded view of the brake rotor 3500. As shown in FIG. 36, the brake rotor 3500 includes the carrier 3508, the brake track 3510, and the stops 3534 (one of which is referenced in FIG. 36). In the illustrated example, the brake rotor 3500 includes a set of threaded fasteners 3600

(e.g., screws, bolts, etc.) (one of which is referenced in FIG. 36) to couple respective ones of the stops 3534 to the brake track 3510. The brake track 3510 has fastener openings 3602 (one of which is referenced in FIG. 36) through which the threaded fasteners 3600 extend. Each of the stops 3534 also has a corresponding fastener opening 3604 (one of which is referenced in FIG. 36). When the brake rotor 3500 is assembled, each threaded fastener 3600 extends through one of the fastener openings 3602 in the brake track 3510 and into one of the fastener openings 3604 in one of the stops 3534. In other examples, the stops 3534 can be coupled to the brake track 3510 using other mechanical and/or chemical fastening techniques.

Figure 37:
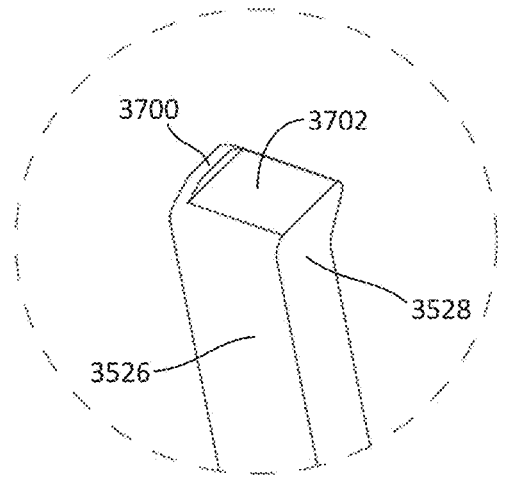
FIG. 37 is an enlarged view of one of the callouts in FIG. 36 showing an example end portion of an example arm of an example carrier.

FIG. 37 is an enlarged view of the callout 3606 from FIG. 36 showing one of the end portions 3528 of one of the arms 3626. The end portions 3528 of the other arms 3526 of the brake rotor 3500 in FIGS. 35A and 35A are identical to the end portion 3528 shown in FIG. 37. Thus, any of the aspects disclosed in connection with the end portion 3528 shown in FIG. 37 likewise apply to the other end portions 3528. The end portion 3528 is identical to the end portion 2528 of the arm 2526 shown in FIG. 27. The end portion 3528 has a tab 3700 extending upward beyond an outer peripheral edge 3702 of the end portion 3528. The tab 3700 forms a first stop that limits axial movement of the brake track 3510 in one axial direction.

Figure 38:
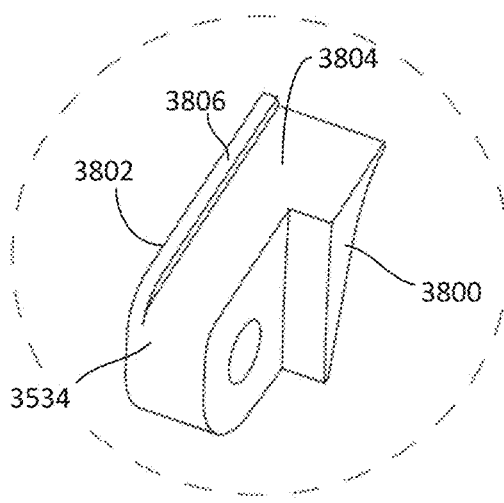
FIG. 38 is an enlarged view of the other callout in FIG. 36 showing an example stop.

FIG. 38 is an enlarged view of the callout 3608 from FIG. 36 showing one of the stops 3534. The other stops 3534 of the brake rotor 3500 of FIGS. 35A and 35B are identical to the stop 3534 shown in FIG. 38. Thus, any of the aspects disclosed in connection with the stop 3534 shown in FIG. 38 likewise apply to the other stops 3534. The stop 3534 has a first side 3800, a second side 3802 opposite the first side 3800, and an outer peripheral edge 3804 between the first and second sides 3800, 3802. As shown in FIG. 38, the stop 3534 has a ledge 3806, formed on the second side 3802, that extends upward beyond the outer peripheral edge 3804. The ledge 3806 forms a second stop that limits axial movement of the brake track 2510 in one axial direction.

Figure 39A:
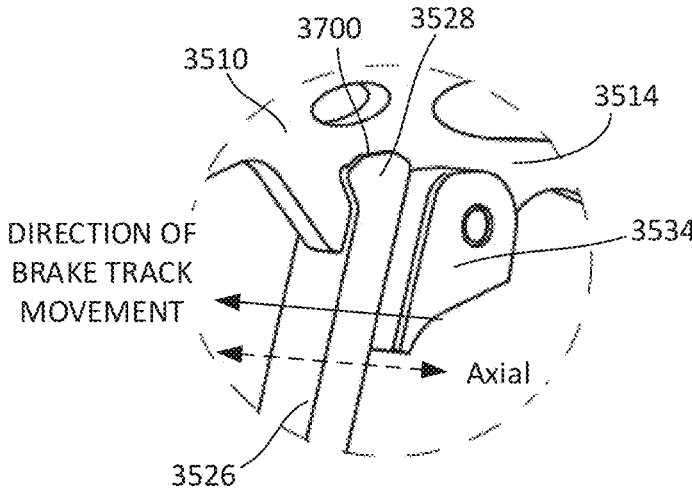
FIGS. 39A, 39B, and 39C are enlarged views of the callout in FIG. 35B showing an example sequence of axial movement of an example brake track between two stops.
Figure 39B:
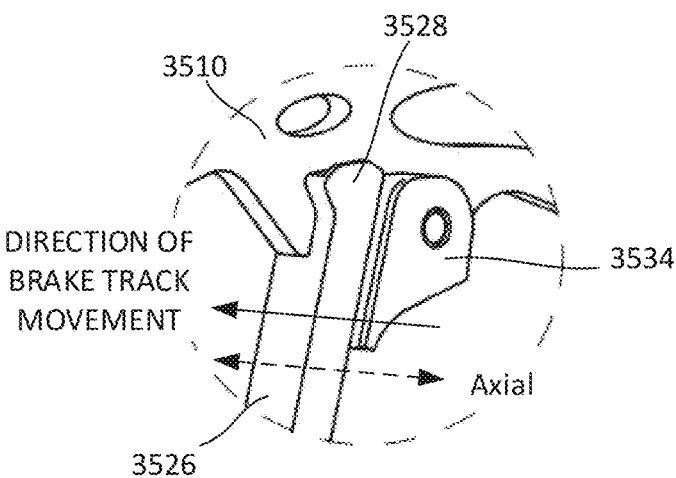
Figure 39C:
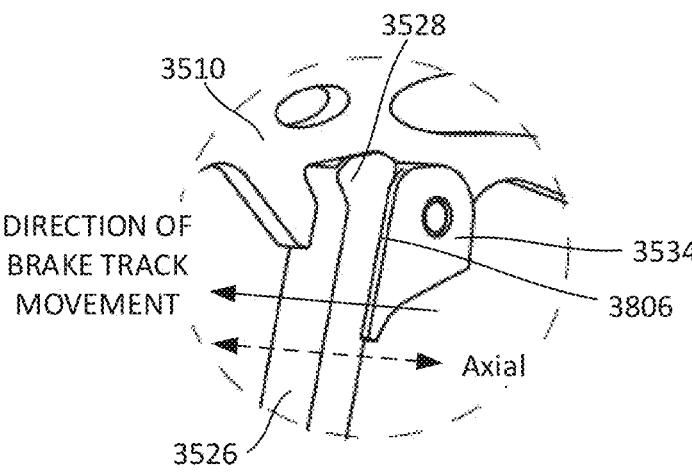

FIGS. 39A-39C are enlarged views of the callout 3536 from FIG. 35B showing an example sequence of the brake track 3510 being moved axially. The end portion 3528 of the arm 3526 is disposed in the notch 3532 in brake track 3510. The brake track 3510 is axially slidable on the end portion 3528 of the arm 3526. The stop 3534 is coupled to the brake track 3510 adjacent the arm 3526. In FIG. 39A, the tab 3700 on the end portion 3528 is engaged with the second side 3514 of the brake track 3510. This limits the brake track 3510 from being further moved in one axial direction (to the right in FIG. 39A). As shown in the sequence in FIGS. 39A-39C, the brake track 3510 can be moved axially in the opposite direction. In FIG. 39C, the end portion 3528 is engaged the ledge 3806 on the stop 3534. The ledge 3806 on the stop 3534 overlaps with the arm 3526 in the axial direction. The ledge 3806 limits the brake track 3510 from being further moved in the other axial direction. As such, the tab 3700 is a first stop that limits axial movement in a first axial direction and the stop 3534 is a second stop that limits axial movement in a second axial direction. In this example, both the tab 3700 and the ledge 3806 (i.e., the first and second stops) are on the same side of the brake rotor 3500. In particular, the tab 3700 and the ledge 3806 are on the second side 3504 of the brake rotor 3500. In some examples, when the brake track 3510 is moved axially, the arm 3526 is engaged with and slides on the outer peripheral edge 3804 (FIG. 38) of the stop 3534. In other examples, the stop 3534 is spaced from the arm 3526 such that the arm 3526 does not slide on the stop 3534. In some examples, instead of using the stop 3534 to provide a limit in one axial direction, a second tab can be formed on the opposite side of the arm 3526. For example, similar to the tab 3700, a second tab may extend upward beyond the outer peripheral edge 3702 on the first side 3520 of the end portion 3528 opposite the tab 3700. In such an example, the brake track 3510 is axially movable between the tab 3700 (a first stop) and a second tab (a second stop). In some examples, the second stop may be formed (e.g., by deforming the arm 3526) after the brake track 3510 is on the carrier 3508, thereby trapping the brake track 3510 between the tabs.

Figure 40:
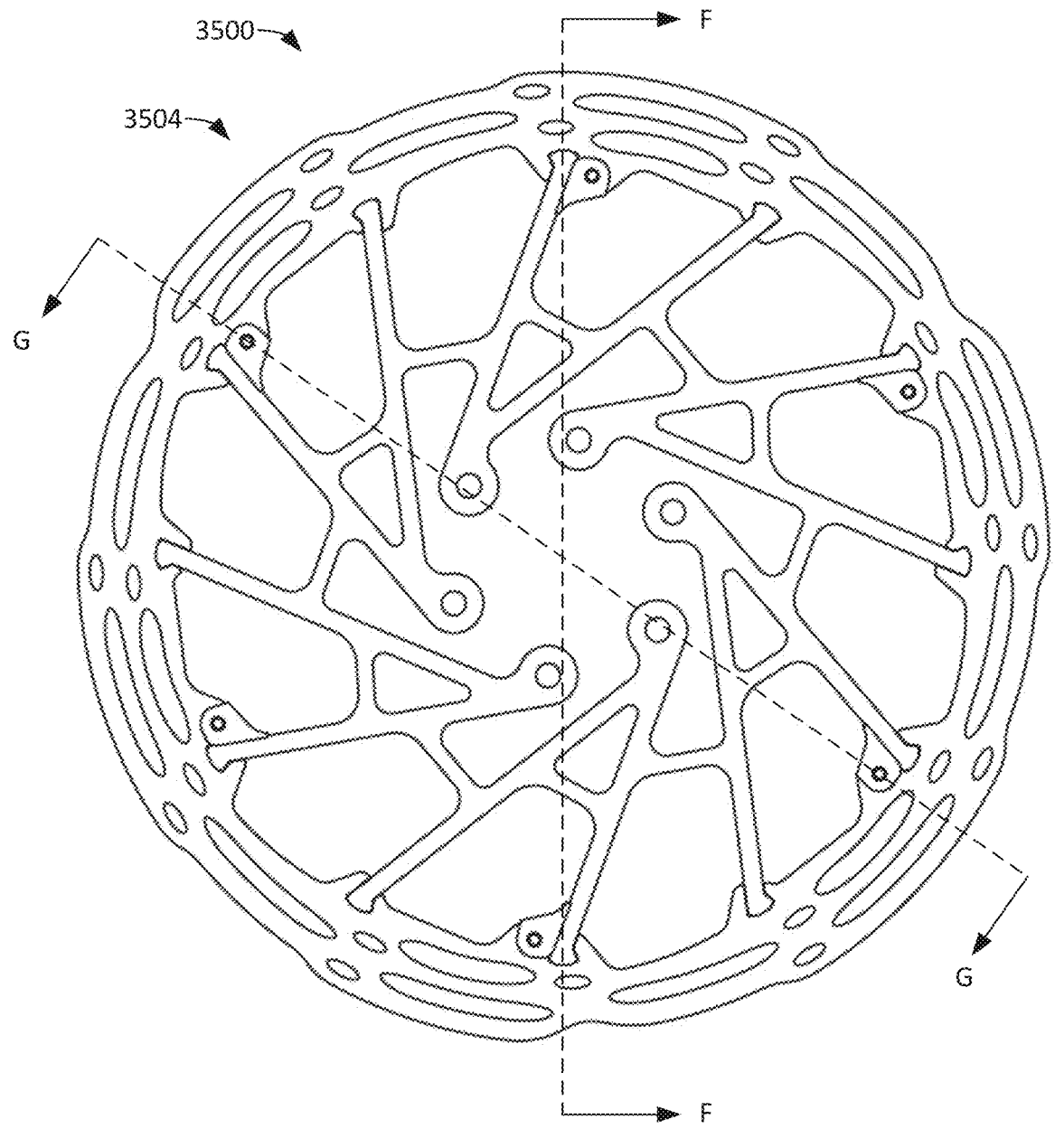
FIG. 40 is a side view of the example brake rotor of FIGS. 35A and 35B.

FIG. 40 is a side view of the second side 3504 of the brake rotor 3500. FIG. 41 is a cross-sectional view of the brake rotor 3500 taken along line F-F in FIG. 40. FIGS. 42A, 42B, and 42C are enlarged views of the callout 4100 from FIG. 41 showing the brake track 3510 and the stop 3534 in three different axial positions. The axial positions shown in FIGS. 42A-42C also correspond to the axial positions shown in FIGS. 39A-39C. As shown in FIG. 42A, the brake track 2510 has a thickness T1 and the carrier 3508 (e.g., the end portion 3538 of the arm 3526) has a thickness T2 that is greater than the thickness T1 of the brake track 3510. The brake track 210 can move axially (to the left and right in FIGS. 42A-42C) relative to the carrier 3508. FIG. 42A shows the brake track 3510 in a first limit position, in which the brake track 3510 is engaged with the tab 3700 on the end portion 3528 of the arm 3526. The brake track 3510 is restricted from moving further to the left in FIG. 42A by the tab 3700. FIG. 42B shows the brake track 3510 in a center position. FIG. 42C shows the brake track 3510 moved to a second limit position, in which the ledge 3806 on the stop 3534 is engaged with the end portion 3528 of the arm 3526. In this example, the center range CR is defined by the inner surfaces of the tab 3700 and the first side 3520 of the carrier 3508, as shown in FIG. 42A. The center range CR is about the same as the thickness T2 of the carrier 3508 (minus the thickness of the tab 3700).

FIG. 43 is a cross-sectional view of the brake rotor 3500 take along line G-G in FIG. 40. FIG. 44 is an enlarged view of the callout 4300 from in FIG. 43. FIG. 44 shows the fastener 3600 that couples the stop 3534 to the brake track 3510. In this example, the fastener opening 3604 in the stop 3534 is threaded but the fastener opening 3602 in the brake track 3510 is not threaded. In other examples, the fastener opening 3602 in the brake track 3510 may also be threaded.

Figure 45:
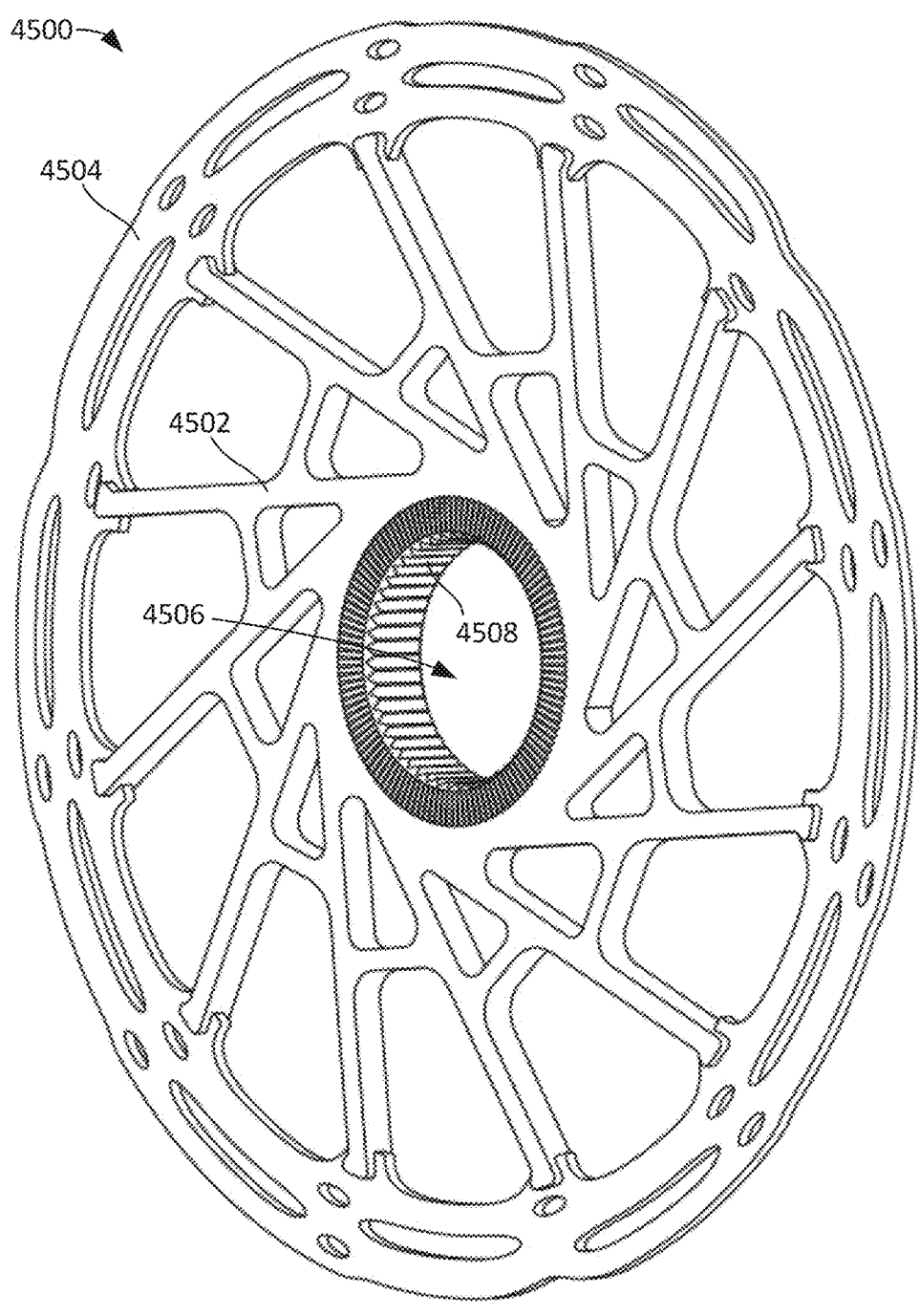
FIG. 45 is a perspective view of an example rotor constructed in accordance with the teachings of this disclosure. The example brake rotor includes a center-lock style carrier.

While the example brake rotors 200, 1000, 2500, and 3500 disclosed above include a six bolt mounting system for mounting to a hub, any of the example brake rotors disclosed herein can instead include a center-lock style mounting carrier for mounting to a hub. For example, FIG. 45 is a perspective view of an example brake rotor 4500. The brake rotor 4500 includes a carrier 4502 and a brake track 4504 that are substantially the same as the brake rotor 200 disclosed in connection with FIGS. 2A and 2B. However, in this example, the carrier 202 has a central opening 4506 defined by a splined interface 4508. The splined interface 4508 can be engaged (e.g., meshed) with a corresponding spline interface on the hub, and which may or may not include a lock ring. In other examples, any of the example brake rotors disclosed herein can be coupled to the hub in other manners.

In the example rotors 200, 1000, 2500, 3500, and 4500 disclosed above, the movable (e.g., slidable) interface that allows for the axial movement is between the brake rotor and the carrier, and which is radially outward of the hub attachment section of the carrier. This interface has a relatively large diameter. In particular, the sliding interface is formed between the outer diameter of the carrier and the inner diameter of the brake track. In other examples, this sliding interface can have smaller diameter. For example, the brake rotor can be configured such that the movable (e.g., slidable) interface is at the hub attachment section of the carrier.

Figures 46, 47:
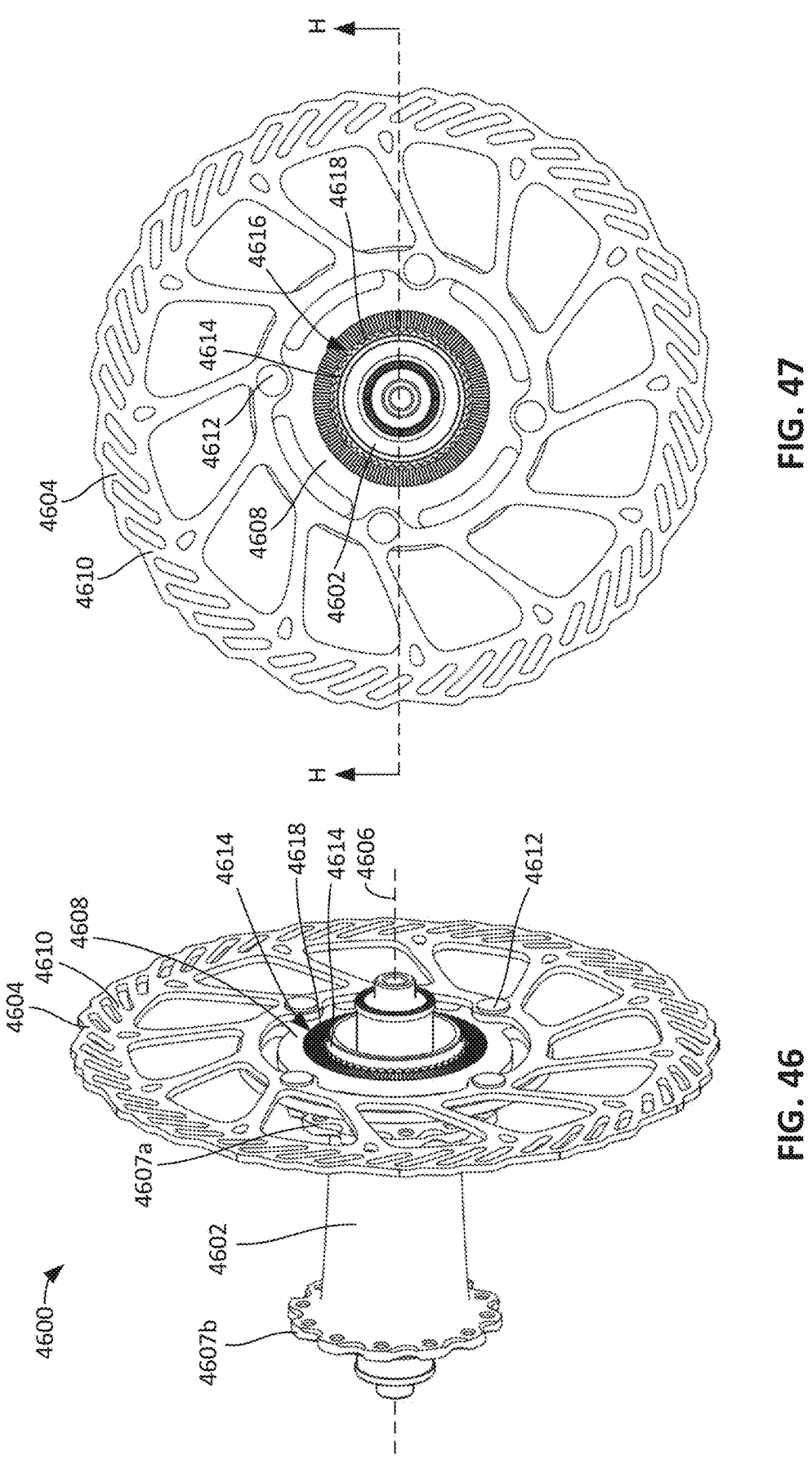
FIG. 46 is a perspective view of an example hub assembly constructed in accordance with the teachings of this disclosure. The example hub assembly includes an example hub and an example brake rotor.
FIG. 47 is a side view of the example brake rotor and the example hub of FIG. 46.

FIG. 46 is a perspective view of an example hub assembly 4600 including an example hub 4602 and an example brake rotor 4604 constructed in accordance with the teachings of this disclosure. The brake rotor 4604 is disposed on the hub 4602. The hub 4602 and the brake rotor 4604 rotate about a central axis 4606. As such, the central axis 4606 is the same as the rotational axis, which defines the coordinate reference for the axial, radial, and circumferential directions referenced herein. FIG. 47 is a side view of the brake rotor 4604 on the hub 4602. The hub 4602 may be a rear hub or a front hub of a wheel on a bicycle, such as the bicycle 100 of FIG. 1. The hub 4602, as shown in FIG. 46, has a first spoke-attachment flange 4607a and a second spoke-attachment flange 4607b. A wheel having the example hub assembly 4600 may have spokes that can be attached to the first and second spoke-attachment flanges 4607a, 4607b.

As shown in FIGS. 46 and 47, the brake rotor 4604 includes a carrier 4608 and a brake track 4610 coupled to the carrier 4608. The brake track 4610 has braking surfaces to be engaged by brake pads. In this example, the brake track 4610 is fixedly coupled to the carrier 4608. As such, the brake track 4610 is constrained axially, radially, and circumferentially relative to the carrier 4608. In the illustrated example, the brake track 4610 and the carrier 4608 are coupled via a set of fasteners 4612 (e.g., rivets, screws, etc.) (one of which is referenced in FIGS. 46 and 47). However, in other examples, the brake track 4610 and the carrier 4608 can be coupled using other fastening techniques. In some examples, the fasteners 4612 and/or the carrier 4608 are constructed of aluminum alloy, steel alloy, a structural polymer, or other composite material.

As shown in FIGS. 46 and 47, the hub 4602 has a first spline interface 4614. The carrier 4608 has a central opening 4616 defined by a second spline interface 4618. The second spline interface 4618 is engaged (e.g., meshed) with the first spline interface 4614 on the hub 4602. As such, the brake rotor 4604 and the hub 4602 are rotationally fixed together. This interface also radially and circumferentially constrains the brake rotor 4604. However, the carrier 4608 of the brake rotor 4064 is axially movable (e.g., slidable) on the hub 4602. This enables the brake rotor 4604 to move axially relative to the hub 4602 for re-centering during braking operations. Therefore, in this example, the sliding interface that enables axial movement of the brake rotor 4604 (and, thus, the brake track 4610) is between the first spline interface 4614 of the hub 4602 and the second spline interface 4618 of the brake rotor 4604. In some examples, the sliding interface is less than half the diameter of the brake rotor 4604. In other examples, the sliding interface may be greater than or less than half the diameter of the brake rotor 4604.

Figure 48:
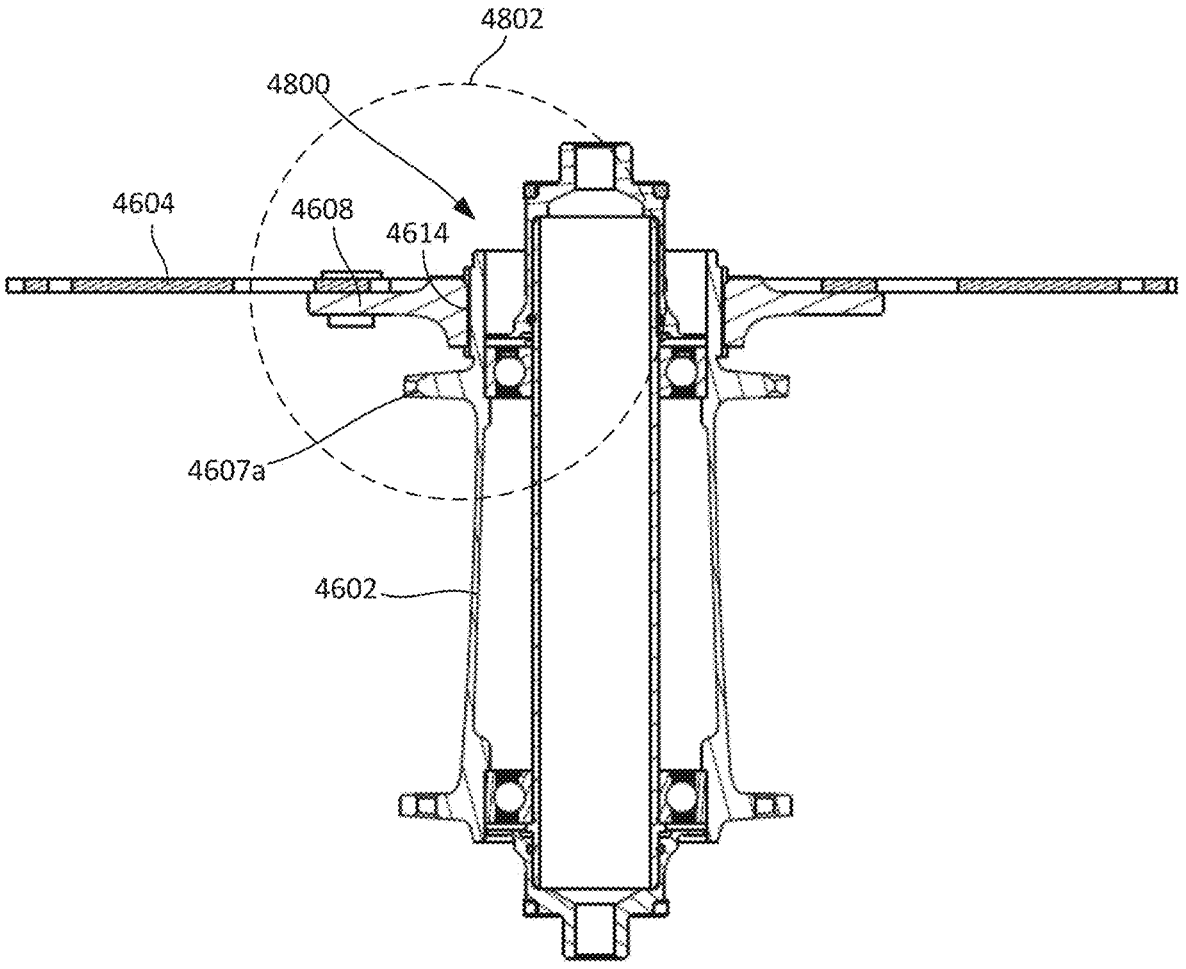
FIG. 48 is a cross-sectional view of the example brake rotor and the example hub of FIG. 46 taken along line H-H of FIG. 47.

FIG. 48 is a cross-sectional view of the hub 4602 and brake rotor 4604 taken along line H-H in FIG. 47. The hub 4602 has a frame attachment section 4800, which is a section where a member of the frame of the bicycle attaches to the hub 4602. As shown in FIG. 48, the first spline interface 4614 is between the first spoke-attachment flange 4607a and the frame attachment section 4800. The carrier 4608 of the brake rotor 4604 is axially slidable on the first spline interface 4614.

FIGS. 49A, 49B, and 49C are enlarged views of the callout 4802 from FIG. 48 showing the brake rotor 4604 in three different axial positions on the hub 4602. FIG. 49A shows the brake rotor 4604 in a center position. The brake rotor 4604 is movable (e.g., slidable) in the axial direction (up or down in FIG. 49A) relative to the hub 4602. This enables the brake rotor 4604 to self-center when the brake pads are applied. For example, FIG. 49B shows the brake rotor 4604 moved in a first axial direction to an inboard position, and FIG. 49C shows the brake rotor 4604 moved in a second axial to an outboard position. The frictional force of the sliding interface between the brake rotor 4604 and the hub 4602 is the same as the frictional force disclosed in connection with the other brake rotors disclosed herein. In particular, the frictional force between the first spline interface 4614 of the hub 4602 and the second spline interface 4618 of the brake rotor 4604 is an amount that the brake rotor 4604 can slide axially on the hub 4602 when engaged with a sufficient force (e.g., 1 newton) by the brake pads, but when the brake pads are released, the friction holds the brake rotor 4604 in substantially the same axial position on the hub 4602.

As shown in FIG. 49A, the second spline interface 4618 of the carrier 4608 has a thickness of T1. In this example, the second spline interface 4618 is less than the thickness of the carrier 4608, because the central opening 4616 flares outward on one end. The first spline interface 4614 of the hub 4602 has a thickness of T2 that is greater than the thickness T1 of the second spline interface 4618, which allows the brake rotor 4604 to move axially on the hub 4602 without extending beyond the hub 4602. In this example, the brake rotor 4604 has a center range CR that corresponds to the thickness T2 of the first spline interface 4618 of the hub 4602. However, in other examples, the center range CR may be greater than or less than the thickness T2. In some examples, the center range CR may be any amount that is greater than the thickness T1 of the second spline interface 4618 of the carrier 4608. In other words, the center range CR can be any factor that is greater than the thickness T1 of the second spline interface 4618, such as 1.1×, 1.2×, 1.3×, etc.

In the illustrated example, the hub assembly 4600 does not include any stops to limit axial movement to the center range CR. However, as disclosed in connection with the brake rotor 200 in FIGS. 8 and 9, the brake pads may define stops that limit the axial movement and define the center range CR. Additionally or alternatively, the brake rotor 4604 may be stopped by one or more other structures that are adjacent the brake rotor 4604. For example, if the brake rotor 4604 is moved axially inboard a sufficient amount, the carrier 4608 engages the first spoke-attachment flange 4607a. If the brake rotor 4604 is moved axially outboard a sufficient amount, the carrier 4608 engages a portion of the frame of the bicycle at the frame attachment section 4800. Therefore, the brake rotor 4604 is axially movable on the first spline interface 4614 of the hub between the first spoke-attachment flange 4607a and the frame attachment section 4800. As such, the center range CR is defined by the first spoke-attachment flange 4607a and the frame attachment section 4800. In other examples, one or more stops may be formed on one or both sides to limit the axial movement.

In some examples, a brake rotor may be axially slidable on a hub, as shown in FIG. 46, and may include a brake track that is axially slidable on a carrier. For example, any of the example brake rotors 200, 1000, 2500, 3500, and 4500 can be implemented with a spline interface as shown in FIGS. 46 and 47. This provides two layers of axial movement.

As disclosed herein, some example brake rotors have sliding interfaces that are radially outward from the hub attachment section and other brake rotors having sliding interfaces that are at the hub attachment section. The dimensions of the brake rotor and/or its components can be varied as desired. In some examples, to prevent or limit the brake rotor from binding, the brake rotor is designed with a ratio L/D that is less than or equal to 10. L is the length or distance between the brake pad center and the sliding interface of the brake rotor (whether between the brake track and the carrier, or between the carrier and the hub), and D is the sliding interface depth. This ratio is demonstrated in connection with FIGS. 50-53 and disclosed in further detail below.

Figure 50:
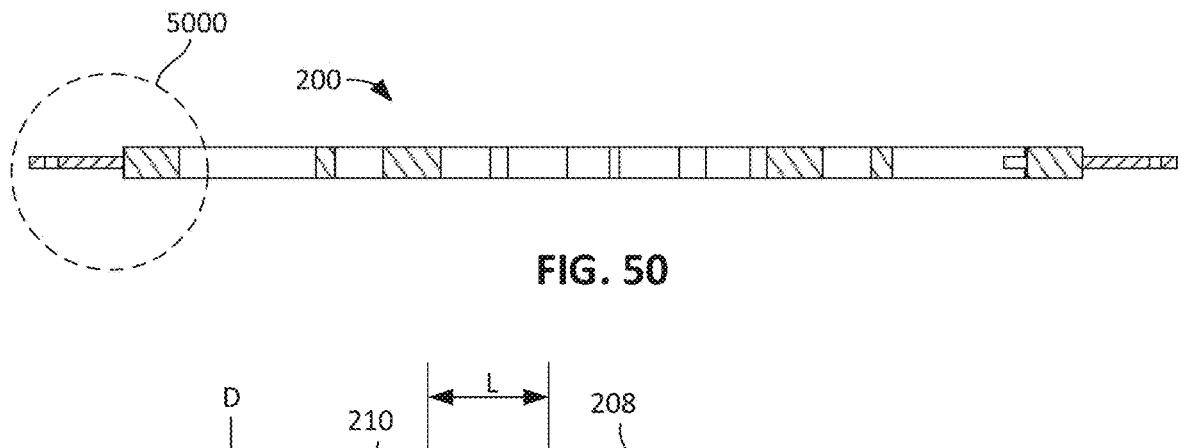
FIG. 50 is another cross-sectional view of the example brake rotor of FIGS. 2A and 2B taken along line A-A in FIG. 3.
Figure 51:
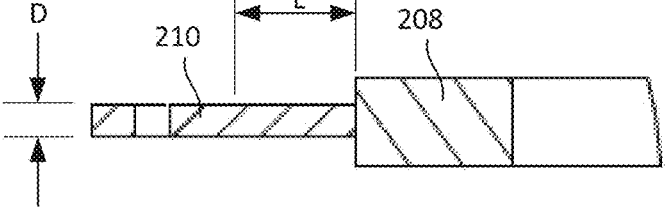
FIG. 51 is an enlarged view of the callout in FIG. 50.

FIG. 50 is a cross-sectional view of the brake rotor 200 of FIGS. 2A and 2B taken along line A-A of FIG. 3. FIG. 51 is an enlarged view of the callout 5000 from FIG. 50. The depth D and the length L are labeled in FIG. 51. The depth D is the depth or thickness of the sliding interface (which is defined by the contact surface between the brake track 210 and the carrier 208). In this example, the depth D correspond to the thickness of the brake track 210. The length L is the distance between the center of the brake pad (where the brake pad would be aligned) and the sliding interface. If the L/D ratio becomes too large, such as if the length L is increased significantly compared to the depth D, the brake track 210 may have tendency to become misaligned and bind on the carrier 208. Therefore, as disclosed above, having the L/D ratio equal to or less than 10 helps to prevent or limit this potential binding.

Figure 52:
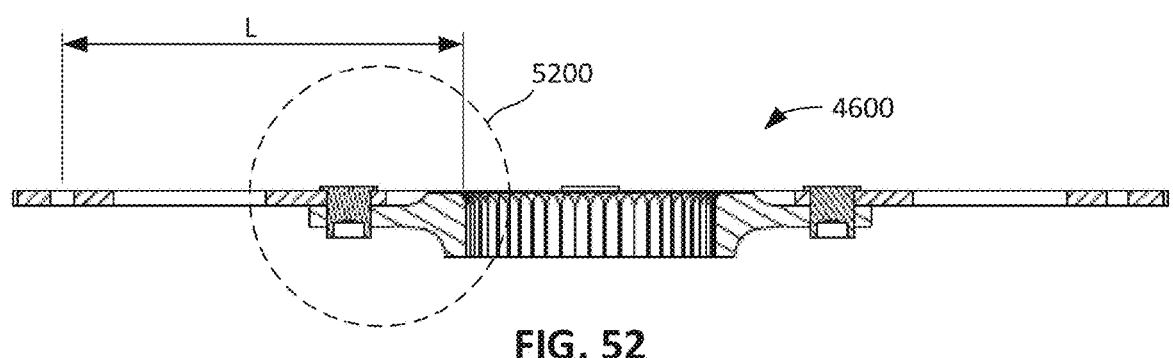
FIG. 52 is a cross-sectional view of just the example brake rotor of FIG. 46 taken along line H-H of FIG. 47.
Figure 53:
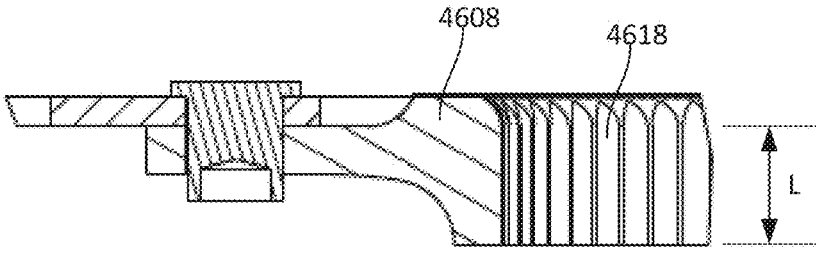
FIG. 53 is an enlarged view of the callout in FIG. 52.

This ratio also applies to configurations having a sliding interface at the hub attachment section. For example, FIG. 52 is a cross-sectional view of the brake rotor 4604 of FIG. 46 taken along line H-H of FIG. 47. The length L is labeled in FIG. 52. The length L is the distance between the center of the brake pad and the sliding interface (which is defined by the contact surface between the carrier 4608 and the hub 4602 (FIG. 46)). FIG. 53 is an enlarged view of the callout 5200 from FIG. 52. The depth D is labeled in FIG. 53. The depth D is the depth or thickness of the second spline interface 4618 of the carrier 4608, which forms the sliding interface. As disclosed above, having the L/D ratio equal to or less than 10 helps to prevent or limit potential binding. However, in other examples, other L/D ratios may be implemented.

Also disclosed herein are example disc brake calipers that can be disposed inboard of a frame member of a bicycle, such as a between the frame member and the wheel. For example, an example rear disc brake caliper is disclosed herein that can be coupled to an inboard side of the rear frame portion at the hub assembly, between the rear frame portion and the rear wheel. As another example, an example front brake caliper is disclosed herein that can be coupled to an inboard side of a tube or leg of the front fork, between the leg and the front wheel. As such, the example brake calipers are more protected from outside elements than known disc brake calipers. In particular, known disc brake calipers are mounted circumferentially offset from the geometric center of the frame or fork member of the bicycle. As such, known disc brake calipers are more exposed and prone to being hit or contacted by foreign objects while riding (e.g., sticks, rocks, branches, etc.). Therefore, the example disc brake caliper disclosed herein are less prone to wear and tear because they are disposed more inboard and at least partially protected by the frame. Further, because the example brake calipers disclosed herein are inboard of the frame, the example brake calipers improve the aerodynamics of the bicycle. Also, in this inboard position, the example brake calipers are least partially hidden by the frame, which provides a streamlined appearance that is more aesthetically appealing to riders than known brake calipers.

In some examples disclosed herein, an example brake caliper includes an outboard brake pad that is fixed or non-moveable and an inboard brake pad that is actuatable (moveable). In some examples, the brake caliper is used in connection with a brake rotor having an axially moveable brake track, such as one of the example brake rotors disclosed in connection with FIGS. 2-53. When the brake caliper is actuated (e.g., by pulling the brake lever), the inboard brake pad moves toward (outboard) the outboard brake pad, which moves the brake track toward the outboard brake pad and clamps the brake track between the outboard and inboard brake pads. Therefore, in some examples, by using a brake rotor with an axially moveable brake track, only one of the brake pads needs to be moveable. As a result, the example brake calipers disclosed herein are thinner (in the axial direction) than known brake calipers. In particular, because the outboard brake pad is fixed, the outboard side of the brake caliper does require space for an actuation mechanism (e.g., cylinders and pistons) to move the outboard brake pad. Therefore, the axial width of the brake caliper is relatively small, which enables the brake caliper to fit between the frame of the bicycle and the wheel. Further, the example brake calipers are lighter and less expensive because of the reduced actuating and adjustment mechanisms needed for the fixed brake pad.

Further, this design enables the outboard brake pad to be disposed relatively close to the frame of the bicycle, and only separated from the frame by the thickness of the caliper body or housing. Known brake calipers are mounted relatively far from the frame of the bicycle, which results in higher stress and force on the caliper mounting components during braking. However, because the outboard caliper portion of the example brake caliper is relatively thin, the outboard brake pad is disposed relatively close to the centerline (e.g., longitudinal or central axis) of the frame member of the bicycle. This reduces bending moments and twisting forces that otherwise require additional structural material, component weight, and cost.

The example brake calipers disclosed herein can also be used with traditional or fixed brake track rotors. In such an example, the inboard brake pad partially bends the brake rotor when engaging the brake rotor toward the outboard brake pad. In other examples disclosed herein, the brake caliper can be configured such that the inboard brake pad is fixed and the outboard brake pad is moveable. In still other examples, both brake pads may be moveable. The example brake caliper disclosed herein can be hydraulically or cable actuated.

Figure 54:
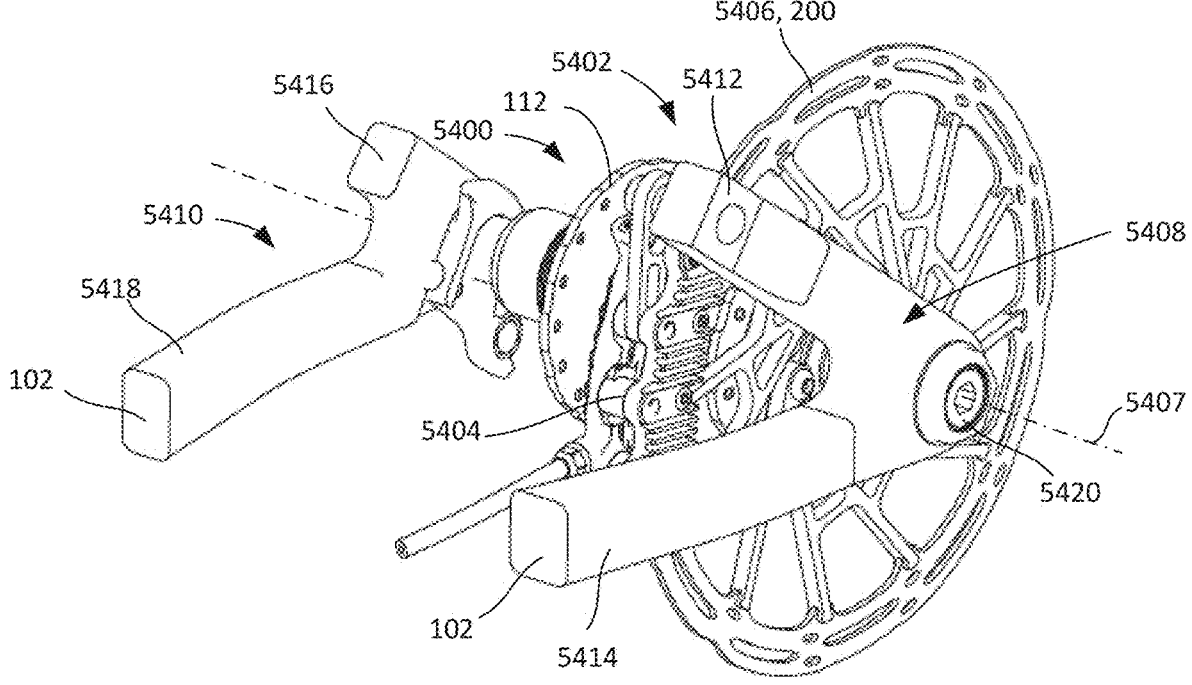
FIG. 54 is a perspective view of an example rear hub assembly and an example rear brake including an example rear brake caliper and an example brake rotor on the example bicycle of FIG. 1.

FIG. 54 is a perspective view of an example rear hub assembly 5400 and an example rear brake 5402 that can be implemented on the bicycle 100 (FIG. 1). The example rear brake 5402 includes an example rear brake caliper 5404 and an example brake rotor 5406. In the illustrated example, the brake rotor 5406 is implemented as the example brake rotor 200 of FIGS. 2-9, which has a moveable brake track. In other examples, the brake rotor 5406 can be implemented by another example brake rotor disclosed herein having a moveable brake track. In other example examples, the brake rotor 5406 can be implemented by any other type of brake rotor having a moveable brake track or a non-moveable brake track.

In the illustrated example, the frame 102 of the bicycle 100 (FIG. 1) has a left frame portion 5408 and a right frame portion 5410. The left frame portion 5408 has a left seatstay 5412 and a left chainstay 5414, and the right frame portion 5410 has a right seatstay 5416 and a right chainstay 5418. The hub assembly 5400 includes the rear hub 112 and an axle 5420 about which the rear hub 112 rotates. The rear wheel 106 (not shown in FIG. 54, but shown in FIG. 1) is coupled to the rear hub 112. The axle 5420 is coupled to the left and right frame portions 5408, 5410 (e.g., at an intersection of the left seatstay and chainstay 5412, 5414 and an intersection of the right seatstay and chainstay 5416, 5418). The brake rotor 5406 is coupled (e.g., via one or more fasteners, via a spline connection) to the rear hub 112 and rotates with the rear wheel 106 (not shown in FIG. 54, but shown in FIG. 1). The axle 5420 defines a rotational axis 5407 about which the rear hub 112 and the brake rotor 5406 rotate. The rear brake caliper 5404 can be activated (e.g., via hydraulic pressure or a cable) to engage the brake rotor 5406, thereby slowing the rear wheel 106 to slow the bicycle 100.

In the illustrated example, the brake rotor 5406 is disposed inboard of the left frame portion 5408, between the left frame portion 5408 and the rear wheel 106 (shown in FIG. 1). Known bicycles have rear brake calipers that are positioned outboard of the frame or in line (forward or rear) of the frame. In some examples, the rear brake caliper 5404 has a fixed (non-moveable) outboard brake pad and a moveable inboard brake pad, as disclosed in further detail herein. As such, the rear brake caliper 5404 is relatively thin, which enables the rear brake caliper 5404 to fit between the frame 102 and the rear wheel 106 (FIG. 1). Therefore, the rear brake caliper 5404 is more protected from outside elements by the frame 102 compared to known brake caliper positions. Further, this position is more aerodynamic and aesthetically appealing to riders. Also, this location is also more structurally optimal for transferring forces from the rear brake caliper 5404 to the frame 102.

Figure 55:
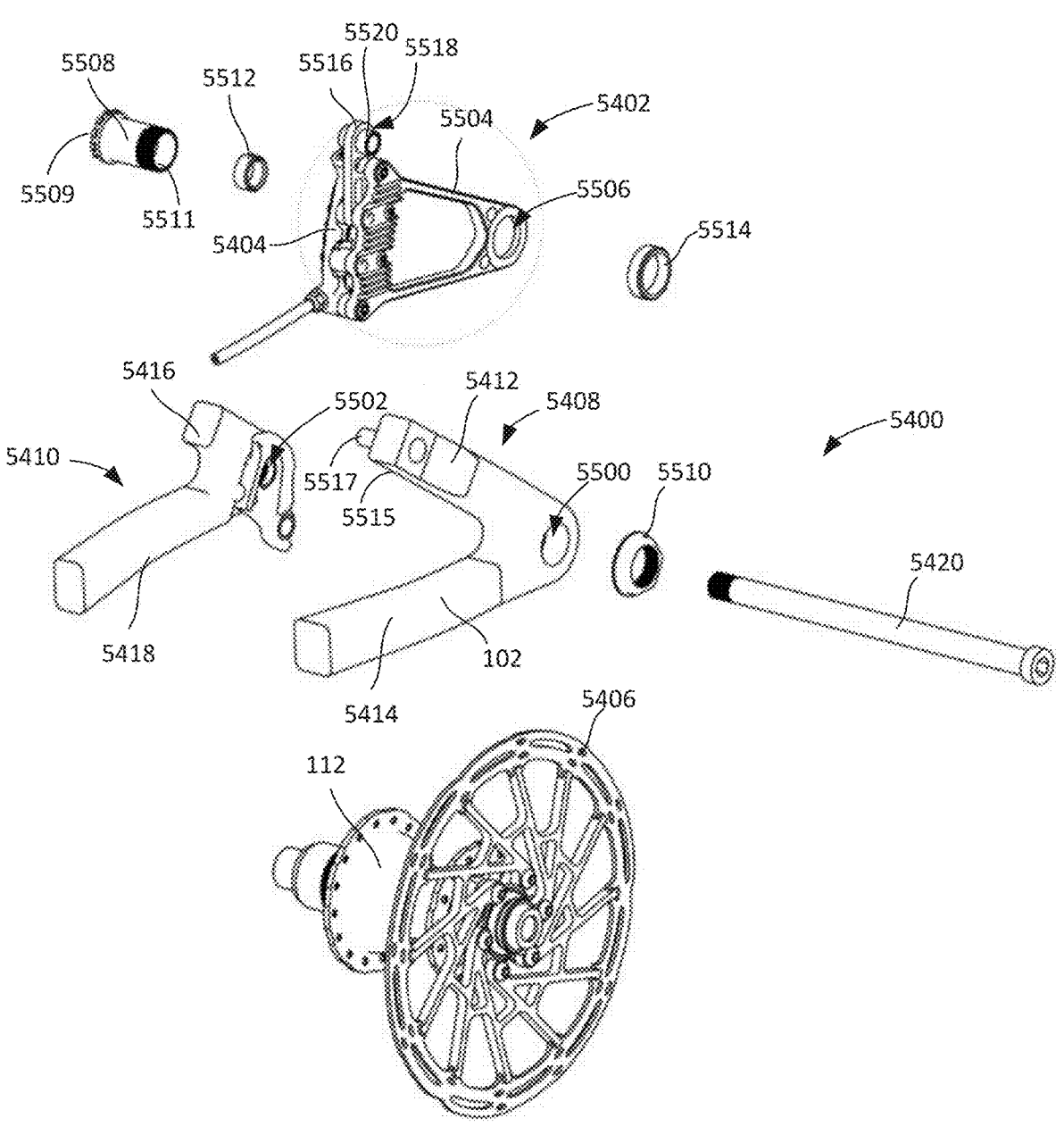
FIG. 55 is an exploded view of the example rear hub assembly and the example rear brake of FIG. 54.

FIG. 55 is an exploded view of the example rear hub assembly 5400 and the example rear brake 5402 of FIG. 54. When assembled, the axle 5420 extends through the rear hub 112 and into first and second axle openings 5500, 5502 in the left and right frame portions 5408, 5410. In some examples, the first axle opening 5500 is a through-hole, and the second axle opening 5502 is threaded. The axle 5420 can be inserted through the first axle opening 5500 and the hub assembly 5400 and screwed into the second axle opening 5502.

To accommodate the rear wheel 106 (FIG. 1), the chainstays 5414, 5418 and seatstays 5412, 5416 extend a relatively long distance from their connection to the main frame (e.g., a standard chainstay length is about 430-460 millimeters (mm)). This geometric boundary condition affects the alignment tolerances of the axle openings 5500, 5502 in the frame portions. Therefore, bicycle manufacturers often enlarge the first axle opening 5500 to enable the axle 5420 to be slightly angled in the first axle opening 5500 to compensate for the potential misalignment between the first and second axle openings 5500, 5502. However, this can result in misalignment between the brake caliper and the brake rotor because the brake rotor is coupled to and referenced to the rear hub assembly. Therefore, in some examples, the rear brake caliper 5404 of the illustrated example is coupled to the hub assembly 5400 such that the rear brake caliper 5404 has a relatively strong axial and radial reference to the rear hub assembly 5400 and a weaker axial and radial reference to the frame 102. As a result, because the brake rotor 5406 is also axially and radially referenced to the hub assembly 5400, the rear brake caliper 5404 remains axially and radially aligned with the rear brake rotor 5406. This enables the brake pads in the rear brake caliper 5404 to remain accurately positioned to the brake rotor 5406. This axial and radial reference is disclosed in further detail in connection with FISG. 64A-64C.

In the illustrated example, the rear brake caliper 5404 includes an axle mounting bracket 5504 (also referred to as an axle mount) defining an opening 5506. The opening 5506 is to receive the axle 5420. In particular, when the rear brake caliper 5404 is installed on the bicycle 100, the axle 5420 extends through the opening 5506. In some examples, the axle mounting bracket 5504 is integral with the rear brake caliper 5404. For example, at least a portion of the rear brake caliper 5404 and the axle mounting bracket 5504 can be constructed (e.g., molded, machined, etc.) as a single unitary part or component (e.g., a monolithic structure). For example, the rear brake caliper 5404 and the axle mounting bracket 5504 can be machined from a piece of steel or aluminum. In other examples, the axle mounting bracket 5504 can be a separate part or component that is coupled (e.g., via one or more fasteners) to the rear brake caliper 5404.

In the illustrated example, the hub assembly 5400 and/or the rear brake 5402 includes a sleeve 5508. In the illustrated example, the sleeve 5008 has an enlarged end 5509 and a distal end 5511 that is threaded. When assembled, the sleeve 5508 extends through the opening 5506 such that the enlarged end 5509 engages an inboard side of the axle mounting brake 5504. The sleeve 5508 extends at least partially into the first axle opening 5500 in the left frame portion 5408. In some examples the sleeve 5508 extends completely through the first axle opening 5500. The axle 5420 extends through and is engaged with the sleeve 5508. As such, the axle mounting bracket 5504 (via the sleeve 5508) forms a first point of contact with the bicycle 100.

In some examples, the axle 5420 can be tighten to axially clamp the sleeve 5508 to the rear hub 112. In some examples, the hub assembly 5400 and/or the rear brake 5402 includes a nut 5510 that can be screwed onto the distal end 5511 of the sleeve 5508. This connection clamps the axle mounting bracket 5504 (and, thus, the rear brake 5402) to the hub assembly 112. In some examples, a washer or bushing 5512 can be disposed in the sleeve 5508 for attachment or allowance of various attachment geometries. In some examples, a washer 5514 is disposed around the sleeve 5508 and between the axle mounting bracket 5504 and an inboard side 5515 of the left frame portion 5408.

In the illustrated example, the rear brake caliper 5404 also includes a frame mounting bracket 5516 (also referred to as a frame mount) that is to be coupled to the frame 102 of the bicycle 100. In particular, in this example, the frame mounting bracket 5516 is configured to be coupled to the left seatstay 5412 of the left frame portion 5408. As such, the frame mounting bracket 5516 forms a second point of contact with the bicycle 100.

In the illustrated example, the hub assembly 5400 and/or the rear brake 5402 includes a post 5517 that is coupled to and extends inboard from the left frame portion 5408. In the illustrated example, the frame mounting bracket 5516 defines an opening 5518. When assembled, the post 5517 extends through the opening 5518. Thus, in this example, the rear brake caliper 5404 is coupled to the bicycle 100 via two points of contact: at the axle 5420 and at the frame 102. These two points of contact hold the rear brake caliper 5404 in position and prevent the rear brake caliper 5404 from rotating or twisting during braking. However, in other examples, the rear brake caliper 5404 can be coupled to the bicycle 100 via more or fewer points of contact and/or the point(s) of contact can be in other location(s).

In some examples, the frame mounting bracket 5516 (and, thus, the rear brake caliper 5404) is axially positionable on the post 5517. This enables the rear brake caliper 5404 to maintain a weaker reference to the frame 102 so that the rear brake caliper 5404 can maintain a stronger axial and radial reference to the hub assembly 5400 and, thus, to the brake rotor 5406. In some examples, the frame mounting brake 5516 can be clamped onto the post 5517 after the axle mounting bracket 5504 is coupled to the hub assembly 5400. In some examples, the rear brake 5402 includes a sleeve 5520 that is to be disposed around the post 5517. The sleeve 5520 can increase the contact area between the frame mounting bracket 5516 and the post 5517. In other examples, the post 5517 can be implemented as a bolt that can be tightened to couple (e.g., clamp) the rear brake caliper 5404 to the frame 102.

Figure 56:
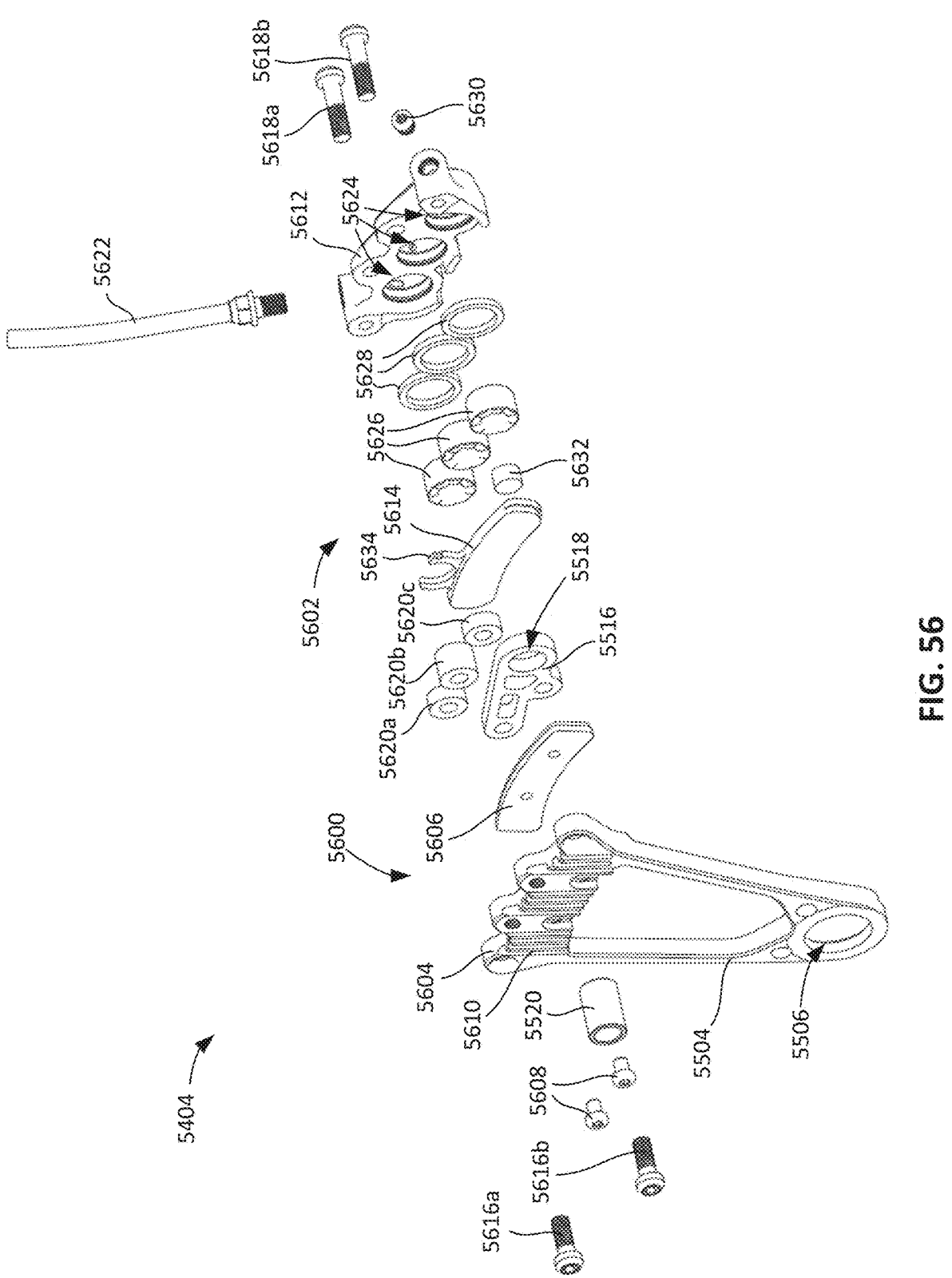
FIG. 56 is an exploded view of the example rear brake caliper of FIG. 54.

FIG. 56 is an exploded view of the rear brake caliper 5404. In the illustrated example, the rear brake caliper 5404 includes an outboard caliper portion 5600 and an inboard caliper portion 5602. When the rear brake caliper 5404 is installed on the bicycle 100 (FIG. 1), the outboard caliper portion 5600 is disposed inboard of the frame 102. Further, when the rear brake caliper 5404 is assembled, the inboard caliper portion 5602 is coupled to the outboard caliper portion 5600. The inboard caliper portion 5602 is disposed inboard of the outboard caliper portion 5600 when the rear brake caliper 5404 is coupled to the bicycle 100.

In the illustrated example of FIG. 56, the outboard caliper portion 5600 includes an outboard caliper body 5604 and an outboard brake pad 5606 (a first brake pad). In this example, the outboard brake pad 5606 is fixed (non-moveable) relative to the outboard caliper body 5604. The outboard brake pad 5606 is coupled to the outboard caliper body 5604 via one or more threaded fasteners 5608 (e.g., bolts or screws). Additionally or alternatively, in other examples, the outboard brake pad 5606 can be coupled to the outboard caliper body 5604 via other coupling techniques (e.g., friction fit, latches, adhesives, etc.). In the illustrated example, the outboard caliper body 5604 includes fins 5610 (one of which is referenced in FIG. 56). The fins 5610 increase the surface area of the rear brake caliper 5404 to help dissipate heat to the surrounding air. In other examples, fins may not be included.

In the illustrated example, the outboard caliper portion 5600 includes the axle mounting bracket 5504. The axle mounting bracket 5504 includes the opening 5506 that the axle 5420 (FIG. 54) extends through. In the illustrated example, the axle mounting bracket 5504 is coupled to and extends from the outboard caliper body 5604. In this example, the axle mounting bracket 5504 is integral with the outboard caliper body 5604. For example, the axle mounting bracket 5504 and the outboard caliper body 5604 can be constructed (e.g., molded, machined, etc.) as a single unitary part or component (e.g., a monolithic structure). In other examples, the axle mounting bracket 5504 can be a separate part or component that is coupled (e.g., via one or more fasteners) to the outboard caliper body 5604.

In the illustrated example, the inboard caliper portion 5602 includes an inboard caliper body 5612 and an inboard brake pad 5614 (a second brake pad). When the rear brake caliper 5404 is assembled, the inboard caliper body 5612 is coupled to the outboard caliper body 5604. In this example, the outboard and inboard caliper bodies 5604, 5612 are coupled by first and second outboard threaded fasteners 5616a, 5616b (e.g., bolts or screws) that extend through the outboard caliper body 5604 and into the inboard caliper body 5612, and first and second inboard threaded fasteners 5618a, 5618b (e.g., bolts or screws) that extend through the inboard caliper body 5612 and into the outboard caliper body 5604. As such, the threaded fasteners 5616a, 5616b, 5618a, 5618b span axially across the brake rotor 5406 (FIG. 54) in attaching the outboard caliper body 5604 to the inboard caliper body 5612, and provide structural stiffness to the rear brake caliper 5404 for slave piston axial forces. The outboard and inboard caliper bodies 5604, 5612 can be separated without fluid loss. Additionally or alternatively, in other examples, the outboard and inboard caliper bodies 5604, 5612 can be coupled via more or fewer fasteners and/or via other coupling techniques (e.g., friction fit, latches, adhesives, etc.). In some examples, one or more spacers 5620a, 5620b, 5620c are disposed between the outboard and inboard caliper bodies 5604, 5612 when the rear brake caliper 5404 is assembled. In some examples, one or more of the threaded fasteners 5616a, 5616b, 5618a, 5618b extends through certain ones of the spacers 5620a, 5620b, 5620c. For example, when the rear brake caliper 5404 is assembled, the first outboard threaded fastener 5616a extends through the first spacer 5620a, the first inboard threaded fastener 5618a extends through the second spacer 5620b, and the second inboard threaded fastener 5618b extends through the third spacer 5620c.

In this example, the inboard brake pad 5614 is the actuating or moving brake pad. In particular, the inboard brake pad 5614 is moveable relative to the inboard caliper body 5612 and, thus, moveable relative to the outboard brake pad 5606 (the fixed brake pad). A portion of a hydraulic brake line 5622 (e.g., a hose) is shown in FIG. 56. The hydraulic brake line 5622 can transfer hydraulic fluid to and from the rear brake caliper 5404. The hydraulic brake line 5622 is coupled to (e.g., threaded into) the inboard caliper body 5612. In this example, the inboard caliper body 5612 defines three cylinders 5624. The inboard caliper portion 5602 includes three pistons 5626 in the respective cylinders 5624. The pistons 5626 are engaged with the inboard brake pad 5614. When a rear brake lever is actuated, hydraulic fluid is pushed into the three cylinders 5624, which pushes the pistons 5626 outward to move the inboard brake pad 5614 toward the outboard brake pad 5606. This motion provides the clamping force to engage the brake rotor 5406 to slow the bicycle 100. In the illustrated example, the inboard caliper portion 5602 includes seals 5628 that can be disposed the cylinders 5618 (between the cylinder walls and the pistons 5626) to prevent the hydraulic fluid from leaking out of the cylinders 5624. The inboard caliper portion 5602 also includes a bleed plug 5630 that can be removed to bleed hydraulic fluid from the inboard caliper body 5612.

When the rear brake caliper 5404 is released, the pistons 5626 move back into the cylinders 5624 and the inboard brake pad 5614 moves away from the outboard brake pad 5606. In some examples, the pistons 5626 are coupled (e.g., via fasteners, adhesives, magnets, etc.) to the inboard brake pad 5614. Therefore, when the pistons 5626 move back into the cylinders 5618 (e.g., via lower hydraulic pressure in the cylinders 5624), the inboard brake pad 5614 is moved with the pistons 5626 toward the inboard caliper body 5612. Additionally or alternatively, the inboard caliper portion 5602 can include a return mechanism for moving the inboard brake pad 5614 back toward the inboard caliper body 5612 after the hydraulic pressure is removed. For example, the inboard caliper portion 5602 can include a magnet 5632 that is coupled (e.g., glued) to the inboard caliper body 5612. The inboard brake pad 5614 may be at least partially constructed of steel or another magnetic material. When the hydraulic brake pressure is released, the magnetic attraction between the inboard brake pad 5614 and the magnet 5632 causes the inboard brake pad 5614 to move back toward the inboard caliper body 5612 to push the pistons 5626 into the cylinders 5624. Additionally or alternatively, in other examples, other types of return mechanisms (e.g., springs) can be used. While in this example the inboard caliper body 5612 includes three cylinders and pistons, in other examples, the inboard caliper body 5612 can have more or fewer cylinders and pistons.

In the illustrated example, the inboard brake pad 5614 includes a guide 5634. When the rear brake caliper 5404 is assembled, the guide 5634 is disposed around the second spacer 5620*b*. The guide 5634 slides along the second spacer 5620*b* as the inboard brake pad 5614 moves. This helps ensure the inboard brake pad 5614 remains parallel to the brake rotor 5406 (FIG. 54).

In the illustrated example, the rear brake caliper 5404 includes the frame mounting bracket 5516. The frame mounting bracket 5516 is to be coupled to at least one of the outboard caliper body 5604 or the inboard caliper body 5612. In this example, when the rear brake caliper 5404 is assembled, the frame mounting bracket 5516 is coupled (e.g., clamped) between the outboard caliper body 5604 and the inboard caliper body 5612. In some examples, one or more of the threaded fasteners 5616*a*, 5616*b*, 5618*a*, 5618*b* extends through the frame mounting bracket 5516. For example, the second outboard threaded fastener 5616*b* and the second inboard threaded fastener 5618*b* extend through the frame mounting bracket 5516. The frame mounting bracket 5516 includes the opening 5518. In some examples, the opening 5518 receives the post 5517 (FIG. 55) extending inboard of the frame 102. In some examples, the frame mounting bracket 5516 can be clamped to the post 5517. In some examples, the rear brake caliper 5404 includes the sleeve 5520, which can be disposed around the post 5517 (FIG. 55). In other examples, the post 5517 can be implemented as a fastener (e.g., a bolt, a screw, a rivet, etc.) that can be inserted through the opening 5518 and attached to the frame 102 of the bicycle 100 to couple the rear brake caliper 5404 to the frame 102. In some examples, the frame mounting bracket 5516 can be formed integrally with one of the outboard caliper body 5604 or the inboard caliper body 5612.

When the rear brake caliper 5404 is assembled, the outboard caliper body 5604, the inboard caliper body 5612, and the frame mounting bracket 5516 form the body or housing of the rear brake caliper 5404. The outboard brake pad 5606 is axially fixed relative to the body, and the inboard brake pad 5614 is axially moveable relative to the body. While in this example the body is formed by three separate bodies, in other examples, one or more of the bodies can be integrally formed as single unitary part or component (e.g., a monolithic structure). For example, the frame mounting brake 5516 can be integral with the outboard caliper body 5604.

In some examples, the outboard and inboard brake pads 5606, 5614 are the same size and material. In other examples, the outboard and inboard brake pads 5606, 5614 can have different geometries and/or materials. For example, the outboard brake pad 5606 can be more thermally conductive to improve heat sink function, and may have more surface area for a lesser wear rate. The inboard brake pad 5614 can be less thermally conductive for a lesser conduction rate to hydraulic fluid.

Figure 57:
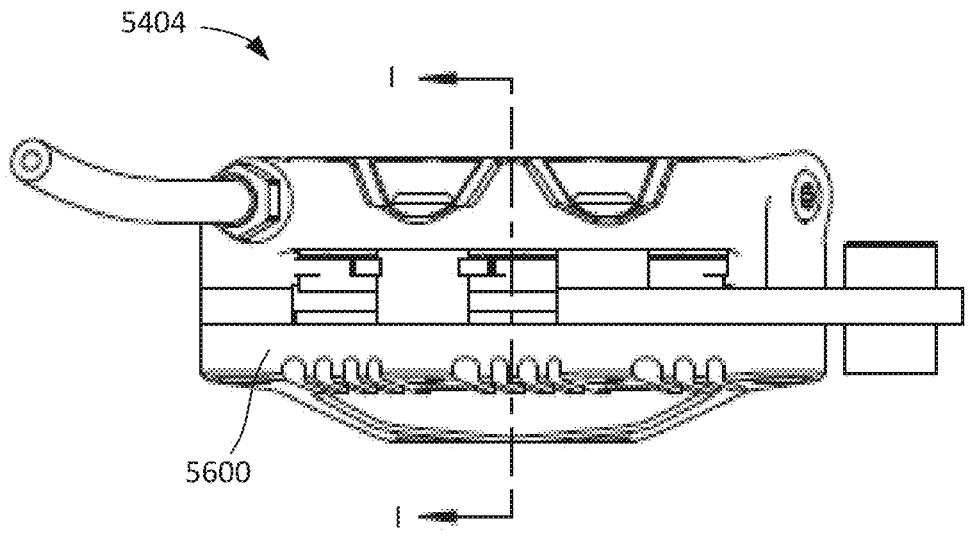
FIG. 57 is a top view of the example rear brake caliper of FIG. 54.
Figure 58:
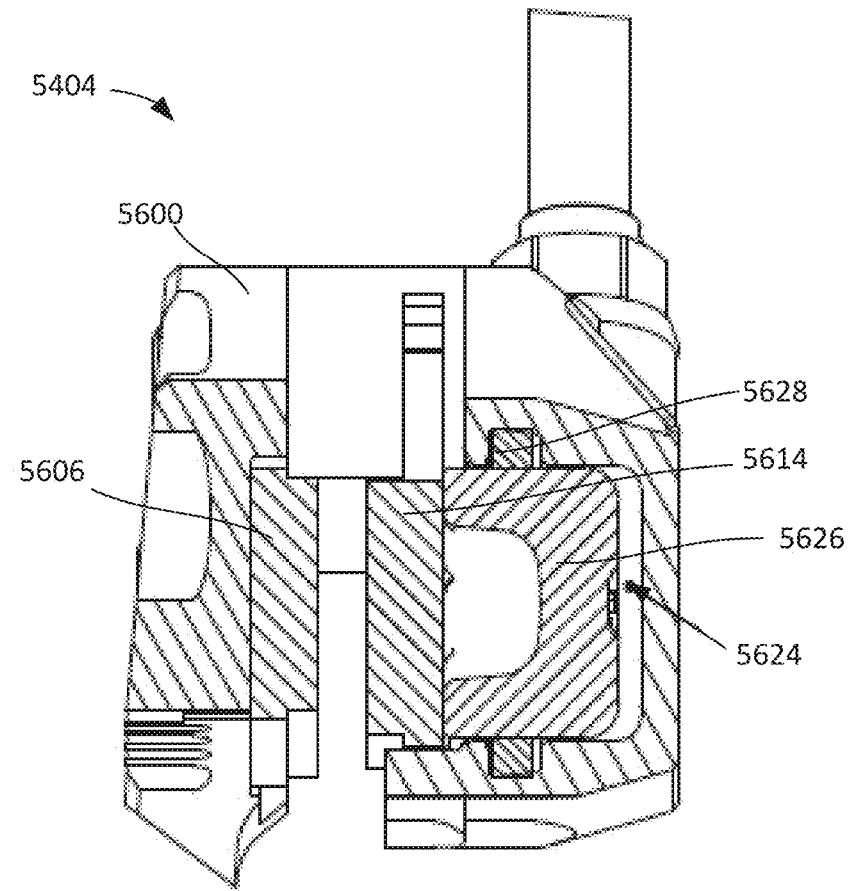
FIG. 58 is a cross-sectional view of the example rear brake caliper taken along line I-I of FIG. 57.

FIG. 57 is a top view of the rear brake caliper 5404, and FIG. 58 is a cross-sectional view of the rear brake caliper

5404 taken along line I-I of FIG. 57. As shown in FIGS. 57 and 58, the outboard caliper portion 5600, which contains the outboard brake pad 5606 (the fixed pad), is relatively thin or narrow. This reduces the axial width of the rear brake caliper 5404 and enables the rear brake caliper 5404 to be disposed inboard of the frame 102 (FIG. 54) of the bicycle 100 (FIG. 1). FIG. 58 also shows the outboard brake pad 5606, the inboard brake pad 5614, one of the pistons 5626 in one of the cylinders 5624, and one of the seals 5628. The inboard brake pad 5614 is moveable toward or away from the outboard brake pad 5606.

Figure 59:
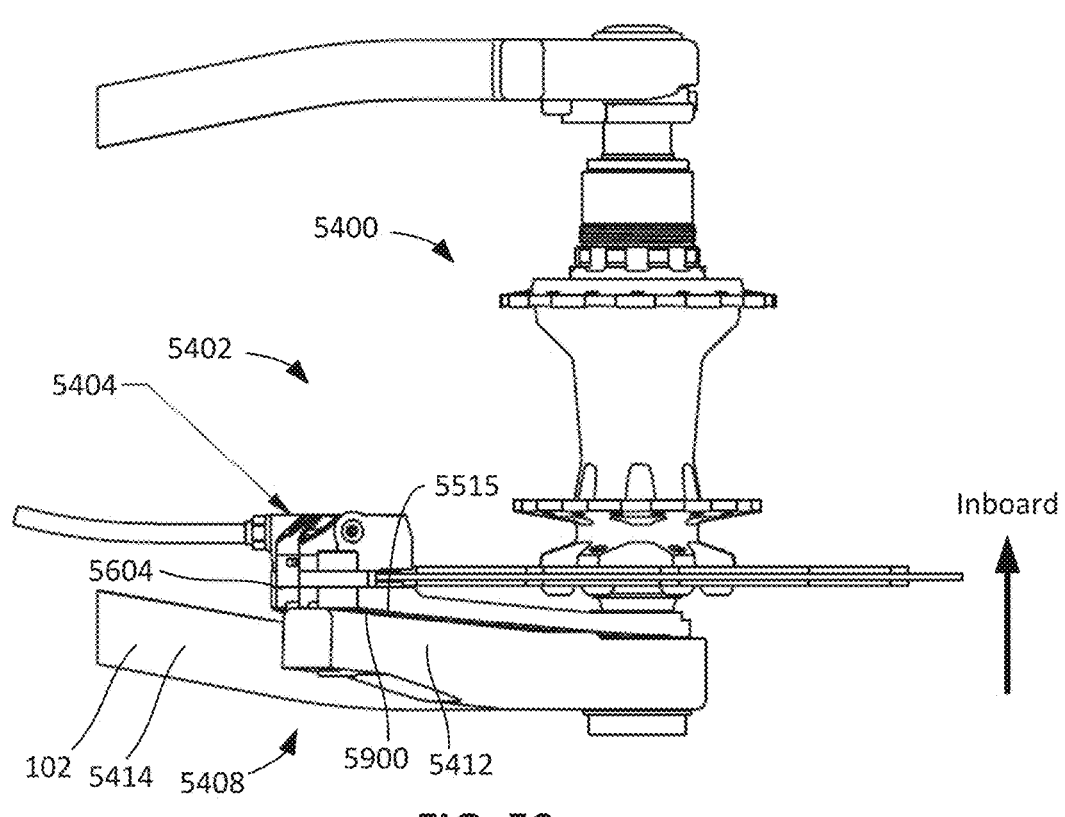
FIG. 59 is a top view of the example rear hub assembly and the example rear brake of FIG. 54 on the example bicycle.

FIG. 59 is a top view of the rear hub assembly 5400 and the rear brake 5402 on the frame 102 of the bicycle 100 (FIG. 1). As shown in FIG. 59, the rear brake caliper 5404 is disposed inboard of the left frame portion 5408 of the frame 102. In some examples, an outboard side or surface 5900 of the outboard caliper body 5604 is engaged with (and inboard of) the inboard side 5515 of the left seatstay and chainstay 5412, 5414. In some examples, the entire rear brake caliper 5404 is disposed inboard of the portion of the left frame portion 5408 with which the rear brake caliper 5404 is radially and circumferentially aligned. In other examples, one or more portions of the rear brake caliper 5404 can extend beyond (outboard of) the inboard side 5517.

Figure 60:
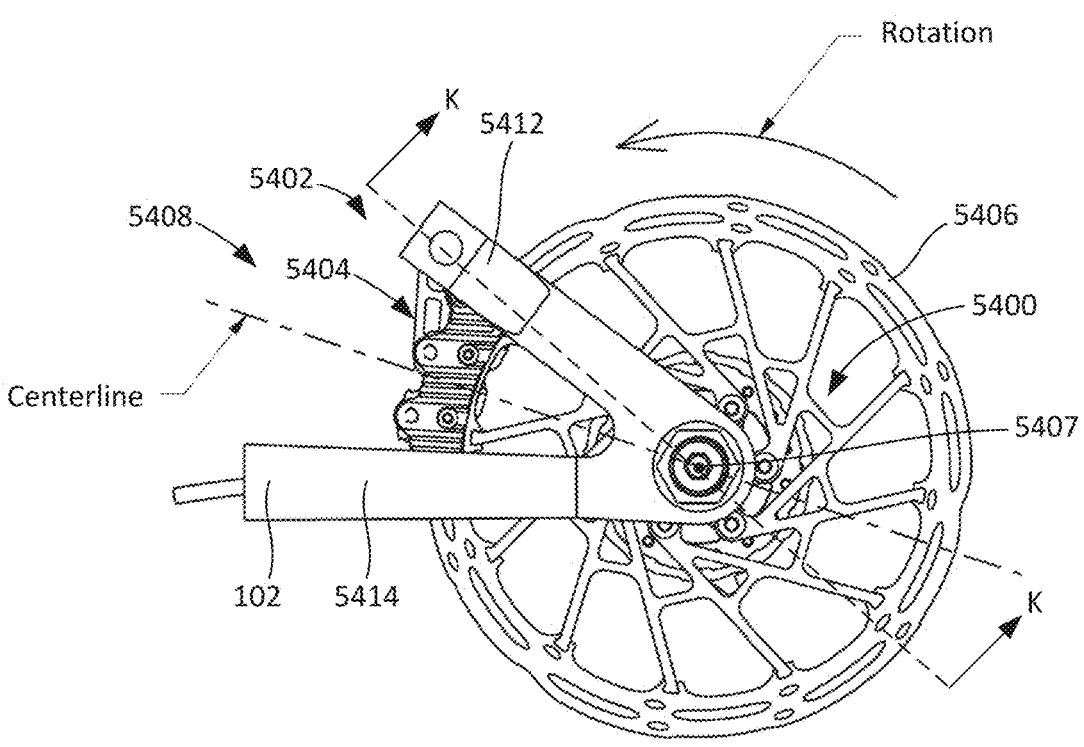
FIG. 60 is a side view of the example rear hub assembly and the example rear brake of FIG. 54 on the example bicycle.

FIG. 60 is a side view of the rear hub assembly 5400 and the rear brake 5402 on the frame 102 of the bicycle 100 (FIG. 1). When the bicycle 100 is moving in a forward direction, the brake rotor 5406 rotates in the direction of the arrow shown in FIG. 60. A centerline is labeled that extends between the left seatstay and chainstay 5412, 5414 and interests the rotational axis 5407. The centerline is the geometric center of the left frame portion 5408. As shown in FIG. 60, the rear brake caliper 5404 is disposed along (e.g., is bisected by) the centerline and, thus, substantially between the left seatstay and chainstay 5412, 5414. Therefore, the rear brake caliper 5404 is geometrically centered between the left seatstay and chainstay 5412, 5414. This is an optimal position for transferring braking forces to the frame 102.

Figures 61, 62:
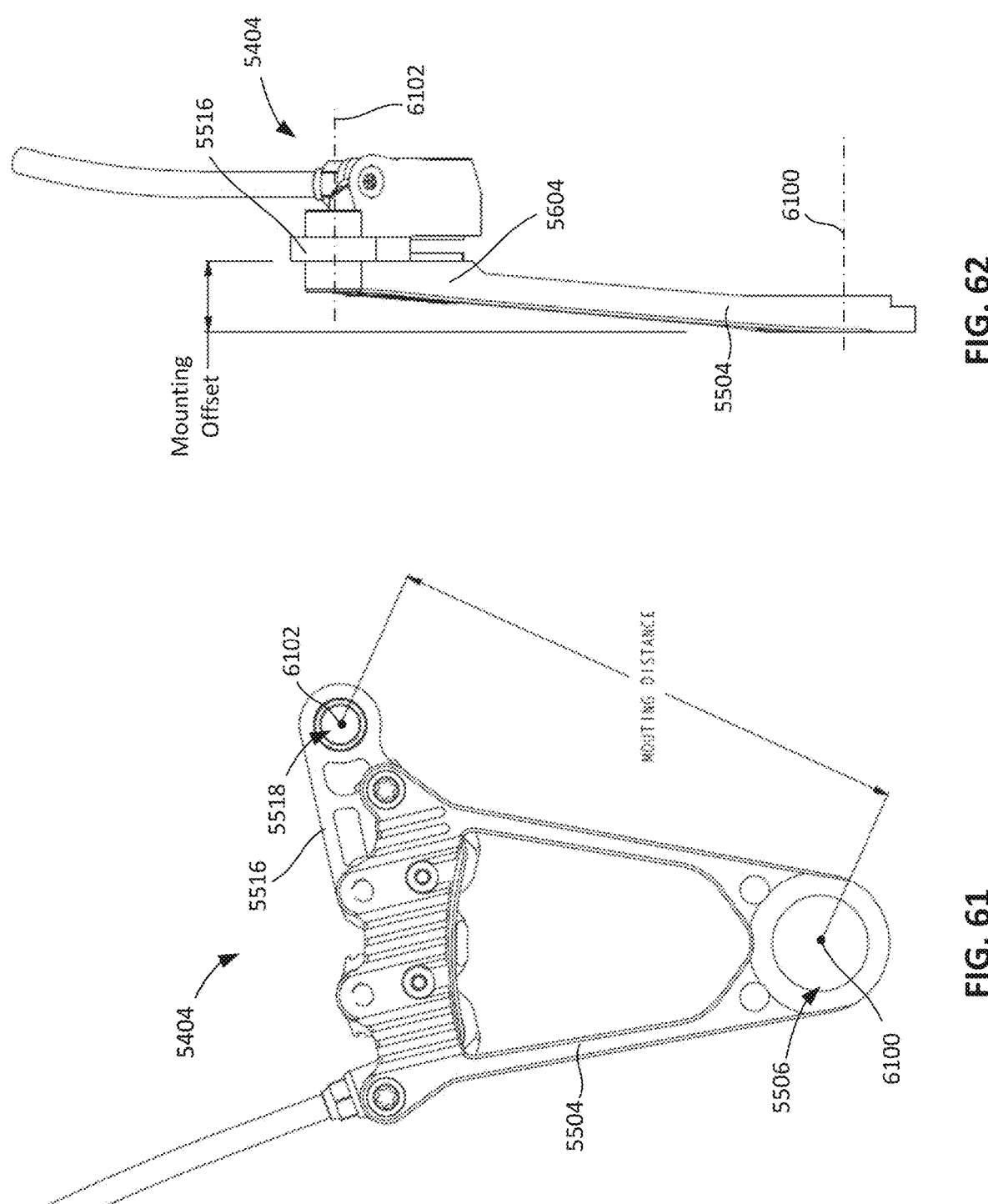
FIG. 61 is an outboard side view of the example rear brake caliper of FIG. 54.
FIG. 62 is an end view of the example rear brake caliper of FIG. 54.

FIG. 61 is an outboard side view of the rear brake caliper 5404 showing a mounting distance between a central axis 6100 of the opening 5506 of the axle mounting bracket 5504 and a central axis 6102 of the opening 5518 of the frame mounting bracket 5516. This distance represents the radial distance between the two points the rear brake caliper 5404 is attached to the bicycle 100. In some examples, the radial mounting distance is greater than the radial distance between the central axis 6100 of the opening 5506 and the brake pads. This helps reduce the load transmitted through the post 5517 (FIG. 55) the frame 102 (FIG. 55). The rear brake caliper 5404 can be constructed or designed to have a larger or smaller mounting distance. When the rear brake caliper 5404 is coupled to the bicycle 100, the opening 5506 and the opening 5518 are oriented in the axial direction (relative to the rotational axis 5407 (FIG. 54)).

FIG. 62 is an end view of the rear brake caliper 5404. As shown in FIG. 62, the central axis 6102 of the opening 5518 (FIG. 61) in the frame mounting bracket 5516 is parallel to the central axis 6100 of the opening 5506 (FIG. 61) in the axle mounting bracket 5504. In the illustrated example, the axle mounting bracket 5504 is angled (e.g., bent, curved) inboard (to the right in FIG. 62) from the opening 5506 (FIG. 61) to the outboard caliper body 5604. Therefore, the first attachment point (the opening 5506 (FIG. 61)) of the axle mounting bracket 5504 and the second attachment point (the opening 5518 (FIG. 61)) of the frame mounting bracket 5516 are offset in the axial direction by a mounting offset. In some examples, the left seatstay 5412 (FIG. 60) curves inward. This mounting offset enables the axle mounting bracket 5504 to couple to the axle 5420 (FIG. 54) outboard of the brake rotor 5406 (FIG. 54) and the frame mounting bracket 5516 to couple to the left seatstay 5412 near the axial location of the brake rotor 5406.

Figure 63A:
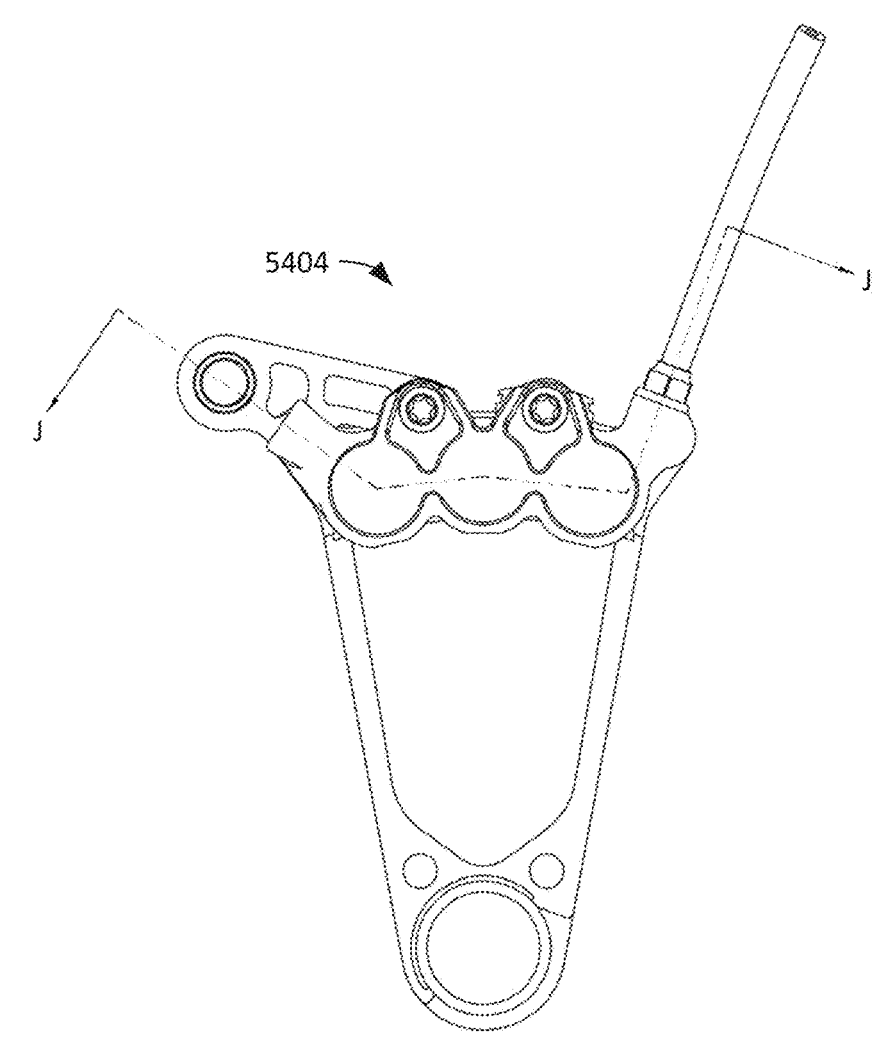
FIG. 63A is an inboard side view of the example rear brake caliper of FIG. 54.
Figure 63B:
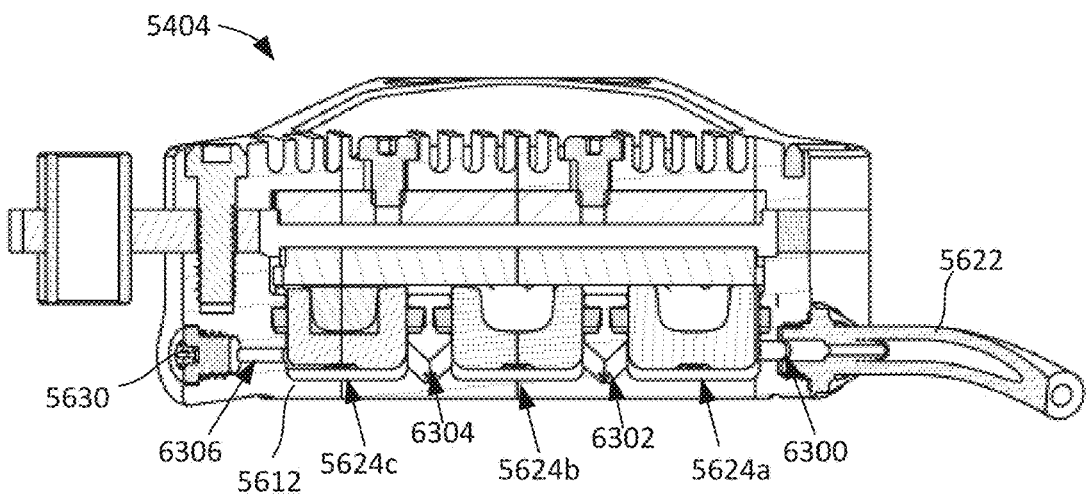
FIG. 63B is a cross-sectional view of the example rear brake caliper taken along line J-J of FIG. 63A.

FIG. 63A is an inboard side view of the rear brake caliper 5404, and FIG. 63B is a cross-sectional view of the rear brake caliper 5404 taken along line J-J of FIG. 63A. The hydraulic brake line 5622 is coupled to the inboard caliper body 5612. A first passageway 6300 in the inboard caliper body 5612 fluidly couples the hydraulic brake line 5622 to the first cylinder 5624*a*, a second passageway 6302 in the inboard caliper body 5612 fluidly couples the first and second cylinders 5624*a*, 5624*b*, and a third passageway 6304 in the inboard caliper body 5612 fluidly couples the second and third cylinders 5624*b*, 5624*c*. As such, the three cylinders 5624*a*-5624*c* are fluidly coupled. Therefore, when the hydraulic brake line 5622 supplies hydraulic fluid, the hydraulic fluid is supplied into all three of the cylinders 5624*a*-5624*c*. The bleed plug 5630 is screwed into a fourth passageway 6306 fluidly coupled to the third cylinder 5624*c*.

Figure 64A:
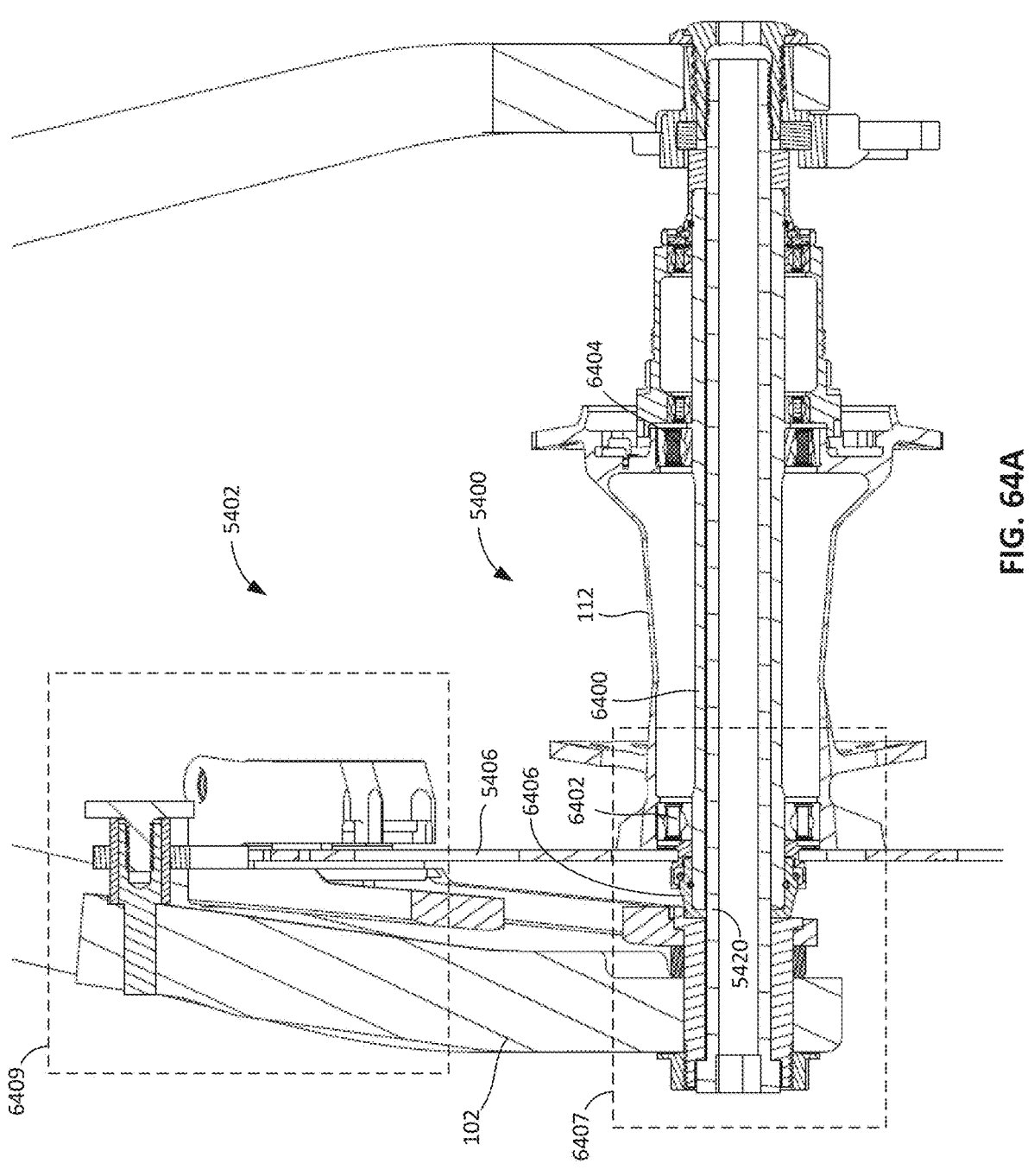
FIG. 64A is a cross-sectional view of the example rear hub assembly and the example rear brake on the example bicycle taken along line K-K of FIG. 60.

FIG. 64A is a cross-sectional view of the frame 102, the hub assembly 5400, and the rear brake 5402 taken along line K-K of FIG. 60. As shown in FIG. 64A, the rear hub assembly 5400 includes an inner spindle 6400. The axle 5420 extends through and is engaged (e.g., via an interference fit) with the inner spindle 6400. The rear hub 112 rotates about the inner spindle 6400 via bearings 6402, 6404. The rear brake rotor 5406 is rigidly coupled to the rear hub 112 (e.g., via one or more fasteners). The rear brake rotor 5406 rotates with the rear hub 112 about the inner spindle 6400 and the axle 5420. As such, the brake rotor 5406 has a strong axial and radial reference to the rear hub 112 and the rest of the hub assembly 5400. In the illustrated example, the hub assembly 5400 includes a hub end cap 6406 on the end of the rear hub 112.

Figure 64B:
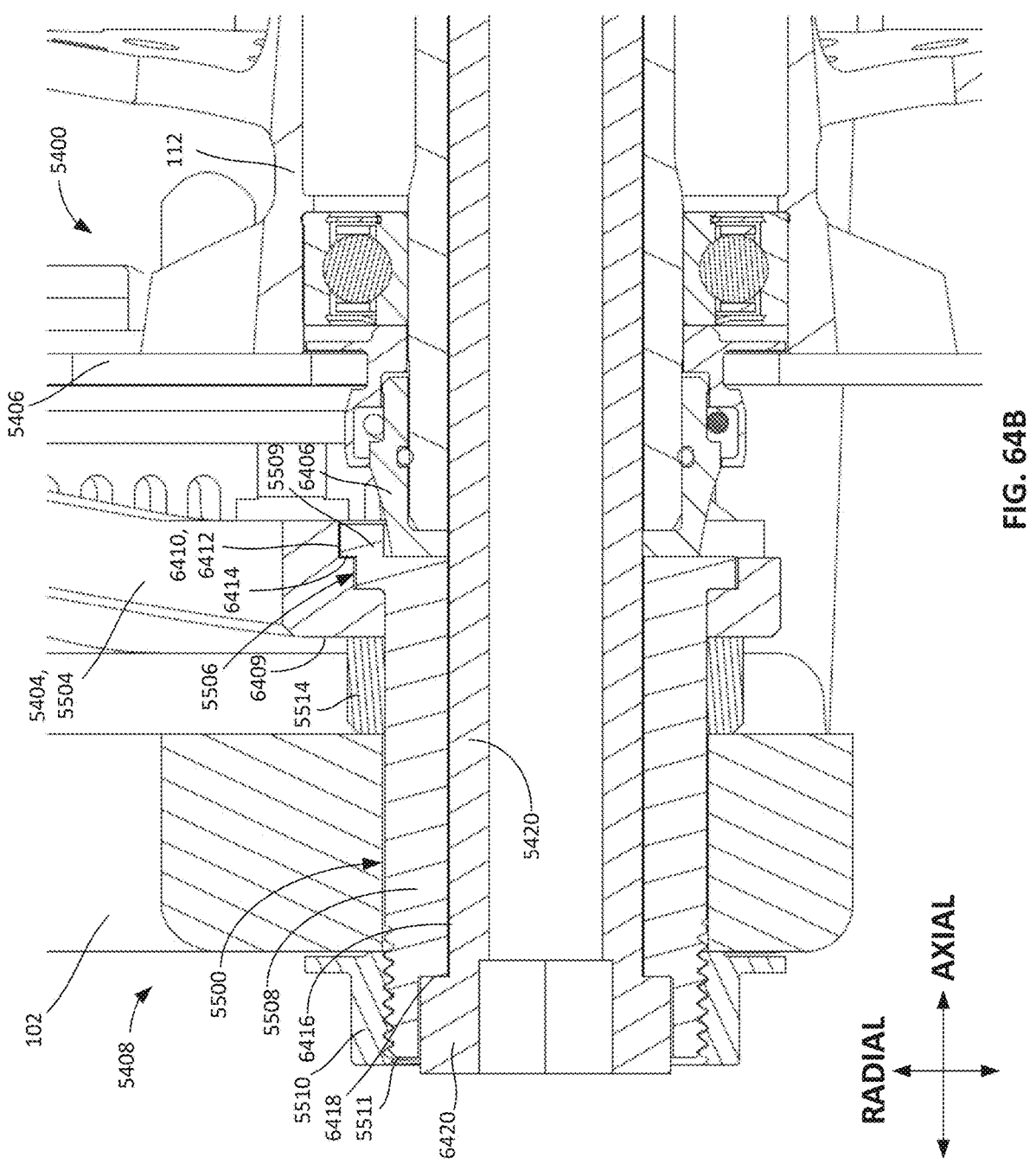
FIG. 64B is enlarged view of a callout in FIG. 64A.

FIG. 64B is enlarged view of the callout 6407 from FIG. 64A. As shown in FIG. 64B, the sleeve 5508 is disposed in the opening 5506 of the axle mounting bracket 5504. An inner surface 6410 of the axle mounting bracket 5504 forming the opening 5506 is in contact with an outer surface 6412 of the sleeve 5508. In the illustrated example, the inner surface 6410 has a shoulder 6414 with a shape that corresponds to the enlarged end 5509 of the sleeve 5508. This prevents the rear brake caliper 5404 from moving inboard relative to the sleeve 5508 and, thus, relative to the axle 5420. The sleeve 5508 fits tightly in the opening 5506 of the axle mounting bracket 5504. In some examples, the inner surface 6410 of the axle mounting bracket 5504 and the outer surface 6412 of the sleeve 5508 form an interference fit (sometimes referred to as a press fit or friction fit). This creates a strong radial reference between the rear brake caliper 5404 and the hub assembly 5400.

In the illustrated example, the enlarged end 5509 of the sleeve 5508 is engaged with the hub end cap 6406. The sleeve extends from an outboard side 6409 of the axle mounting bracket 5504. The sleeve 5508 extends through the first axle opening 5500 in the left frame portion 5408. In the illustrated example, the sleeve 5508 is longer than the first axle opening 5500. As such, a portion of the sleeve 5508 is inboard of the left frame portion 5408 and the distal end 5511 of the sleeve 5508 is outboard of the left frame portion 5408. The axle 5420 extends through the sleeve 5508. Therefore, in this example, the axle 5420 does not contact the left frame portion 5408. In the illustrated example, an inner surface 6416 of the sleeve 5508 near the distal end 5511 has a shoulder 6418. The axle 5420 has a head 6420 that is engaged with the shoulder 6418. When the axle 5420 is tightened, the sleeve 5508 is axially clamped and secured between the head 6420 and the hub 112. This creates a strong axial reference between the rear brake caliper 5404 and the rear hub assembly 5400 and, thus, between the rear brake caliper 5404 and the rear brake rotor 5406. Further, the nut 5510 can be screwed onto the distal end 5511 of the sleeve 5508. The washer 5514 is disposed around the sleeve 5508, between the axle mounting bracket 5504 and the left frame portion 5408. When the nut 5510 is tightened, the axle mounting bracket 5504 is axially secured with the hub assembly 5400.

In some examples, the axle 5420, the axle mounting bracket 5504 and the sleeve 5508, and the hub end cap 6406 can be constructed of metal. This metal-to-metal interface and dimensional surface properties (e.g., larger surface area) creates a strong planar reference and, thus, a strong axial reference between the parts. Therefore, even if the hub assembly 5400 is misaligned with the frame 102, the rear brake caliper 5404 remains in the same axial position relative to the hub assembly 5400 and, thus, the rear brake caliper 5404 remains in the same axial position relative to the rear brake rotor 5406. In some examples, the washer 5514 is constructed of a compliant material (e.g., a material that is elastically deformable). For example, the washer 5514 can be constructed of plastic and/or rubber. Therefore, when the nut 5510 is tightened, the washer 5514 may slightly compress. However, the axle mounting bracket 5504 remains in the same axle position on sleeve 5508 and, thus, maintains a strong axle reference to the hub assembly 5400.

The rear brake caliper 5404 also has a strong radial reference to the hub assembly 5400. The sleeve 5508 is relatively long and, therefore, has a wider support width with the axle 5420. The axle 5420, the sleeve 5508, and the axle mounting bracket 5504 can have a relatively tight fit, such as an interference fit or a transition fit (sometimes referred to as a slip fit). The wider support width and the fit result in a relatively strong radial reference between the axle mounting bracket 5504 and the hub assembly 5400. As such, the rear brake caliper 5404 remains in the same radial position relative to the rear brake rotor 5406. However, the sleeve 5508 may have a relatively loose fit in the first axle opening 5500. For example, the first axle opening 5500 and the sleeve 5508 may form a clearance fit. This loose fit with narrow support width achieves a weaker reference for tolerance compensation. In particular, this allows some radial movement between the axle/sleeve and the frame 102, which is advantageous when installing the hub assembly 5400 because the first and second axle openings 5500, 5502 may not be perfectly aligned. Therefore, in some examples, the radial fit between the first axle opening 5500 and the axle 5420 is tighter than the radial fit between the sleeve 5508 and the frame 102. Further, in some examples, the axial length of the radial fit between the first axle opening 5500 and the axle 5420 is longer than the axial length of the radial fit between the sleeve 5508 and the frame 102. While in this example the sleeve 5508 is a separate part or component, in other examples, the sleeve 5508 can be integral with the axle mounting bracket 5504. For example, the axle mounting bracket 5504 and the sleeve 5508 can eb constructed of a single unitary part or component (e.g., a monolithic structure).

Figure 64C:
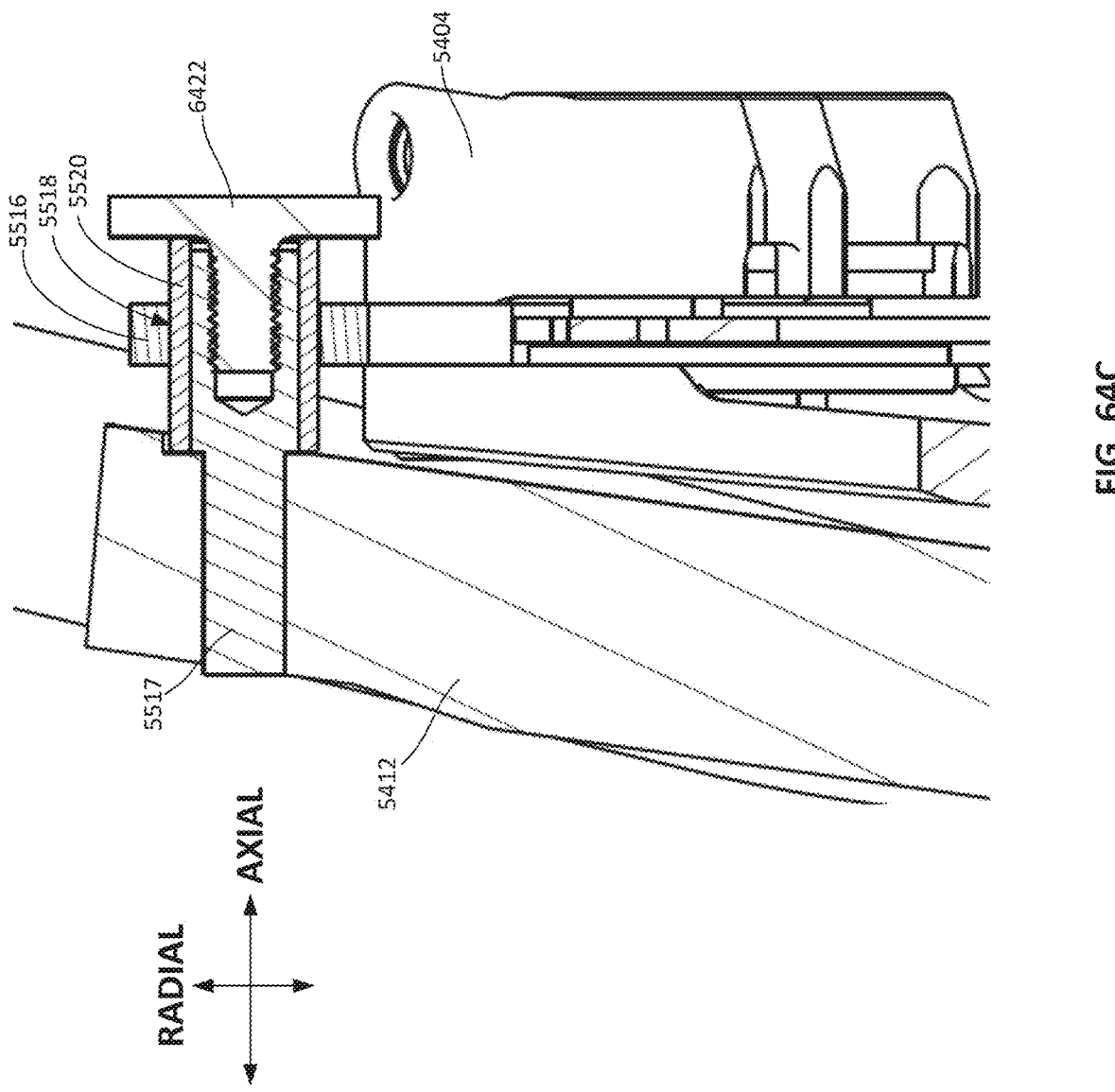
FIG. 64C is another enlarged view of a callout in FIG. 64A.

FIG. 64C is an enlarged view of the callout 6409 from FIG. 64A. The post 5517 is coupled to and extends inboard of the left seatstay 5412. In some examples, the post 5517 is integral with the left seatstay 5412. In the illustrated example, the sleeve 5520 is disposed around the post 5517, which increase the contact area between the frame mounting bracket 5516 and the post 5517. In some examples, the sleeve 5520 is constructed of a compliant material, such as rubber or plastic. The post 5517 and the sleeve 5520 extend through the opening 5518 in the frame mounting bracket 5516 of the rear brake caliper 5404. In some examples, a threaded fastener 6422 is screwed into the end of the post 5517 to keep the sleeve 5520 on the post 5517 and prevent the rear brake caliper 5404 from moving inboard off of the post 5517. In some examples, when the threaded fastener 6422 is tightened, the sleeve 5520 is compressed axially, and therefore expands in the radial direction. The sleeve 5520 may expand into the frame mounting bracket 5516, which helps radially clamp the frame mounting bracket 5516 to the post 5517. In other examples, the sleeve 5520 and/or the threaded fastener 6422 may not be used. Instead, the frame mounting bracket 5516 can be in directed contact with the post 5517.

An example method of installing the hub assembly 5400 and the rear brake 5402, is disclosed as follows in connection with FIGS. 64B and 64C. Referring first to FIG. 64B, the sleeve 5508 can be inserted through the opening 5506 in the axle mounting bracket 5504 and the washer 5514 can be placed around the sleeve 5508. Then, the axle mounting bracket 5504 can be disposed inside of the left frame portion 5408 and moved toward the left frame portion 5408 to insert the sleeve 5508 into the first axle opening 5500. Then, the rear brake rotor 5406 is coupled (e.g., via one or more fasteners, via a spline connection, etc.) to the rear hub 112, and then the rear hub 112 is positioned between the left and right frame portions 5408, 5410, such that the axle mounting bracket 5504 is disposed between the rear hub 112 and the left frame portion 5408. Then, the axle 5420 is inserted (from the outboard side) through the sleeve 5508 and the first axle opening 5500, through the rear hub 112, and into the second axle opening 5502 (FIG. 55) in the right frame portion 5510 (FIG. 55). The axle 5420 can then be tightened to axially secure the axle mounting bracket 5504 and the rear hub 112, thereby axially and radially securing the rear brake caliper 5404 and the hub assembly 5400. Then the nut 5510 can be screwed onto the distal end 5511 of the sleeve 5508. After the rear brake caliper 5404 is secured to the hub assembly 5400, the rear brake caliper 5404 can be coupled to the left seatstay 5412 via the post 5517. Referring to FIG. 64C, the post 5517 is inserted through the sleeve 5520, through the opening 5518 in the frame mounting bracket 5516, and into the left seatstay 5412. At this point, the bracket 220 can still move (e.g., slide) in the axial direction relative to the post 5517. This enables the rear brake caliper 5404 to have a weaker axial reference to the frame 102 and a stronger axial reference to the hub assembly 5400. In some examples, the threaded fastener 6422 can then be screwed into the post 5517 to expand the sleeve 5520 and axially secure the rear brake caliper 5404 to the post 5517. In some examples, the rear brake caliper 5404 is substantially fixed in the axial directions. In other examples, the rear brake caliper 5404 may still be axially slidable on the post 5517. Therefore, the rear brake caliper 5404 can axially float on the post 5517.

Also disclosed herein are example front brake calipers that can be implemented on front forks or other frame members of a bicycle for a front brake. The example front brake calipers can be disposed inboard of a portion of the front fork or frame member and, thus, benefit from the same advantages disclosed above in connection with the rear brake calipers.

FIG. 65 is a perspective view of the front fork 108 of the bicycle 100 (FIG. 1). In the illustrated example, the front fork 108 includes a steering tube 6500, a crown 6502, a first leg 6504 (a left leg), and a second leg 6506 (a right leg) spaced apart from the first leg 6504. In this example, the front fork 108 is a suspension component and has telescoping legs or tubes to help absorb shocks and vibrations. However, in other examples, the legs 6504, 6506 may be fixed, and may not compress or expand.

In the illustrated example, the first and second legs 6504, 6506 include first and second upper tubes 6508, 6510 (sometimes referred to as leg portions or stanchions), respectively, and first and second lower tubes 6512, 6514 (sometimes referred to as leg portions or lowers), respectively. The first and second upper tubes 6508, 6510 may be collectively referred to as an upper tube assembly, and the first and second lower tubes 6512, 6514 may be collectively referred to as a lower tube assembly 6516. The steering tube 6500 couples to the frame 102 (FIG. 1) and the handlebars 120 (FIG. 1). The first and second upper tubes 6508, 6510 are coupled via the crown 6502. The first and second lower tubes 6512, 6514 are coupled via an arch 6518 (sometimes referred to as a fork brace or stabilizer). The first and second lower tubes 6512, 6514 include respective front wheel attachment portions 6520, 6522, such as holes (e.g., eyelets) or dropouts, for attaching the front wheel 104 (FIG. 1) to the front fork 108. The first and second upper tubes 6508, 6510 are slidably received within the respective first and second lower tubes 6512, 6514. Thus, the first and second upper tubes 6508, 6510 form a telescopic arrangement with the respective first and second lower tubes 6512, 6514. During a compression stroke, the first and second upper tubes 6508, 6510 move into or toward the respective first and second lower tubes 6512, 6514, and during a rebound stroke, the first and second upper tubes 6508, 6510 move out of or away from the respective first and second lower tubes 6512, 6514. In some examples, a spring and/or a damper are incorporated into the first and/or second legs 6504, 6506.

Disclosed below are example front brake calipers that can be coupled to one of the legs of a fork, such as the example front fork 108 shown in FIG. 65. The example brake calipers can be disposed inboard of the leg to which the brake caliper is attached. The example front brake calipers may be substantially the same as the example rear brake caliper 5404 disclosed above without the axle mounting bracket 5504 and the frame mounting bracket 5516. Therefore, any of the example structural and/or functional aspects disclosed in connection with the rear brake caliper 5404 can likewise apply to the front brake calipers disclosed below.

FIGS. 66 and 67 are perspective views of an example lower tube assembly 6600 and an example front brake caliper 6602. The example lower tube assembly 6600 can be implemented as the lower tube assembly 6516 on the example front fork 108 of FIG. 65. The lower tube assembly 6600 includes a first lower tube 6604 (which forms part of the first or left leg 6504), a second lower tube 6606 (which forms part of the second or right leg 6506) spaced from the first lower tube 6604, and an arch 6608 between the first and second lower tubes 6604, 6606. The first lower tube 6604 has a first wheel attachment portion 6607 and the second lower tube 6606 has a second wheel attachment portion 6609. In this example, the wheel attachment portions 6607, 6609 are holes (e.g., eyelets) for attaching the front wheel

104 (FIG. 1) to the front fork 108 (FIG. 65). In other examples, the wheel attachment portions 6607, 6609 can be implemented as dropouts.

In the illustrated example, the front brake caliper 6602 is coupled to the first lower tube 6604. In this example, the front brake caliper 6602 is disposed on an inboard side of the first lower tube 6604 (e.g., coupled to an inboard side of the first lower tube 6604). In the illustrated example, the front brake caliper 6602 includes an outboard caliper portion 6610 and an inboard caliper portion 6612 that is inboard of the outboard caliper portion 6610. The outboard caliper portion 6610 is substantially the same as the outboard caliper portion 5600 of the example rear brake caliper 5404 (without the axle mounting bracket 5504). Thus, any of the structural and/or functional features disclosed in connection with the outboard caliper portion 5600 can likewise apply to the outboard caliper portion 6610. The outboard caliper portion 6610 includes an outboard caliper body 6614 and an outboard brake pad (e.g., the same as the outboard brake pad 5606) that is coupled to the outboard caliper body 6614. The outboard caliper body 6614 is coupled to an inboard side of the first lower tube 6604. In this example, the outboard brake pad is fixed (non-moveable) relative to the outboard caliper body 6614.

The inboard caliper portion 6612 is substantially the same as the inboard caliper portion 5602 of the example rear brake caliper 5404 disclosed herein. Thus, any of the structural and/or functional features disclosed in connection with the inboard caliper portion 5602 can likewise apply to the inboard caliper portion 6612. The inboard caliper portion 6612 includes an inboard caliper body 6616 and an inboard brake pad (e.g., the same as the inboard brake pad 5614). The inboard caliper body 6616 is coupled to the outboard caliper body 6614 (e.g., one or more threaded fasteners). The inboard caliper body 6616 is disposed inboard of the outboard caliper body 6614. The inboard brake pad is moveable relative to the inboard caliper body 6616 and, thus, moveable relative to the outboard brake pad.

FIGS. 68 and 69 are perspective exploded views of the example lower tube assembly 6600 and the example front brake caliper 6602. In this example, the front brake caliper 6602 is coupled to the first lower tube 6604 via a first threaded fastener 6800 and a second threaded fastener 6802. In the illustrated example, the first lower tube 6604 has a first mount 6804 and a second mount 6806 on the inboard side of the first lower tube 6604. The front brake caliper 6602 is coupled to the first mount 6804 via the first threaded fastener 6800 and coupled to the second mount 6806 via the second threaded fastener 6802. Therefore, the front brake caliper 6602 is coupled to the first lower tube 6604 at two points. In this example, the first and second threaded fasteners 6800, 6802 are parallel to each other and oriented in the axial direction (relative to a rotational axis of the front wheel 104 (FIG. 1)). In other examples, the front brake caliper 6602 can be coupled to the first lower tube 6604 via more or fewer threaded fasteners and/or other coupling mechanisms (e.g., latches, pins).

In the illustrated example, the first lower tube 6604 includes a contact plate 6808. When the front brake caliper 6602 is coupled to the first and second mounts 6804, 6806, the outboard caliper body 6614 is engaged with (i.e., contacts) the contact plate 6808. The contact plate 6808 provides a firm mounting surface for the front brake caliper 6602 in reducing brake induced twisting loads. The contact plate 6808 increases the surface area contact between the front brake caliper 6602 and the first lower tube 6604, and therefore acts as a heat sink to help dissipate heat from the front brake caliper 6602.

FIG. 70 is a rear view of the example lower tube assembly 6600, and FIG. 71 is a cross-sectional view of the lower tube assembly 6600 taken along line L-L of FIG. 70. As shown in FIGS. 70 and 71, the front brake caliper 6602 is disposed inboard of the first lower tube 6604. Because only one of the brake pads is moveable, the front brake caliper 6602 is relatively thin, which enables the front brake caliper 6602 is to be disposed inboard of the first lower tube 6604 to fit between the first lower tube 6604 and the front wheel 104 (FIG. 1). Further, because the outboard brake pad is fixed and does not require fluid cylinders, the outboard brake pad can be disposed relatively close to the supporting structure, i.e., the first lower tube 6604. This is optimal for transferring the braking forces from the front brake caliper 6602 to the supporting structure, i.e., the first lower tube 6604.

As shown in FIG. 70, the first lower tube 6604 has a first central axis 7000 and the second lower tube 6606 has a second central axis 7002. In the illustrated example, the entire front brake caliper 6602 is disposed inboard of the first central axis 7000. The first and second central axes 7000, 7002 lie in a center plane 7004, which is a plane that bisects the first and second lower tubes 6604, 6606. FIG. 71 shows the center plane 7004 from the side. The center plane 7004 is a vertical plane that extends into and out of the page in the orientation of FIG. 71). As shown in FIG. 71, the center plane 7004 intersects the front brake caliper 6602. In this example, the center plane 7004 intersects a cylinder in the front brake caliper 6602. In particular, in this example, the front brake caliper 6602 has three cylinders, and the center plane 7004 intersects a middle one of the cylinders. In other examples, the front brake caliper 6602 can be positioned more forward or rearward (right or left in FIG. 71).

FIGS. 72 and 73 are perspective views of another example lower tube assembly 7200 and another example front brake caliper 7202. The example lower tube assembly 7200 can be implemented as the lower tube assembly 6516 on the example front fork 108 of FIG. 65. The lower tube assembly 7200 includes a first lower tube 7204 (which forms part of the first or left leg 6504), a second lower tube 7206 (which forms part of the second or right leg 6506) spaced from the first lower tube 7204, and an arch 7208 between the first and second lower tubes 7204, 7206. The first lower tube 7204 has a first wheel attachment portion 7207 and the second lower tube 7206 has a second wheel attachment portion 7209.

In the illustrated example, the front brake caliper 7202 is coupled to the first lower tube 7204. In this example, the front brake caliper 7202 is disposed on an inboard side of the first lower tube 7204 (e.g., coupled to an inboard side of the first lower tube 7204). In the illustrated example, the front brake caliper 7202 includes an outboard caliper portion 7210 and an inboard caliper portion 7212 that is inboard of the outboard caliper portion 7210. The outboard caliper portion 7210 is substantially the same as the outboard caliper portion 5600 of the example rear brake caliper 5404 (without the axle mounting bracket 5504). Thus, any of the structural and/or functional features disclosed in connection with the outboard caliper portion 5600 can likewise apply to the outboard caliper portion 7210. The outboard caliper portion 7210 includes an outboard caliper body 7214 and an outboard brake pad (e.g., the same as the outboard brake pad 5606) that is coupled to the outboard caliper body 7214. The outboard caliper body 7214 is coupled to an inboard side of the first lower tube 7204. In this example, the outboard brake pad is fixed (non-moveable) relative to the outboard caliper body 7214.

The inboard caliper portion 7212 is substantially the same as the inboard caliper portion 5602 of the example rear brake caliper 5404 disclosed herein. Thus, any of the structural and/or functional features disclosed in connection with the inboard caliper portion 5602 can likewise apply to the inboard caliper portion 7212. The inboard caliper portion 7212 includes an inboard caliper body 7216 and an inboard brake pad (e.g., the same as the inboard brake pad 5614). The inboard caliper body 7216 is coupled to the outboard caliper body 7214 (e.g., one or more threaded fasteners). The inboard caliper body 7216 is disposed inboard of the outboard caliper body 7214. The inboard brake pad is moveable relative to the inboard caliper body 7216 and, thus, moveable relative to the outboard brake pad.

FIGS. 74 and 75 are perspective exploded views of the example lower tube assembly 7200 and the example front brake caliper 7202. In this example, the first lower tube 7204 has upper and lower post mounts 7400, 7402 that are used on known or traditional forks. The upper and lower post mounts 7400, 7402 can be used to attach a known brake caliper to the rear facing side of the first lower tube 7204. The front brake caliper 7202 can be coupled to the first lower tube 7204 using one of the upper or lower post mounts 7400, 7402, thereby making use of an existing structure. In this example, the front brake caliper 7202 is coupled to the upper post mount 7400 via a first threaded fastener 7404. In the illustrated example, the first lower tube 7204 has a mount 7406 on the inboard side of the first lower tube 7204. The front brake caliper 7202 is coupled to the mount 7406 via a second threaded fastener 7408. Therefore, the front brake caliper 7202 is coupled to the first lower tube 7204 at two points. In this example, second threaded fastener 7408 is oriented in the axial direction, and the first threaded fastener 7404 is oriented in a direction that is perpendicular to and offset from the second threaded fastener 7408. In the illustrated example, the mount 7406 is relatively large and flat. The mount 7406 forms a larger contact surface with the front brake caliper 7202 to help dissipate heat from the front brake caliper 7202. In other examples, the front brake caliper 7702 can be coupled to the first lower tube 7204 via more or fewer threaded fasteners and/or other coupling mechanisms (e.g., latches, pins).

FIG. 76 is a rear view of the example lower tube assembly 7200, and FIG. 77 is a cross-sectional view of the lower tube assembly 7200 taken along line M-M of FIG. 76. The position or location of the front brake caliper 7202 relative to the first lower tube 7204 is substantially the same as the front brake caliper 6602 relative to the first lower tube 6604 disclosed above in connecting with FIGS. 70 and 71. Thus, to avoid redundancy, the description of the central axes and center plane is not repeated.

FIG. 78 is perspective view of another example lower tube assembly 7800 and another example front brake caliper 7802. The example lower tube assembly 7800 can be implemented as the lower tube assembly 6516 on the example front fork 108 of FIG. 65. The lower tube assembly 7800 includes a first lower tube 7804 (which forms part of the first or left leg 6504), a second lower tube 7806 (which forms part of the second or right leg 6506) spaced from the first lower tube 7804, and an arch 7808 between the first and second lower tubes 7804, 7806. The first lower tube 7804 has a first wheel attachment portion 7807 and the second lower tube 7806 has a second wheel attachment portion 7809.

In the illustrated example, the front brake caliper 7802 is coupled to the first lower tube 7804. In this example, the front brake caliper 7802 is disposed on an inboard side of the first lower tube 7804 (e.g., coupled to an inboard side of the first lower tube 7804). In the illustrated example, the front brake caliper 7802 includes an outboard caliper portion 7810 and an inboard caliper portion 7812 that is inboard of the outboard caliper portion 7810. The outboard caliper portion 7810 is similar to the outboard caliper portion 5600 of the example rear brake caliper 5404 (without the axle mounting bracket 5504). Thus, any of the structural and/or functional features disclosed in connection with the outboard caliper portion 5600 can likewise apply to the outboard caliper portion 7810. The outboard caliper portion 7810 includes an outboard caliper body 7814 and an outboard brake pad (shown in FIGS. 79 and 80) that is coupled to the outboard caliper body 7814. The outboard caliper body 7814 is coupled to an inboard side of the first lower tube 7804. In this example, the outboard brake pad is fixed (non-moveable) relative to the outboard caliper body 7814.

The inboard caliper portion 7812 is substantially the same as the inboard caliper portion 5602 of the example rear brake caliper 5404 disclosed herein. Thus, any of the structural and/or functional features disclosed in connection with the inboard caliper portion 5602 can likewise apply to the inboard caliper portion 7812. The inboard caliper portion 7812 includes an inboard caliper body 7816 and an inboard brake pad (shown in FIGS. 79 and 80). The inboard caliper body 7816 is coupled to the outboard caliper body 7814 (e.g., one or more threaded fasteners). The inboard caliper body 7816 is disposed inboard of the outboard caliper body 7814. The inboard brake pad is moveable relative to the inboard caliper body 7816 and, thus, moveable relative to the outboard brake pad.

FIGS. 79 and 80 are perspective exploded views of the example lower tube assembly 7800 and the example front brake caliper 7802. In this example, the outboard caliper body 7814 is integral to the first lower tube 7804. For example, the outboard caliper body 7814 and the first lower tube 7804 can be constructed (e.g., molded, machined) as a single unitary part or component (e.g., a monolithic structure) or permanently coupled via welding or another coupling technique. This connection is optimal for dissipating heat from the front brake caliper 7802. FIGS. 79 and 80 show an outboard brake pad 7900 that can be coupled to the outboard caliper body 7814 via one or more threaded fasteners 7902 (e.g., bolts or screws). FIG. 80 shows an inboard brake pad 8000 on the inboard caliper body 7816. The inboard brake pad 8000 is moveable relative to the inboard caliper body 7816. When the front brake caliper 7802 is assembled, the inboard caliper body 7816 is coupled to the outboard caliper body 7814 via outboard threaded fasteners 7904 and inboard threaded fasteners 7906. The inboard and outboard threaded fasteners 7904, 7906 are parallel to each other and oriented in the axial direction. In other examples, the inboard caliper body 7816 can be coupled to the outboard caliper body 7814 via more or fewer threaded fasteners and/or other coupling mechanisms (e.g., latches, pins). The position or location of the front brake caliper 7802 relative to the first lower tube 7804 is substantially the same as the front brake caliper 6602 relative to the first lower tube 6604 disclosed above in connecting with FIGS. 70 and 71. Thus, to avoid redundancy, the description of the central axes and center plane is not repeated.

Example systems, apparatus, and articles of manufacture for bicycles (and/or other vehicles) are disclosed herein. Examples and example combinations disclosed herein include the following:

Example 1 is a brake rotor for a bicycle. The brake rotor comprises a carrier to be coupled to a hub of the bicycle and a brake track having braking surfaces to be engaged by brake pads. The brake track is disposed radially outward of the carrier. The brake track has a first thickness and the carrier having a second thickness greater than the first thickness. The brake rotor has a rotational axis defining a coordinate reference. The brake track is coupled to the carrier such that the brake track is axially movable relative to the carrier while being radially and circumferentially constrained relative to the carrier.

Example 2 includes the brake rotor of Example 1, further including a positioning portion coupled to the brake track. The positioning portion is to dissipate heat from the brake track.

Example 3 includes the brake rotor of Example 2, wherein the carrier has an arm with an end portion, and wherein the positioning portion has a notch, the end portion disposed in the notch. The end portion is to slide in the notch when the brake track moves axially relative to the carrier.

Example 4 includes the brake rotor of Example 3, wherein the end portion of the arm has a tab extending outward from an outer peripheral edge of the end portion.

Example 5 includes the brake rotor of Example 4, wherein the tab is to limit axial movement of the brake track in a first axial direction and the cooling fin is to limit axial movement of the brake track in a second axial direction.

Example 6 includes the brake rotor of Examples 4 or 5, wherein the tab and the cooling fin are on a same side of the brake rotor.

Example 7 includes the brake rotor of any of Examples 3-6, wherein the arm is a first arm, the end portion is a first end portion, and the notch is a first notch, wherein: the carrier includes a second arm with a second end portion, and the cooling fin has a second notch. The second end portion is disposed in the second notch. The second end portion is to slide in the second notch when the brake track moves axially relative to the carrier.

Example 8 includes the brake rotor of any of Examples 1-7, wherein: the carrier has an arm with an end portion, the end portion having a protrusion extending in a circumferential direction, and the brake track has a notch with a shape corresponding to the end portion. The end portion is disposed in the notch. The end portion is to slide in the notch when the brake track moves axially relative to the carrier.

Example 9 includes the brake rotor of any of Examples 1-8, further including a pin extending through an opening formed in the brake rotor. The pin has a head disposed on a first side of the carrier. The brake rotor also includes a clip coupled to the pin and disposed on a second side of the carrier. The head and the pin overlap with a portion of the brake track in an axial direction.

Example 10 includes the brake rotor of Example 9, wherein the head is to limit axial movement of the brake track in a first axial direction and the clip is to limit axial movement of the brake track in a second axial direction.

Example 11 includes the brake rotor of Examples 9 or 10, wherein the opening is partially formed in the brake track and partially formed in the carrier.

Example 12 includes the brake rotor of any of Examples 9-11, further including a spring disposed between an outer peripheral edge of the carrier and an inner peripheral edge of the brake track, the spring to bias the brake track circumferentially relative to the carrier.

Example 13 is a brake rotor for a bicycle. The brake rotor comprises a carrier to be coupled to a hub of the bicycle. The carrier has an arm with an end portion. The end portion has a protrusion extending in a circumferential direction. The brake rotor also includes a brake track having braking surfaces to be engaged by brake pads. The brake rotor has a rotational axis defining a coordinate reference. The brake track is disposed radially outward of the carrier. The brake track has an inner peripheral edge with a notch. The end portion of the arm is disposed in the notch. The brake track is axially slidable on the end portion. The notch of the brake track is at least partially defined by a lip that is disposed radially inward relative to the protrusion of the end portion to radially constrain the brake track relative to the carrier.

Example 14 includes the brake rotor of Example 13, wherein the inner peripheral edge of the brake track along the notch is slidably engaged with an outer peripheral edge of the end portion.

Example 15 includes the brake rotor of Examples 13 or 14, further including a first stop to limit axial movement of the brake track in a first axial direction and a second stop to limit axial movement of the brake track in a second axial direction.

Example 16 includes the brake rotor of Example 15, wherein the first stop is on a first side of the brake rotor and the second stop is on a second side of the brake rotor opposite the first side of the brake rotor.

Example 17 includes the brake rotor of Example 15, wherein the first stop and the second stop are on a same side of the brake rotor.

Example 18 includes the brake rotor of Examples 13 or 14, wherein the brake rotor does not include any stops to limit axial movement of the brake track relative to the carrier.

Example 19 includes the brake rotor of any of Examples 13-18, wherein the carrier has a spline interface to engage a spline interface on the hub.

Example 20 is a hub assembly for a bicycle. The hub assembly comprises a hub having a spoke-attachment flange, a frame attachment section, and a first spline interface between the spoke-attachment flange and the frame attachment section. The hub assembly also includes a brake rotor disposed on the hub, the hub and the brake rotor rotatable about a rotational axis that defines a coordinate reference. The brake rotor includes a carrier and a brake track coupled to the carrier. The carrier has a second spline interface engaged with the first spline interface. The first spline interface has a greater thickness than the second spline interface. The brake rotor is axially movable on the second spline interface of the hub between the spoke-attachment flange and the frame attachment section.

Example 21 is a brake caliper for a bicycle. The brake caliper comprises an outboard caliper portion to be disposed inboard of a frame of the bicycle. The outboard caliper portion includes an outboard caliper body and an outboard brake pad that is fixed relative to the outboard caliper body. The brake caliper also includes an inboard caliper portion coupled to the outboard caliper body. The inboard caliper portion is disposed inboard of the outboard caliper portion when the brake caliper is coupled to the bicycle. The inboard caliper portion includes an inboard caliper body and an inboard brake pad that is movable relative to the inboard caliper body.

Example 22 includes the brake caliper of Example 21, wherein the outboard caliper portion includes an axle mounting bracket coupled to the outboard caliper body. The axle mounting bracket defines a first opening to receive an axle of a wheel of the bicycle. The axle mounting bracket forms a first point of contact with the bicycle.

Example 23 includes the brake caliper of Example 22, further including a frame mounting bracket coupled to at least one of the outboard caliper body or the inboard caliper body. The frame mounting bracket defines a second opening to receive a post extending inboard from the frame of the bicycle. The frame mounting bracket forms a second point of contact with the bicycle.

Example 24 includes the brake caliper of Example 23, wherein a central axis of the second opening is parallel to a central axis of the first opening.

Example 25 includes the brake caliper of Examples 23 or 24, wherein the axle mounting bracket is angled from the first opening to the outboard caliper body such that when the brake caliper is installed on the bicycle, the second point of contact is inboard of the first point of contact.

Example 26 includes the brake caliper of Example 25, wherein the axle mounting bracket is integral with the outboard caliper body.

Example 27 includes the brake caliper of any of Examples 21-26, wherein the outboard brake pad is coupled to the outboard caliper body via one or more threaded fasteners.

Example 28 includes the brake caliper of any of Examples 21-27, further including a hydraulic brake line coupled to the inboard caliper body.

Example 29 is a front fork for a bicycle. The front fork comprises a first tube having a first wheel attachment portion, a second tube spaced from the first tube, the second tube having a second wheel attachment portion, and a brake caliper disposed on an inboard side of the first tube.

Example 30 includes the front fork of Example 29, wherein central axes of the first and second tubes lie in a center plane, and wherein the center plane intersects brake caliper.

Example 31 includes the front fork of Example 30, wherein the center plane intersects a cylinder of in the brake caliper.

Example 32 includes the front fork of Examples 30 or 31, wherein the brake caliper has three cylinders, and wherein the center plane intersects a middle one of the cylinders.

Example 33 includes the front fork of any of Examples 29-32, wherein the brake caliper includes: an outboard caliper body coupled to the inboard side of the first tube, an inboard caliper body coupled to the outboard caliper body, the inboard caliper body disposed inboard of the outboard caliper body, an outboard brake pad, and an inboard brake pad.

Example 34 includes the front fork of Example 33, wherein the outboard brake pad is fixed relative to the outboard caliper body and the inboard brake pad is moveable relative to the inboard caliper body.

Example 35 includes the front fork of Examples 33 or 34, wherein the outboard caliper body is integral with the first tube.

Example 36 includes the front fork of Example 15, wherein the first tube has a first mount and a second mount. The brake caliper is coupled to the first mount via a first threaded fastener and coupled to the second mount via a second threaded fastener.

Example 37 includes the front fork of Example 36, wherein the first and second threaded fasteners are parallel to each other.

Example 38 includes the front fork of Examples 36 or 37, wherein the second threaded fastener is oriented in a direction that is perpendicular to and offset from the first threaded fastener.

Example 39 is a disc brake for a bicycle. The disc brake comprises a brake rotor to be coupled to the bicycle and rotatable about a rotational axis. The brake rotor includes a carrier to be coupled to a hub of the bicycle and a brake track having braking surfaces. The brake track is disposed radially outward of the carrier. The brake track is coupled to the carrier such that the brake track is axially movable relative to the carrier. The disc brake also includes a brake caliper to be coupled to the bicycle relative to the brake rotor. The brake caliper includes a body, a first brake pad fixed relative to the body, and a second brake pad that is moveable relative to the body, such that when the brake caliper is actuated, the second brake pad engages the brake track and moves the brake track into engagement with the first brake pad.

Example 40 includes the disc brake of Example 39, wherein the first brake pad is an outboard brake pad and the second brake pad is an inboard brake pad.

Example 41 is brake for a bicycle. The brake comprises a brake caliper to be disposed inboard of a frame of the bicycle and an axle mounting bracket integral with the brake caliper. The axle mounting bracket defines an opening. An axle of the bicycle is to extend through the opening when the brake is installed on the bicycle. The brake also includes a sleeve disposed in the opening and extending from an outboard side of the axle mounting bracket. The sleeve is to extend into an axle opening in the frame of the bicycle when the brake is installed on the bicycle.

Example 42 includes thee brake of Example 41, wherein an inner surface of the axle mounting bracket forming the opening and an outer surface of the sleeve form an interference fit.

Example 43 includes the brake of Example 41 or 42, wherein a distal end of the sleeve is threaded. The brake further includes a nut to be threadably coupled to the distal end of the sleeve when the brake is installed on the bicycle.

Example 44 includes the brake of any of Example 41-43, wherein the opening is a first opening. The brake caliper includes a frame mounting bracket defining a second opening. The brake including a post to be coupled to and extend inboard of the frame of the bicycle. The post is to extend through the second opening when installed on the bicycle.

Example 45 includes the brake of Example 24, further including a sleeve to be disposed around the post such that the sleeve is between the post and the frame mounting bracket. The sleeve is constructed of a compliant material.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A brake caliper for a bicycle, the brake caliper comprising:
  an outboard caliper portion to be disposed inboard of a frame of the bicycle, the outboard caliper portion including an outboard caliper body and an outboard brake pad that is fixed relative to the outboard caliper body; and
  an inboard caliper portion coupled to the outboard caliper body, the inboard caliper portion disposed inboard of the outboard caliper portion when the brake caliper is coupled to the bicycle, the inboard caliper portion including an inboard caliper body and an inboard brake pad that is movable relative to the inboard caliper body.

2. The brake caliper of claim 1, wherein the outboard caliper portion includes an axle mounting bracket coupled to the outboard caliper body, the axle mounting bracket defining a first opening to receive an axle of a wheel of the bicycle, the axle mounting bracket forming a first point of contact with the bicycle.

3. The brake caliper of claim 2, further including a frame mounting bracket coupled to at least one of the outboard caliper body or the inboard caliper body, the frame mounting bracket defining a second opening to receive a post extending inboard from the frame of the bicycle, the frame mounting bracket forming a second point of contact with the bicycle.

4. The brake caliper of claim 3, wherein a central axis of the second opening is parallel to a central axis of the first opening.

5. The brake caliper of claim 3, wherein the axle mounting bracket is angled from the first opening to the outboard caliper body such that when the brake caliper is installed on the bicycle, the second point of contact is inboard of the first point of contact.

6. The brake caliper of claim 5, wherein the axle mounting bracket is integral with the outboard caliper body.

7. The brake caliper of claim 1, wherein the outboard brake pad is coupled to the outboard caliper body via one or more threaded fasteners.

8. The brake caliper of claim 1, further including a hydraulic brake line coupled to the inboard caliper body.

9. A front fork for a bicycle, the front fork comprising:
  a first tube having a first wheel attachment portion;
  a second tube spaced from the first tube, the second tube having a second wheel attachment portion; and
  a brake caliper disposed on an inboard side of the first tube,
  the first tube having a post extending inboard from the inboard side of the first tube, the post configured to receive a portion of the brake caliper for mounting the brake caliper to the inboard side of the first tube,
  the brake caliper comprising:
    an outboard caliper body coupled to the inboard side of the first tube,
    an inboard caliper body coupled to the outboard caliper body, the inboard caliper body disposed inboard of the outboard caliper body,
    an outboard brake pad, and
    an inboard brake pad,
  wherein the outboard brake pad is fixed relative to the outboard caliper body and the inboard brake pad is moveable relative to the inboard caliper body.

10. The front fork of claim 9, wherein central axes of the first and second tubes lie in a center plane, and wherein the center plane intersects brake caliper.

11. The front fork of claim 10, wherein the center plane intersects a cylinder of the brake caliper.

12. The front fork of claim 10, wherein the brake caliper has three cylinders, and wherein the center plane intersects a middle one of the cylinders.

13. A disc brake for a bicycle comprising:
  a brake rotor to be coupled to the bicycle and rotatable about a rotational axis, the brake rotor including:
    a carrier to be coupled to a hub of the bicycle; and
    a brake track having braking surfaces, the brake track disposed radially outward of the carrier, the brake track coupled to the carrier such that the brake track is axially movable relative to the carrier; and
  a brake caliper to be coupled to the bicycle relative to the brake rotor, the brake caliper including:
    a body;
    a first brake pad fixed relative to the body; and
    a second brake pad that is moveable relative to the body, such that when the brake caliper is actuated, the second brake pad engages the brake track and moves the brake track into engagement with the first brake pad, wherein the first brake pad is an outboard brake pad and the second brake pad is an inboard brake pad.

* * * * *